US007653592B1

(12) United States Patent
Flaxman et al.

(10) Patent No.: US 7,653,592 B1
(45) Date of Patent: Jan. 26, 2010

(54) SYSTEM AND METHOD FOR PROCESSING A LOAN

(75) Inventors: David R. Flaxman, Chevy Chase, MD (US); Minerva L. Tantoco-Hobbs, Washington, DC (US); Anne M. Murphy Kobus, Silver Spring, MD (US); Michael W. Koch, Bittinger, MD (US); Daniel Packer, Rockville, MD (US); Peter G. Plofchan, Washington, DC (US); Richard C. Pomeroy, Chinook, MT (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 11/322,734

(22) Filed: Dec. 30, 2005

Related U.S. Application Data

(63) Continuation of application No. 11/002,010, filed on Nov. 30, 2004.

(60) Provisional application No. 60/526,027, filed on Dec. 1, 2003, provisional application No. 60/528,299, filed on Dec. 10, 2003, provisional application No. 60/571,266, filed on May 14, 2004, provisional application No. 60/674,728, filed on Apr. 26, 2005.

(51) Int. Cl.
*G06Q 40/00* (2006.01)
(52) U.S. Cl. .............................. 705/38; 705/35; 705/37
(58) Field of Classification Search .................... 708/35, 708/38; 705/35, 38, 37
See application file for complete search history.

(56) References Cited

U.S. PATENT DOCUMENTS 3,316,395 A 4/1967 Lavin 4,876,648 A 10/1989 Lloyd (Continued)

FOREIGN PATENT DOCUMENTS

JP 04182868 6/1992

(Continued)

OTHER PUBLICATIONS

EDS: Wendover ushers in new era in online mortgage loans; Web-based service via HomeAdvisor.com automates behind-the-scenes processes to give consumers low rates, rapid approval and closing M2 Presswire. Coventry: May 31, 2000. p. 1.*

(Continued)

*Primary Examiner*—Lalita M Hamilton
(74) *Attorney, Agent, or Firm*—Foley & Lardner LLP

(57) ABSTRACT

A computer-implemented mortgage loan application data processing system comprises user interface logic and a workflow engine. The user interface logic is configured to receive mortgage loan application data for a mortgage loan application from a borrower. The workflow engine has stored therein a list representing tasks that need to be performed in connection with the mortgage loan application, including tasks for fulfillment of underwriting conditions. The workflow engine is configured to cooperate with the user interface logic to prompt the borrower to perform the tasks. The system is configured to provide the borrower with a fully-verified approval for the mortgage loan application. The fully-verified approval indicates that the mortgage loan application data received from the borrower has already been verified as accurate using information from trusted sources. The mortgage loan application may then be provided to different lenders with the different lenders being able to authenticate the fully-verified approval status.

22 Claims, 57 Drawing Sheets

U.S. PATENT DOCUMENTS

| | | | |
|---|---|---|---|
| 5,239,462 A | 8/1993 | Jones et al. | |
| 5,262,941 A | 11/1993 | Saladin et al. | |
| 5,274,547 A | 12/1993 | Zoffel et al. | |
| 5,323,315 A | 6/1994 | Highbloom | |
| 5,361,201 A | 11/1994 | Jost et al. | |
| 5,414,621 A | 5/1995 | Hough | |
| 5,537,315 A | 7/1996 | Mitcham | |
| 5,611,052 A | 3/1997 | Dykstra et al. | |
| 5,615,268 A | 3/1997 | Bisbee et al. | |
| 5,689,649 A | 11/1997 | Altman et al. | |
| 5,696,907 A | 12/1997 | Tom | |
| 5,699,527 A | 12/1997 | Davidson | |
| 5,732,400 A | 3/1998 | Mandler et al. | |
| 5,765,144 A | 6/1998 | Larche et al. | |
| 5,797,133 A | 8/1998 | Jones et al. | |
| 5,870,721 A | 2/1999 | Norris | |
| 5,878,403 A | 3/1999 | DeFrancesco et al. | |
| 5,878,404 A | 3/1999 | Stout, Jr. et al. | |
| 5,930,775 A | 7/1999 | McCauley et al. | |
| 5,930,776 A | 7/1999 | Dykstra et al. | |
| 5,940,811 A | 8/1999 | Norris | |
| 5,940,812 A | 8/1999 | Tengel et al. | |
| 5,966,699 A | 10/1999 | Zandi | |
| 5,970,464 A | 10/1999 | Apte et al. | |
| 5,974,372 A | 10/1999 | Barnes et al. | |
| 5,983,206 A | 11/1999 | Oppenheimer | |
| 5,995,947 A | 11/1999 | Fraser et al. | |
| 6,014,645 A | 1/2000 | Cunningham | |
| 6,021,202 A | 2/2000 | Anderson et al. | |
| 6,029,149 A | 2/2000 | Dystra et al. | |
| 6,035,288 A | 3/2000 | Solomon | |
| 6,044,362 A | 3/2000 | Neely | |
| 6,076,070 A | 6/2000 | Stack | |
| 6,088,686 A | 7/2000 | Walker et al. | |
| 6,105,007 A | 8/2000 | Norris | |
| 6,112,190 A | 8/2000 | Fletcher et al. | |
| 6,119,103 A | 9/2000 | Basch et al. | |
| 6,125,349 A | 9/2000 | Maher | |
| 6,144,948 A | 11/2000 | Walker et al. | |
| 6,202,053 B1 | 3/2001 | Christiansen et al. | |
| 6,226,624 B1 | 5/2001 | Watson et al. | |
| 6,289,319 B1 | 9/2001 | Lockwood | |
| 6,311,169 B2 | 10/2001 | Duhon | |
| 6,324,526 B1 | 11/2001 | D'Agostino | |
| 6,367,013 B1 | 4/2002 | Bisbee et al. | |
| 6,385,594 B1 | 5/2002 | Lebda et al. | |
| 6,401,070 B1 | 6/2002 | McManus et al. | |
| 6,405,181 B2 | 6/2002 | Lent et al. | |
| 6,430,539 B1 | 8/2002 | Lazarus et al. | |
| 6,438,526 B1 | 8/2002 | Dykes et al. | |
| 6,505,176 B2 | 1/2003 | DeFrancesco, Jr. et al. | |
| 6,513,018 B1 | 1/2003 | Culhane | |
| 6,532,450 B1 | 3/2003 | Brown et al. | |
| 6,584,467 B1 | 6/2003 | Haught et al. | |
| 6,594,635 B1 | 7/2003 | Erlanger | |
| 6,609,109 B1 | 8/2003 | Bradley et al. | |
| 6,611,816 B2 | 8/2003 | Lebda et al. | |
| 6,651,884 B2 | 11/2003 | Predergast et al. | |
| 6,671,673 B1 | 12/2003 | Baseman et al. | |
| 6,823,319 B1 | 11/2004 | Lynch et al. | |
| 7,146,337 B1 * | 12/2006 | Ward et al. ................. | 705/38 |
| 2001/0029482 A1 | 10/2001 | Tealdi et al. | |
| 2001/0032178 A1 | 10/2001 | Adams et al. | |
| 2001/0037287 A1 | 11/2001 | Broadbent et al. | |
| 2002/0029154 A1 | 3/2002 | Majoor | |
| 2002/0029194 A1 | 3/2002 | Lewis et al. | |
| 2002/0032635 A1 | 3/2002 | Harris et al. | |
| 2002/0035520 A1 | 3/2002 | Weiss | |
| 2002/0038318 A1 | 3/2002 | Cochran et al. | |
| 2002/0040339 A1 | 4/2002 | Dhar et al. | |
| 2002/0052815 A1 | 5/2002 | Johnson et al. | |
| 2002/0052835 A1 | 5/2002 | Toscano | |
| 2002/0059137 A1 | 5/2002 | Freeman et al. | |
| 2002/0077968 A1 | 6/2002 | Kaniwa et al. | |
| 2002/0087364 A1 | 7/2002 | Lerner et al. | |
| 2002/0087389 A1 | 7/2002 | Sklarz et al. | |
| 2002/0091550 A1 | 7/2002 | White et al. | |
| 2002/0091630 A1 | 7/2002 | Inoue | |
| 2002/0099650 A1 | 7/2002 | Cole | |
| 2002/0111835 A1 | 8/2002 | Hele et al. | |
| 2002/0111901 A1 | 8/2002 | Whitney | |
| 2002/0138414 A1 | 9/2002 | Baker, IV | |
| 2002/0152155 A1 | 10/2002 | Greenwood et al. | |
| 2002/0152165 A1 | 10/2002 | Dutta et al. | |
| 2002/0152170 A1 | 10/2002 | Dutta et al. | |
| 2003/0023610 A1 | 1/2003 | Bove et al. | |
| 2003/0028478 A1 | 2/2003 | Kinney et al. | |
| 2003/0033241 A1 | 2/2003 | Harari | |
| 2003/0033242 A1 | 2/2003 | Lynch et al. | |
| 2003/0036994 A1 * | 2/2003 | Witzig et al. ................. | 705/38 |
| 2003/0036995 A1 | 2/2003 | Lazerson | |
| 2003/0036996 A1 | 2/2003 | Lazerson | |
| 2003/0046223 A1 | 3/2003 | Crawford et al. | |
| 2003/0065614 A1 | 4/2003 | Sweeney | |
| 2003/0093366 A1 | 5/2003 | Halper et al. | |
| 2003/0110249 A1 | 6/2003 | Buus et al. | |
| 2003/0144949 A1 | 7/2003 | Blanch | |
| 2003/0167191 A1 | 9/2003 | Slabonik et al. | |
| 2003/0172025 A1 | 9/2003 | Gallina | |
| 2003/0177032 A1 | 9/2003 | Bonissone et al. | |
| 2003/0182159 A1 | 9/2003 | Bonissone et al. | |
| 2003/0187696 A1 | 10/2003 | Bonissone et al. | |
| 2003/0187697 A1 | 10/2003 | Bonissone et al. | |
| 2003/0187698 A1 | 10/2003 | Bonissone et al. | |
| 2003/0187699 A1 | 10/2003 | Bonissone et al. | |
| 2003/0187700 A1 | 10/2003 | Bonissone et al. | |
| 2003/0187701 A1 | 10/2003 | Bonissone et al. | |
| 2003/0187702 A1 | 10/2003 | Bonissone et al. | |
| 2003/0208385 A1 | 11/2003 | Zander et al. | |
| 2003/0212654 A1 | 11/2003 | Harper et al. | |
| 2003/0217034 A1 | 11/2003 | Shutt | |
| 2003/0220879 A1 | 11/2003 | Gaughan et al. | |
| 2003/0225662 A1 | 12/2003 | Horan et al. | |
| 2003/0229553 A1 | 12/2003 | Kongyingyong et al. | |
| 2003/0229581 A1 | 12/2003 | Green et al. | |
| 2003/0233260 A1 | 12/2003 | Snell et al. | |
| 2003/0233316 A1 | 12/2003 | Hu et al. | |
| 2004/0002915 A1 | 1/2004 | McDonald et al. | |
| 2004/0019517 A1 | 1/2004 | Sennott | |
| 2004/0030616 A1 | 2/2004 | Florance et al. | |
| 2004/0030649 A1 | 2/2004 | Nelson et al. | |
| 2004/0034592 A1 | 2/2004 | Hu et al. | |
| 2004/0049439 A1 | 3/2004 | Johnston et al. | |
| 2004/0049445 A1 | 3/2004 | Kishore | |
| 2004/0059653 A1 | 3/2004 | Verkuylen et al. | |
| 2004/0064402 A1 | 4/2004 | Dreyer et al. | |
| 2004/0107161 A1 | 6/2004 | Tanaka et al. | |
| 2004/0122717 A1 | 6/2004 | Hancock | |
| 2004/0138996 A1 | 7/2004 | Bettenburg et al. | |
| 2004/0199458 A1 * | 10/2004 | Ho ................. | 705/38 |

FOREIGN PATENT DOCUMENTS

| | | |
|---|---|---|
| JP | 2002007701 | 1/2002 |
| JP | 2002259696 | 9/2002 |
| JP | 2002288426 | 10/2002 |
| JP | 2003223559 | 8/2003 |
| WO | WO 0021011 | 4/2000 |
| WO | WO 0062209 | 10/2000 |
| WO | WO 0075833 | 12/2000 |
| WO | WO 01/27832 | 4/2001 |
| WO | WO 0133461 | 5/2001 |
| WO | WO 0139079 | 5/2001 |
| WO | WO 01/41019 | 6/2001 |

| | | |
|---|---|---|
| WO | WO 0163446 | 8/2001 |
| WO | WO 0163534 | 8/2001 |
| WO | WO 0180123 | 10/2001 |
| WO | WO 0198999 | 12/2001 |
| WO | WO 02/06989 | 1/2002 |
| WO | WO 0208855 | 1/2002 |
| WO | WO 0223443 | 3/2002 |
| WO | WO 03009152 | 1/2003 |

OTHER PUBLICATIONS

A loan on the Web Bob Edmonson. Banking Technology. London: Jul./Aug. 1997. vol. 14, Iss. 6; p. 18 (4 pages).*

U.S. Appl. No. 10/339,210, filed Mar. 27, 2003, Reis.

Fannie Mae, "Guide to Underwriting with Desktop Underwriter®", Sep. 2002; 63 pgs.

EDOCS, "edocs Teams with Fannie Mae to Offer Lenders Online Account Management Solution," Press Release, Mar. 12, 2001, 2 pgs., edocs, Inc., USA.

Fannie Mae, "Fannie Mae Unveils MORNETPlus on the Web; Lenders Can Now Access Automated Underwriting and Other Mortgage Transaction Services on Fanniemae.com," Press Release, Mar. 23, 2000, 2 pgs., Fannie Mae, USA.

Fannie Mae, "Fannie Mae Announces MORNETPlus Connections; Now Provides Lenders with Access to the Largest Network of Service Providers on the Web for Appraisals, Flood Certificates, Title Insurance and Closing, and Escrow Services," Press Release, Apr. 18, 2001, 3 pgs., Fannie Mae, USA.

Fannie Mae, "Fannie Mae and First American Financial to Provide Lenders with Electronic Access to More Products on MORNETPlus Network; Appraisals, Flood Certificates, and Title Insurance in Offering," Press Release, Dec. 21, 1999, 2 pgs, Fannie Mae, USA.

Raines Franklin D., "Statement by Franklin D. Raines Chairman and CEO of Fannie Mae, Speech at 2003 Fannie Mae eBusiness Forum," Sep. 17, 2003, 6 pgs, Fannie Mae, USA.

Object Management Group, "Fannie Mae", CORBA Banking/Finance, Sep. 17, 2001, 2 pgs, Object Management Group, Needham, MA, USA.

Smith Tom, "E-Commerce Holds Keys to Home Ownership: Fannie Mae drives hug volumes of mortgage business to its e-marketplace," Internetweek.com, Undated, 5 pgs., Internetweek.com, USA.

Smith Tom, "Fannie Mae Ramps up Web Apps: Q&A with Julie St. John, Executive Vice President and Chief Technology Office and Michael Williams President of Fannie Mae e-Business," Internetweek.com, Undated, 11 pgs., Internetweek.com, USA.

Sun, "Success on Sun: Software Development Case Study Federal National Mortgage Association (Fannie Mae)," Mar. 1995, 10 pgs, Sun, USA.

Raines Franklin D., "Speech by Franklin D. Raines Chairman and CEO of Fannie Mae, Fannie Mae and the Mortgage Industry in the E-Commerce Age," May 8, 2000, 20 pgs., Fannie Mae, USA.

Williams Michael, "Technology and Other Keys to the Boom in Refinancing," American Banker, Apr. 20, 2003, 3 pgs, vol. 168, Issue 63, p. 8., American Banker USA.

Breakthroughs in Mortgage Banking: Looking Toward the Future, Real Estate Finance Press, Mortgage Bankers Association of America, 1996, pp. 5-1-5-8, ISBN 1-57599-016-4, Jess Lderman, Editor.

Fannie Mae, "Delivering Loans for MBS", 1996, 138 pages, Fannie Mae, Washington, DC, USA.

Fannie Mae, "MORNET Cash Delivery System User's Guide", Nov. 1997, 177 pages, Version 2.6, Fannie Mae, Washington, DC, USA.

Fannie Mae, "Delivering Loans for Cash", 1997, 96 pages, Fannie Mae, Washington, DC, USA.

Fannie Mae, "Mornet Servicing Support System User's Guide", Dec. 1998, 370 pages, Fannie Mae, Washington, DC, USA.

Johnston Judy, "Paperless is More," Mortgage Banking, Dec. 2004, 4 pgs, Mortgage Bankers Association, Washington, DC, USA.

Laurie Michael, "Challenge in Automating eMortgages," Mortgage Banking, Dec. 2004, 6 pgs, Mortgage Bankers Association, Washington, DC, USA.

Harris Jeanne G., and Brooks Jeffrey D., "In the Mortgage Industry, IT Matters," Mortgage Banking, Dec. 2004, 4 pgs, Mortgage Bankers Association, Washington, DC, USA.

Detwiler Michael, "Getting a Grip on Workflow," Mortgage Banking, Aug. 2004, 4 pgs, Mortgage Bankers Association, Washington, DC, USA.

Williams Michael, "Tools for Emerging Markets," Mortgage Banking, Feb. 2004, 4 pgs, Mortgage Bankers Association, Washington, DC, USA.

Alcorn Lowell, "Killing the Paper," Mortgage Banking, Aug. 2005, 3 pgs, Mortgage Bankers Association, Washington, DC, USA.

Tenuta John R., "The LOS Meets the e-Mortgage," Mortgage Banking, Oct. 2003, 5 pgs, Mortgage Bankers Association, Washington, DC, USA.

Hollingsworth David, "The Workflow Reference Model 10 Years On," Workflow Handbook, 2004, 18 pgs, Workflow Management Coalition, Hingham, MA, USA.

Pyke Jon and Whitehead Roger, "Does Better Math Lead to Better Business Processes?" Nov. 14, 2003, 7 pgs, Workflow Management Coalition, Hingham, MA, USA.

Prior Carol, "Workflow and Process Management," Workflow Handbook, 2003, 9 pgs, Workflow Management Coalition, Hingham, MA, USA.

Plesums Charles, "Introduction to Workflow," Workflow Handbook, 2002, 20 pgs, Workflow Management Coalition, Hingham, MA, USA.

Allen Rob, "Workflow: An Introduction," Workflow Handbook, 2001, 24 pgs, Workflow management Coalition, Hingham, MA, USA.

Workflow Management Coalition, "Workflow Security Consideration—White Paper," The Workflow Management Coalition Specification, Feb. 1998, 15 pgs, Workflow Management Coalition, Winchester, United Kingdom.

The Japanese Standards Association, "Interworkflow Application Model: The Design of Cross-Organizational Workflow Processes and Distributed Operations Management," The Workflow Management Coalition Specification, Feb. 1997, 31 pgs, Workflow Management Coalition.

Anderson Mike and Allen Rob, "Workflow Ineroprability—Enabling E-Commerce," WfMC White Paper, Apr. 1, 1999, 11 pgs, Workflow Management Coalition, Hingham, MA, USA.

ICL Enterprises, "A Common Object Model," The Workflow Management Coalition, 1994, 16 pgs, Workflow Management Coalition, Winchester, United Kingdom.

Allen Rob and Zur Muehlen Michael, "Workflow Classification Embedded & Autonomous Workflow Mangement Systems," Workflow Management Coalition, Mar. 10, 2000, 8 pgs, Workflow Management Coalition, Hingham, MA, USA.

Focardi Craig, "Mortgage Technology: The Next Big Thing(s)," FinanceTech, Apr. 27, 2004, 14 pgs, InformationWeek Media Network, Manhasset, NY, USA.

Van Valkenburg Paul T., "Pipeline Risk Management: Recent Trends, Strategies and Accounting Implications," MBA Accounting and Tax Conference 2002, Dec. 12, 2002, 21 pgs, Mortgage Bankers Association, Washington, DC, USA.

Taglia Pete and Williams Bill, "Managing Fallout in a Volatile World," MBA National Secondary Marketing Conference, Apr. 8, 2003, 41 pgs, Mortgage Bankers Association, Washington, DC USA.

Fannie Mae, "Selling", Jun. 30, 2002, 168 pgs, Fannie Mae, USA.

Kelvie Bill and Kraft Michael, "Technology in the Mortgage Industry: The Fannie Mae Experience," IT Pro, May-Jun. 2002, vol. 2, Issue 3, 9 pgs, IT Professional, Washington, DC, USA.

Board of Patent Appeals and Interferences Decision re: U.S. Appl. No. 09/593,106, filed Mar. 27, 2007, 7 pages.

U.S. PTO Office Action, Examiner's Answer to Appellant's Brief re: U.S. Appl. No. 09/593,106, filed Dec. 19, 2005, 13 pages.

U.S. Appl. No. 09/593,106, filed Jun. 13, 2000, Williams et al.

U.S. Appl. No. 11/322,735, filed Dec. 30, 2005, Flaxman et al.

U.S. Appl. No. 11/322,911, filed Dec. 30, 2005, Flaxman et al.

U.S. Appl. No. 11/322,838, filed Dec. 30, 2005, Flaxman et al.

U.S. Appl. No. 11/322,737, filed Dec. 30, 2005, Flaxman et al.

U.S. Appl. No. 11/322,813, filed Dec. 30, 2005, Flaxman et al.

U.S. Appl. No. 11/002,010, filed Nov. 30, 2004, Flaxman et al.

U.S. Appl. No. 11/323,055, filed Dec. 30, 2005, Flaxman et al.
U.S. Appl. No. 11/323,079, filed Dec. 30, 2005, Flaxman et al.
U.S. Appl. No. 11/322,934, filed Dec. 30, 2005, Flaxman et al.

USPTO Final Office Action for U.S. Appl. No. 11/901,965, date of the mailing of the Office Action, Sep. 11, 2009 (11 pgs.).

* cited by examiner

Underwriting Conditions

Applicant Name(s): Suzi Builder

| Lender Messages | Consumer Messages |
|---|---|
| Applicant(s) will be required to provide copies of the following: | You will be required to provide copies of the following: |
| • Document that the following judgements and garnishments have been paid on or before closing: | • Documentation confirming that the following judgements and garnishments have been paid on or before closing: |
|     Type         Date Filed  Date Satis.  Amount<br>    JUDGEMENT 10/01/1993 01/01/1994 5000.00 |     Type         Date Filed  Date Satis.  Amount<br>    JUDGEMENT 10/01/1993 01/01/1994 5000.00 |
| • Any changes in the application data (whether initiated by the borrower or identified during verification) may affect but are not limited to rate, points, appraisal requirements, maximum loan amount and additional documentation needed to close the loan. | • Changes in your application data (whether initiated by you or identified during verification) may affect but are not limited to rate, points, appraisal requirements, maximum loan amount and additional documentation needed to close your loan |
| • A property was listed as 'paid by closing' in the application. Verify that the lien(s) on the property has been satisfied on or before closing with a HUD-1 settlement statement. | • HUD-1 settlement statement to verify that the outstanding lien(s) has been satisfied on or before closing |
| • Verify the sales price of $150000.00 with a fully executed agreement of sale at least 4 days prior to the preparation of the closing package. | • Fully executed agreement of sale to support the purchase price of $150000.00 immediately after signing |
| • Verify with the borrower(s) that a homeowner's insurance policy has been obtained on or before closing and that premiums have been prepaid for one year. | • Documentation confirming that homeowner's insurance has been obtained on or before closing and that premiums have been prepaid for one year |
| • Verify $6000.00 of base monthly income for Ken Bass with a copy of the pay stub dated within 30 days of the application and including at least 30 days year-to-date earnings. If the pay stub does not include 30 days year-to-date earnings, a recent W-2 form is also required. Verify military income using a leave and earnings statement; include other military pay (housing, flight, etc.), except education benefits, in the base amount. | • Pay stub dated within 30 days of the application to confirm $6000.00 of base monthly income for Ken Bass; recent W-2 form required if 30 days year-to-date earnings are not on pay stub |
| • Assets totaling $16950.00 must be verified. | • Documentation verifying assets totaling a minimum of $16950.00 |
| • Savings account funds were listed as an asset on the application for Ken Bass. Verify the account balance with a complete savings account statement or verification of deposit covering a 30-day period and dated within 45 days of the application. | • Complete savings account statement for Ken Bass covering a 30-day period and dated within 45 days of the application |
| We will: | We will: |
| • Request flood zone certification and, if required, verify flood insurance has been acquired on or before closing. | • Request flood zone certification; if flood insurance is required, you will be requested to provide a copy of the policy on or before closing |
| | • Request a full title search and mortgagee title insurance policy prior to the closing of your loan |

FIG. 4

- Verify that a full title search and mortgagee title insurance policy have been obtained on or before closing. The policy must name the lender as an insured in the amount of the loan and must insure the security instrument to be a valid first lien on the property.

- A Full Yield/Point Trade-off schedule is provided for your reference. Approved limits for this product are a maximum schedule interest rate of 6.500 and a maximum number of points of 3.875. Only yield/point combinations within approved limits may be disclosed to the consumer.

Other information concerning the loan application:

- No property fieldwork or appraisal is required for the property at 1633 13th Street, NW Washington DC 20009. Fannie Mae accepts the submitted sales price for this transaction as the market value of the property.

- This recommendation for approval is valid up to an interest rate of 8.000 percent. This recommendation is based on the current application data and the points selected by the consumer.

Workflow Product

Loan List

Loan Search

Institution (required)
TMIDO/DU TEST

| Search Field | Keyword |
|---|---|
| Caseflle ID | 551891103 |

[Find Loan] — 922

920

| Loan Number | Borrower Name | Property Address | Casefile ID | Scheduled Closing Date | Days to Process | Loan Age | Loan Status | Loan Conditions | Last Modified Date/Time |
|---|---|---|---|---|---|---|---|---|---|
| Test Case B | Builder, Suzi | 12 Elm Place, Milwaukee, WI | 551891103 | | | 0 | New | | |

Workflow Product

Conditions List

| Borrower Name | Loan Number | Property Address | Casefile ID | Loan Conditions Status |
|---|---|---|---|---|
| Builder, Suzi | Test Case B | 12 Elm Place, Milwaukee, WI | 551891103 | New |

Return to Loan List | Add a New Condition

Documents

| Document/Data | Type | Status | Date |
|---|---|---|---|

Conditions

| Condition | Status | Last Modified By | Last Modified Date/Time |
|---|---|---|---|
| Order Closing | New | | |
| Mortgage insurance required. Obtain coverage. (289) | New | | |
| Borrower income must be verified | New | | |

FIG. 28

Workflow Product

Verify Income

| Borrower Name | Loan Number | Property Address | Casefile ID | Loan Conditions Status |
|---|---|---|---|---|
| Builder, Suzi | Test Case 8 | 12 Elm Place, Milwaukee, WI | 551891103 | New |

Documents

| Document/Data | Type | Status | Date |
|---|---|---|---|

Condition
Verify Income for Suzi Builder

Status: New
Description: Suzi Builder's income must be supported by a paystub, a telephone confirmation of employment, and a W-2 from the prior year, or by a standard Verification of Employment (1005). The paystub must be dated no earlier than 30 days from the application date and it must include at least 30 days of year-to-date earnings. In lieu of obtaining the telephone confirmation, an additional paystub dated within 30 days of closing may be obtained.

Choose documentation to be collected:
○ Paystub dated no earlier than 30 days from application date, telephone confirmation, and W2 from prior year
● Paystub dated no earlier than 30 days from application date, a second paystub dated within 30 days of closing, and a W2 from prior year
○ Verification of Employment (Form 1005)

[ Next ] [ Cancel ]

FIG. 29

Workflow Product

Verify Income - Collect Documentation

| Borrower Name | Loan Number | Property Address | Casefile ID | Loan Conditions Status |
|---|---|---|---|---|
| Builder, Suzi | Test Case 8 | 12 Elm Place, Milwaukee, WI | 551891103 | New |

Documents

| Document/Data | Type | Status | Date |
|---|---|---|---|

Collect Documentation

1. Paystub — 950

☑ Paystub Requested

Date Requested: 04/30/2004 — 952

☐ Document Received

Document Date: _____

Pay Period Start Date: _____

Year-to-Date Income: _____

Monthly Gross Income: _____

2. Additional Paystub

☑ Request another paystub dated within 30 days of closing

FIG. 30

Year-to-Date Income:
Monthly Gross Income:

2. Additional Paystub
☑ Request another paystub dated within 30 days of closing

Date Requested: 04/30/2004  ← 962
☐ Document Received

Document Date:
Pay Period Start Date:
Year-to-date Income:
Monthly Gross Income:

3. W2 from prior year
☑ W2 Requested for Suzi Builder

Date Requested: 04/30/2004  ← 964
☐ Document Received

W2 Year:
Total Income:

Additional Documentation Required? No

Save Changes ← 966
Cancel

FIG. 31

Workflow Product

Conditions List

Return to Loan List | Add a New Condition...

| Borrower Name | Loan Number | Property Address | Casefile ID | Loan Conditions Status |
|---|---|---|---|---|
| Builder, Suzi | Test Case 8 | 12 Elm Place, Milwaukee, WI | 551891103 | In Process |

Documents

| Document/Data | | | |
|---|---|---|---|
| Type | Status | | Date |
| PAYSTUB | Document Requested | | 4/30/2004 5:02 PM EDT |
| ADDPAYSTUB | Document Requested | | 4/30/2004 5:02 PM EDT |
| REQW2 | Document Requested | | 4/30/2004 5:02 PM EDT |

972

Conditions

| Condition | Status | Last Modified By | Last Modified Date/Time |
|---|---|---|---|
| Order Closing | New | | |
| Mortgage insurance required. Obtain coverage. (289) | New | | |
| Borrower income must be verified | In Process | FMBARNES | 4/30/2004 5:02 PM EDT |

* Contact Name: Erika Barnes    * Phone: 202-000-2222    Fax:
Broker Name:    Email:

Mortgage Insurance Premium Coverage
* Coverage %: 25    LTV %: 82.000    * Premium Duration: Periodic
* Premium Payment Option: Deferred Monthly    * Premium Refund Option: Refundable
Renewal Option: Constant Submission Information
* MI Payment Source: Borrower Paid    * A-Loan: No    * Relocation Loan: No
* First Time Home Buyer: No    * County: Milwaukee
Reduced Loan Doc Type:

Insured Information
Condo Phase:    Condo Project Name:

* Required field

Order MI    Cancel    — 994

Workflow Product

Add New Condition

| Borrower Name | Loan Number | Property Address | Casefile ID | Loan Conditions Status |
|---|---|---|---|---|
| Builder, Suzi | Test Case B | 12 Elm Place, Milwaukee, WI | 551891103 | In Process |

Title: ABC Merchant Account —— 1000

Condition Text: Collect explanation from borrower on over 30 day late payment. —— 1002

[Add Condition] —— 1004  [Cancel]

FIG. 36

Workflow Product

Conditions List

Return to Loan List

Add a New Condition...

| Borrower Name | Loan Number | Property Address | Casefile ID | Loan Conditions Status |
|---|---|---|---|---|
| Builder, Suzi | Test Case 8 — 1018 | 12 Elm Place, Milwaukee, WI | 551891103 | In Process |

Documents

| Document/Data | Type | Status | Date |
|---|---|---|---|
| 01000000666 | ADDPAYSTUB | Document Received | 4/30/2004 4:46 PM EDT |
| 01000000670 | W2 | Document Received | 4/30/2004 4:48 PM EDT |
| 01000000672 | PAYSTUB | Document Received | 4/30/2004 4:49 PM EDT |
| 02000000902 | MI | Document Received | 4/30/2004 5:08 PM EDT |

—1010—

Conditions

| Condition | Status | Last Modified By | Last Modified Date/Time |
|---|---|---|---|
| Order Closing | New | | |
| Mortgage insurance required. Obtain coverage. (289) | In Process —1016 | FMBARNES | 4/30/2004 5:07 PM EDT |
| Borrower income must be verified | In Process | FMBARNES | 4/30/2004 5:02 PM EDT |
| ABC Merchant Account | New —1014 | FMBARNES | 4/30/2004 5:08 PM EDT |

Workflow Product

Conditions List

| | | | Return to Loan List | |
|---|---|---|---|---|
| Borrower Name | Loan Number | Property Address | Casefile ID | Loan Conditions Status |
| Builder, Suzi | Test Case 8 | 12 Elm Place, Milwaukee, WI | 551891103 | Cleared to Close |

1050 — 1054

Documents

| Document/Data | Type | Status | Date |
|---|---|---|---|
| 010000000666 | ADDPAYSTUB | Document Received | 4/30/2004 4:46 PM EDT |
| 010000000670 | W2 | Document Received | 4/30/2004 4:48 PM EDT |
| 010000000672 | PAYSTUB | Document Received | 4/30/2004 4:49 PM EDT |
| 020000000902 | MI | Document Received | 4/30/2004 5:08 PM EDT |

1052

Conditions

| Condition | Status | Last Modified By | Last Modified Date/Time |
|---|---|---|---|
| Order Closing | Complete | FMBARNES | 5/3/2004 11:15 AM EDT |
| Mortgage insurance required. Obtain coverage. (289) | Complete | FMBARNES | 5/3/2004 11:13 AM EDT |
| Borrower income must be verified | Complete | FMBARNES | 5/3/2004 11:02 AM EDT |
| Sears Account | Complete | FMBARNES | 5/3/2004 11:17 AM EDT |

FIG. 43

Workflow Product

Loan List

| Loan Search | Institution (required) | | | | | | | |
|---|---|---|---|---|---|---|---|---|
| | TM/DO/DU TEST | | | | | | | |
| | Search Field | Keyword | | | | | | |
| | Caseflle ID | 551891103 | | | | | | |
| | | Find Loan | | | | | | |

| Loan Number | Borrower Name | Property Address | Casefile ID | Scheduled Closing Date | Days to Process | Loan Age | Loan Conditions Status | Last Modified Date/Time |
|---|---|---|---|---|---|---|---|---|
| Test Case 8 | Builder, Suzi | 12 Elm Place, Milwaukee, WI | 551891103 | 5/14/2004 | 1 | 3 | Cleared to Close | 5/3/2004 11:32 AM EDT |

FIG. 44

Workflow Product

Order Closing

| Borrower Name | Loan Number | Property Address | Casefile ID | Loan Conditions Status |
|---|---|---|---|---|
| Builder, Suzi | Test Case 8 | 12 Elm Place, Milwaukee, WI | 551891103 | Cleared to Close |

Documents

| Document/Data | Type | Status | Date |
|---|---|---|---|

Condition
Open a closing order

Status: Complete
Description: Schedule closing with closing agent

Complete Closing Order request:

Loan Information
Scheduled Closing Date
07/08/2004  (mm/dd/yyyy)
Closing Agent
ABC Settlement Agent  1060
Loan Purpose:
Purchase

FIG. 45

Condition
Open a closing order.

Status: Complete
Description: Schedule closing with closing agent

Complete Closing Order request:

Loan Information
Scheduled Closing Date
[07/08/2004]   (mm/dd/yyyy)
Closing Agent
[ABC Settlement Agent ▼]
Loan Purpose:
Purchase

Borrower Information
Borrower Name
First: Suzi
Last: Builder

Social Security #: 500606666

Current Address:
Street: 5404 Pawnee Trail
City: Louisville
State: KY
ZIP Code: 40207

[Update Closing]  [Cancel]

FIG. 46

Workflow Product

Conditions List

| Borrower Name | Loan Number | Property Address | Casefile ID | Loan Conditions Status |
|---|---|---|---|---|
| Builder, Suzi | Test Case 8 | 12 Elm Place, Milwaukee, WI | 551891103 | Alert |

Return to Loan List | Add a New Condition

1068

Documents

| Document/Data | Type | Status | Date |
|---|---|---|---|
| 01000000656 | ADDPAYSTUB | Expired — 1066 | 4/30/2004 4:46 PM EDT |
| 01000000670 | W2 | Document Received | 4/30/2004 4:48 PM EDT |
| 01000000672 | PAYSTUB | Document Received | 4/30/2004 4:49 PM EDT |
| 02000000902 | MI | Document Received | 4/30/2004 5:08 PM EDT |

The additional paystub for Suzi Builder that is required for closing is not dated within 30 days of the closing date. Please obtain a paystub that is within 30 days of the borrower's closing date or change the closing date. / 1064

Conditions

| Condition | Status | Last Modified By | Last Modified Date/Time |
|---|---|---|---|
| Order Closing | Complete | FMBARNES | 5/3/2004 11:20 AM EDT |
| Mortgage insurance required. Obtain coverage. (289) | Complete | FMBARNES | 5/3/2004 11:13 AM EDT |
| Borrower income must be verified | 1070 — Alert | FMBARNES | 5/3/2004 11:02 AM EDT |
| Sears Account | Complete | FMBARNES | 5/3/2004 11:17 AM EDT |

FIG. 47

Workflow Product

Verify Income

| Borrower Name | Loan Number | Property Address | Casefile ID | Loan Conditions Status |
|---|---|---|---|---|
| Builder, Suzi | Test Case 8 | 12 Elm Place, Milwaukee, WI | 551891103 | Alert |

Documents

| Document/Data | Type | Status | Date |
|---|---|---|---|
| 01000000666 | ADDPAYSTUB | Expired | 4/30/2004 4:46 PM EDT |
| 01000000670 | W2 | Document Received | 4/30/2004 4:48 PM EDT |
| 01000000672 | PAYSTUB | Document Received | 4/30/2004 4:49 PM EDT |

Condition
Verify Income for Suzi Builder

Status: Alert
Description: Suzi Builder's income must be supported by a paystub, a telephone confirmation of employment, and a W-2 from the prior year, or by a standard Verification of Employment (1005). The paystub must be dated no earlier than 30 days from the application date and it must include at least 30 days of year-to-date earnings. In lieu of obtaining the telephone confirmation, an additional paystub dated within 30 days of closing may be obtained.

Choose documentation to be collected:
- ○ Paystub dated no earlier than 30 days from application date, telephone confirmation, and W2 from prior year
- ● Paystub dated no earlier than 30 days from application date, a second paystub dated within 30 days of closing, and a W2 from prior year
- ○ Verification of Employment (Form 1005)

FIG. 48

Workflow Product

Conditions List

| Borrower Name | Loan Number | Property Address | | Caserfile ID | Loan Conditions Status |
|---|---|---|---|---|---|
| Builder, Suzi | Test Case 8 | 12 Elm Place, Milwaukee, WI | | 551891103 | In Process |

Documents

| Document/Data | Type | Status | Date | Last Modified By | Last Modified Date/Time |
|---|---|---|---|---|---|
| 01000000666 | ADDPAYSTUB | Document Requested | 5/3/2004 11:23 AM EDT | | |
| 01000000670 | ADDPAYSTUB | Expired | 4/30/2004 4:46 PM EDT | | |
| | W2 | Document Received | 4/30/2004 4:48 PM EDT | | |
| 01000000672 | PAYSTUB | Document Received | 4/30/2004 4:49 PM EDT | | |

Conditions

| Condition | Status | Last Modified By | Last Modified Date/Time |
|---|---|---|---|
| Order Closing | Complete | FMBARNES | 5/3/2004 11:20 AM EDT |
| Mortgage insurance required. Obtain coverage. (289) | Complete | FMBARNES | 5/3/2004 11:13 AM EDT |
| Borrower income must be verified | In Process | FMBARNES | 5/3/2004 11:23 AM EDT |
| Sears Account | Complete | FMBARNES | 5/3/2004 11:17 AM EDT |

FIG. 49

Workflow Product

Conditions List

| Borrower Name | Loan Number | Property Address | Casefile ID | Loan Conditions Status |
|---|---|---|---|---|
| Builder, Suzi | Test Case 8 | 12 Elm Place, Milwaukee, WI | 551891103 | Cleared to Close |

Documents

| Document/Data | Type | Status | Date |
|---|---|---|---|
| 010000000666 | ADDPAYSTUB | Expired | 4/30/2004 4:46 PM EDT |
| 010000000668 | ADDPAYSTUB | Document Received | 4/30/2004 4:47 PM EDT |
| 010000000670 | W2 | Document Received | 4/30/2004 4:48 PM EDT |
| 010000000672 | PAYSTUB | Document Received | 4/30/2004 4:49 PM EDT |

Conditions

| Condition | Status | Last Modified By | Last Modified Date/Time |
|---|---|---|---|
| Order Closing | Complete | FMBARNES | 5/3/2004 11:20 AM EDT |
| Mortgage insurance required. Obtain coverage. (289) | Complete | FMBARNES | 5/3/2004 11:13 AM EDT |
| Borrower income must be verified | Complete | FMBARNES | 5/3/2004 11:30 AM EDT |
| Sears Account | Complete | FMBARNES | 5/3/2004 11:17 AM EDT |

FIG. 50

Mortgage Process Management

Borrower Checklist

Employment and Income
- ☑ Last two years W-2s.
- ☑ Federal tax returns, all pages, for the past two years.
- ☐ Copy of lease agreement for rental property.
- ☐ Complete copy of divorce/settlement agreement (if applicable).
- ☐ Year-to-date pay stub.
- ☑ Pension/Social Security: Current year award letter.

Assets
- ☐ The two most recent bank/brokerage statements, all pages, for all accounts.

Liabilities
- ☑ Credit cards: account numbers, balance and minimum payment.
- ☐ Car loan: Lender's name, account number, payment and balance.
- ☐ Mortgage loans: Lender's name, account number, payment.

FIG. 51

Mortgage Process Management

Comprehensive Checklist

Employment and Income

- ☑ Complete: Last two years W-2s.
- ☑ Complete: Federal tax returns, all pages, for the past two years.
- ☐ Received: Copy of lease agreement for rental property.
- ☐ Ordered: Complete copy of divorce/settlement agreement (if applicable).
- ☐ Ordered: Year-to-date pay stub.
- ☑ Complete: Pension/Social Security: Current year award letter.
- ☑ Complete: Verification of income.

Assets

- ☐ Ordered: The two most recent bank/brokerage statements, all pages, for all accounts.

Liabilities

- ☑ Received: Credit card: account numbers, balance and minimum payment.
- ☐ Ordered: Car loan: Lenders name, account number, payment and balance.
- ☐ Ordered: Mortgage loan: Lenders name, account number, payment.

FIG. 52

Mortgage Process Management

Productivity Report

| Loan number | Borrower Name | Start date | End date | Duration |
|---|---|---|---|---|
| 56846354 | Barnes | 3/10/04 | 3/31/04 | 21 |
| 56545544 | Moore | 2/28/04 | 3/30/04 | 31 |
| 92689884 | Rodriguez | 2/05/04 | 3/15/04 | 45 |
| 00265984 | Samuels | 2/23/04 | 3/30/04 | 36 |
| 05689414 | Blackstone | 3/05/04 | 4/2/04 | 28 |
| 00656849 | Robeson | 3/10/04 | 3/31/04 | 20 |
| 20064295 | Jarapal | 2/28/04 | 3/30/04 | 30 |
| 66410001 | Goldberg | 2/05/04 | 3/15/04 | 45 |
| 98790743 | Nasissis | 2/23/04 | 3/30/04 | 36 |
| 48984651 | Richardson | 3/05/04 | 4/2/04 | 28 |
| 10654005 | Steele | 3/10/04 | 3/31/04 | 21 |
| 48545461 | Mantos | 2/28/04 | 3/30/04 | 31 |
| 00897441 | Rowel | 2/05/04 | 3/15/04 | 45 |
| 00022344 | Goel | 2/23/04 | 3/30/04 | 36 |
| 90671113 | Malek | 3/05/04 | 4/2/04 | 28 |
| 08548034 | Sommerville | 3/29/04 | 3/30/04 | 31 |
| 33465777 | Hawkins | 2/29/04 | 3/30/04 | 31 |
| 65798337 | Lieberman | 2/05/04 | 3/15/04 | 45 |
| 00246874 | Dowd | 2/23/04 | 3/30/04 | 36 |

FIG. 53

SYSTEM AND METHOD FOR PROCESSING A LOAN

CROSS REFERENCE TO RELATED APPLICATIONS

This application is a continuation of U.S. Ser. No. 11/002,010, entitled "System and Method for Processing a Loan," filed on Nov. 30, 2004, which claims the benefit under 35 U.S.C. §119(e) of (1) U.S. Prov. Ser. No. 60/526,027, entitled "System and Method for Processing a Loan," filed on Dec. 1, 2003; (2) U.S. Prov. Ser. No. 60/528,299, entitled "System and Method for Processing a Loan," filed on Dec. 10, 2003; and (3) U.S. Prov. Ser. No. 60/571,266, entitled "System and Method for Processing a Loan," filed on May 14, 2004, all of which are hereby expressly incorporated by reference. This application also claims the benefit under 35 U.S.C. §119(e) of U.S. Prov. Ser. No. 60/674,728, entitled "System and Method for Processing a Loan," filed on Apr. 26, 2005. This application also hereby expressly incorporates the following additional pending patent applications: U.S. Ser. No. 10/733,701, entitled "System and Method for Facilitating Home Ownership," filed on Dec. 11, 2003; U.S. Ser. No. 10/736,484, entitled "Systems and Methods for Facilitating the Flow of Capital Through the Housing Finance Industry," filed on Dec. 15, 2003; U.S. Ser. No. 10/324,090, entitled "Method and Apparatus for the Customization of an Automated Loan Underwriting System," filed on Dec. 20, 2002; U.S. Ser. No. 10/405,890, entitled "Electronic Mortgage Quality Control," filed on Apr. 1, 2003; and U.S. Ser. No. 60/533,851, entitled "System and Method for Facilitating Underwriting of Mortgage Loans," filed on Dec. 31, 2003.

BACKGROUND

The purchase of a home is typically the largest investment that a person makes. Because of the amount of money required to purchase a home, most home buyers do not have sufficient assets to purchase a home outright on a cash basis. In addition, buyers who have already purchased a home may wish to refinance their home. Therefore, potential home buyers consult lenders such as banks, credit unions, mortgage companies, savings and loan institutions, state and local housing finance agencies, and so on, to obtain the funds necessary to purchase or refinance their homes. These lenders offer mortgage products to potential home buyers or borrowers. Borrowers may also obtain information regarding available mortgage products from other types of advisors such as mortgage brokers and realtors.

Typically, when a borrower works with an advisor to obtain a loan, the advisor first obtains various financial and other information from the borrower. Using this information, the advisor selects a particular loan product for the borrower which the advisor perceives as likely being available to the borrower. The advisor may then use an on-line automated underwriting engine to obtain an underwriting recommendation for the particular mortgage product for the borrower.

In addition to underwriting, the borrower may be required to submit a number of other documents such as pay stubs to verify income, declarations that certain court judgments do not refer to them or encumber their property, and so on. In many instances, the information is not required initially, but is required upon further processing of the application. Managing the flow of information and the associated documents that include the information is often a formidable task, especially in situations where a large number of applications are being processed simultaneously.

Oftentimes, one or more individuals is charged with managing a large number of loan applications. Due to the high volume of applications, it is easy for the person responsible for a loan application to forget to inform the borrower that certain information is required or to not act as quickly on providing the information as would be desirable. These potential delays and the costs associated with managing the loan application in this manner serve to increase the overall cost of borrowing money to pay for the home—even to the point of preventing some borrowers from being able to achieve the dream of homeownership. At the very least, the cost associated with obtaining a loan may discourage present homeowners from taking advantage of lower interest rates by refinancing their current loan.

Reducing these costs would translate into greater savings to the home owner, more efficient allocation of resources through refinancing, and, ultimately, result in more families achieving the dream of homeownership. More families would achieve the dream of homeownership if a system was provided that made the process of originating a loan less labor intensive, more streamlined, and, ideally, less costly.

Accordingly, it would be advantageous to provide a system and method that make the loan origination process less labor intensive, more efficient and streamlined, and, ideally, less costly. It would be desirable to provide a system and method or the like of a type disclosed in the present application that includes any one or more of these or other advantageous features. It should be appreciated, however, that the teachings herein may also be applied to achieve systems and methods that do not necessarily achieve any of the foregoing advantages but rather achieve different advantages.

SUMMARY

An exemplary embodiment relates to a computer-implemented mortgage loan application data processing system comprising user interface logic and a workflow engine. The user interface logic is accessible by a borrower and is configured to receive mortgage loan application data for a mortgage loan application from the borrower. The workflow engine has stored therein a list representing tasks that need to be performed in connection with a mortgage loan application for a mortgage loan for the borrower. The tasks include tasks for fulfillment of underwriting conditions generated by an automated underwriting engine. The workflow engine is configured to cooperate with the user interface logic to prompt the borrower to perform the tasks represented in the list including the tasks for the fulfillment of the underwriting conditions. The system is configured to provide the borrower with a fully-verified approval for the mortgage loan application. The fully-verified approval indicates that the mortgage loan application data received from the borrower has already been verified as accurate using information from trusted sources. The fully-verified approval is provided in a form that allows the mortgage loan application to be provided to different lenders with the different lenders being able to authenticate the fully-verified approval status of the mortgage loan application.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

FIGS. 4-5 are underwriting conditions returned as a result of an underwriting operation.

FIGS. 26-54 are screen displays generated during operation of the system of FIGS. 1-2.

DETAILED DESCRIPTION OF EXEMPLARY EMBODIMENTS

1. Structure and Operation of Exemplary System

Figure 1:
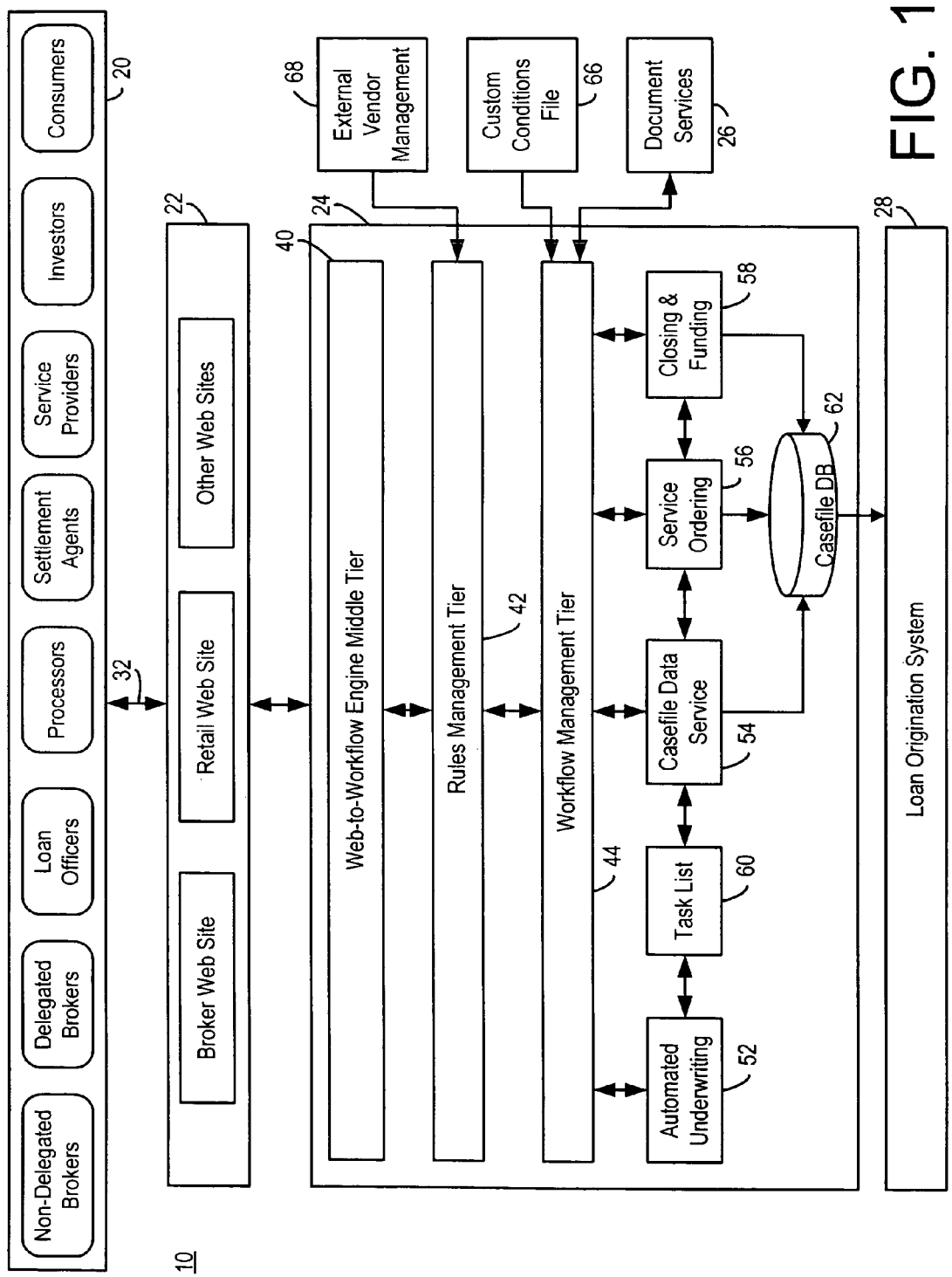
FIG. 1 is a block diagram of a mortgage loan data processing system.

Referring now to FIG. 1, a simplified schematic illustration of an exemplary mortgage process management system 10 is shown. System 10 may be used by users such as mortgage brokers, underwriters, loan officers, loan processors, service providers, consumers, and/or other persons and entities involved in processing a mortgage loan application. System 10 is usable to assist these entities with managing the flow of information and the associated documents related to the mortgage origination process.

In an exemplary embodiment, system 10 may be configured to support automation and integration of a lender's loan-processing activities by automatically generating, from underwriting findings, and other sources as appropriate, an actionable list of pre-closing tasks. The task list may list each pre-closing task along with its status (e.g. new, requested, in progress, complete), and provide access to automated support for performing that task. Tasks that involve the clearing of conditions, whether from the underwriting findings, pre-closing/closing conditions, lender conditions for a specific mortgage product or products, and/or conditions specific to an individual loan, may be processed from the task list. Likewise, any tasks that include ordering of services such as MI, flood certification, closing, etc., may also be processed from the task list.

In an exemplary embodiment, system 10 may be configured to provide processing support for each loan-processing task. For example, system 10 may step an individual user through the sub-tasks necessary to complete the task. System 10 may also permit the ordering, electronic receipt, viewing, and verification of any required documents through an integrated electronic document repository. Additionally, system 10 may provide work queue management capability to route and distribute tasks, on both the loan and condition levels, within a lender organization and/or among third parties. Additionally, system 10 may provide the ability to route tasks based on business preference, role, and/or competency.

In an exemplary embodiment, system 10 may be configured to provide detailed processing workflow through post-closing. Features may include task routing, task aging and prioritization, automated time-sensitive notifications and alerts, document and data reconciliation, outsourcing overflow processing, settlement service collaboration and task management, fraud management, time/task sensitive electronic quality control, data exchange, document exchange, automated processes, and/or trailing document management. In other embodiments, system 10 may be configured to provide features which are different than those described above.

In the exemplary configuration of FIG. 1, system 10 comprises computers 20, user interfaces 22, workflow processing system 24, document services logic 26, and loan origination system 28. Computers 20 are used by different types of users to gain access to system 10. The different types of users may be from institutions that serve different functions in originating a mortgage. As previously noted, system 10 may be used by users such as mortgage brokers, loan officers, loan processors, service providers, investors, consumers, and/or other persons and entities involved in processing a mortgage loan application. Herein, the term "consumer" is used generically to include any person or group of people that potentially will or will obtain a loan, and is used interchangeably with other like terms used herein including "potential borrower," "borrower," "potential home buyer," and so on. Computers 20 may comprise conventional input and display devices such as one or more desktop computers, laptop computers, personal digital assistants, handheld computers, Internet terminals, and so on.

User interfaces 22 may include different user interfaces for different types of users, such as a mortgage broker user interface for mortgage brokers, a loan officer user interface for loan officers, a loan processor user interface for loan processors, a settlement agent user interface for settlement agents, service provider user interfaces for service providers, an investor user interface for investors, and a consumer user interface for consumers. User interfaces 22 may be accessed by different users via computers 20 to perform such tasks as submitting a loan application for underwriting, viewing checklists, viewing status, ordering services, viewing documents, providing data, processing documents, clearing a mortgage application for closing, preparing a mortgage for sale in the secondary market, delivering the mortgage application for sale in the secondary market, managing user-configurable business logic and preferences in system 10, and so on. Additional, fewer, and/or different user interfaces 22 may also be provided. For example, depending on the type of entity that provides workflow processing system 24, the customers it serves and/or the partners/affiliates with which it conducts business, a different set of interfaces may be desirable.

User interfaces 22 may comprise screen displays and other data interchange tools (e.g., web pages) that elicit and receive information from users and that are preferably accessible to the users by way of a computer network 32. Computer network 32 may, for example, comprise one or more of the Internet or other globally and publicly accessible computing network, a local or wide area dedicated or private network, wireless network, dial-up services, etc. In the illustrated embodiment, workflow processing system 24 is a web-based tool that is accessible, at least partially, by way of the Internet, and the user interfaces 22 are websites. Websites 22 may provide web pages, computer-implemented tools, etc., to users using computers 20.

Workflow processing system 24 may comprise one or more physical or logical servers or other computers including a microprocessor and a memory programmed with control files comprising executable program instructions to provide the features described herein. To the extent that multiple servers or other computers are used, the various functions described herein may be distributed among the various computers.

Workflow processing system 24 may comprise multiple tiers of program logic in order to provide the features described herein. Such tiers may include a user interface tier 40, a rules management tier 42, and a workflow management tier 44. User interface tier 40 comprises user interface logic that provides user interfaces 22 to the different types of users using computers 20. As previously noted, in the illustrated embodiment, workflow processing system 24 is a web-based tool that is accessible, at least partially, by way of the Internet. In this embodiment, user interface logic 40 may be configured as a web-to-workflow engine middle tier that decouples the business and application logic of workflow processing system 24 from the presentation layer and that provides a web-based user interface comprising websites 22.

Figure 2:
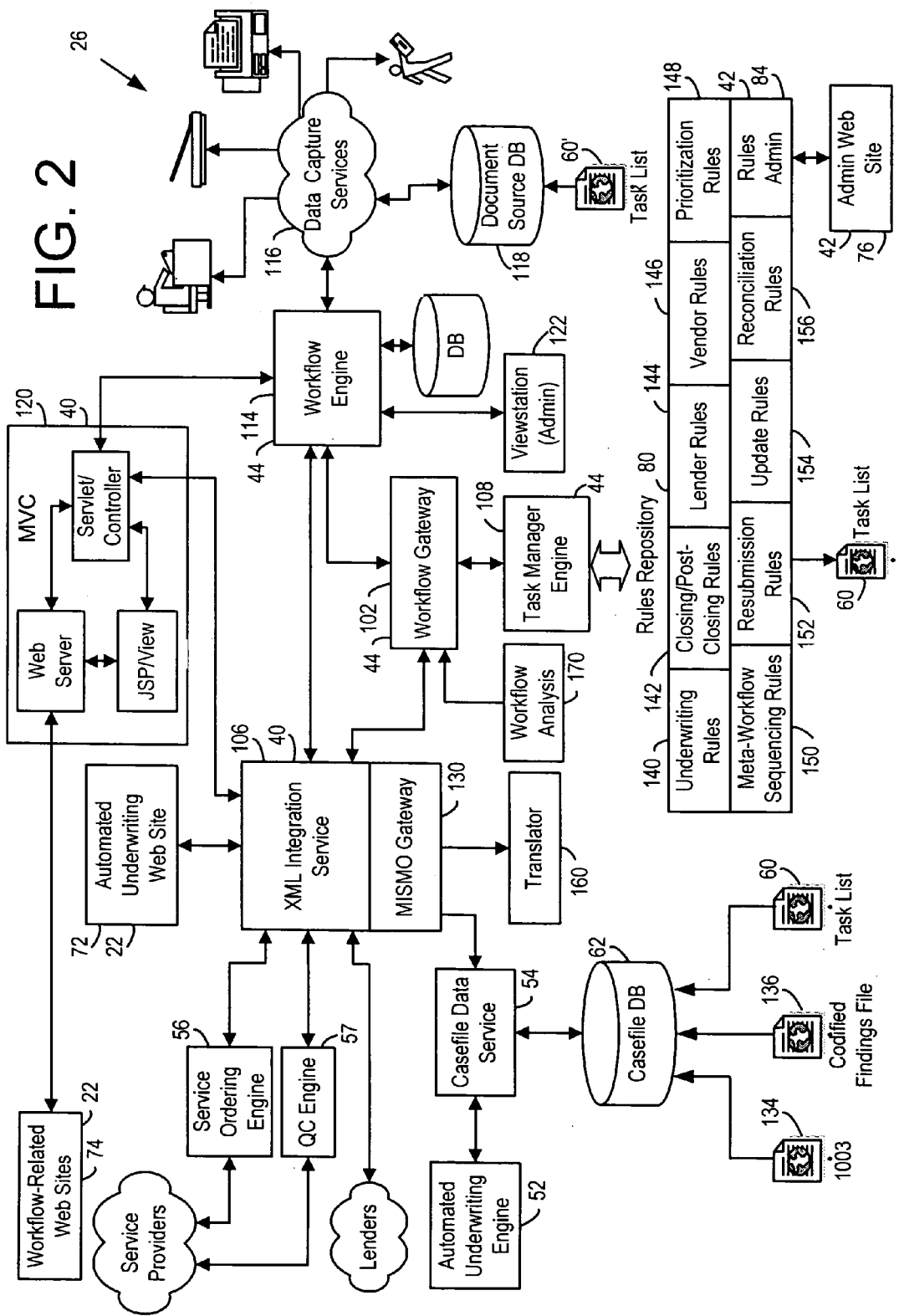
FIG. 2 is a diagram showing aspects of the system of FIG. 1 in greater detail.

Rules management tier 42 is useable to manage various rules stored in a rules repository 80 (FIG. 2). Such rules may include rules useable to process underwriting findings to generate a task list, rules useable to determine when a mortgage loan application should be resubmitted for underwriting, rules useable to reconcile task lists when a new task list is generated, rules useable by a lender to configure workflow sequencing, rules useable to facilitate vendor selection and management in connection with ordering services in connection with loan applications, rules useable to prioritize tasks to be performed, rules to implement lender-specific workflow sequences, rules useable to update loan application data, and so on, as will be described in greater detail below.

Workflow management tier 44 comprises logic for managing the flow of information and the associated documents related to the mortgage origination process. The flow of information is managed by generating, maintaining, and monitoring fulfillment of tasks identified in a task list 60. Task list 60 is generated from underwriting findings, and other sources as appropriate, and is used to track fulfillment of conditions for a mortgage loan application, including tracking documents and other data that have been obtained and entered in database 26 and/or database 62. Workflow management tier 44 also allows custom conditions to be received by way of a custom conditions file 66. For example, if the loan originator notes in the sales contract that the purchaser has conditioned purchase of the property based on completion of a successful home inspection, the successful completion of a home inspection may be entered as a condition. Workflow management tier 44 may further utilize other functional engines and resources, such as automated underwriting engine 52, casefile data service 54, service ordering engine 56, and a closing and funding engine 58. Operation of workflow management tier 44 is described in greater detail below in connection with FIG. 2.

Document services logic 26 comprises logic for automating or partially automating document management services, including services for loading documents and document-derived data into a database 118 (FIG. 2). For example, such services may include mail processing, image scanning indexing, long term vaulting, faxing, data entry, and so on, as described in greater detail below. Data that may be stored may include loan application data such as alphanumeric data and/or image data associated with loan application documents (e.g., 1003 forms, appraisal documents, real estate purchase contracts, pay stubs, W-2's etc.), data relating to one or more product characteristics of mortgage products offered by one or more lenders, and so on.

Loan origination system 28 may be a commercially available loan origination system operated by a lender. Loan origination system 28 may be used by a lender to collect mortgage application data from a borrower and to perform other functions in connection with originating a mortgage. Data collected from the borrower may be communicated to workflow processing system 24. In another embodiment, loan origination system 28 is included in the functionality offered by workflow processing system 24.

Mortgage process management system 10 (and particularly, workflow system 24) may be provided by any one or more of the different types of entities that serve the primary and secondary mortgage market. Herein, it will be assumed that system 10 is provided by a secondary mortgage market participant that routinely works with multiple lenders, e.g., such as an entity that operates as one or more of a mortgage purchaser, investor, guarantor, securitizer, and so on. In this configuration, system 10 may be configured to provide a standard system which may be used by multiple lenders, brokers, or other loan originators for originating a mortgage.

In an exemplary embodiment, the provider of system 10 operates as an application service provider to provide system 10 to multiple institutions. System 10 provides a complete package for an institution by making available to all institutions (even those without expertise to develop websites, develop and maintain software, hardware, etc.) the features and functionality disclosed. Further, system 10 may be brandable to reflect the corporate identities of different institutions. Institutions without expertise in website development and system administration are provided with a brandable system that they can configure with their own logos, color schemes, fonts, and text messages to provide the system with a "look and feel" that is consistent with their corporate identity.

Providing system 10 in this manner helps reduce mortgage origination costs for the other institutions and, ultimately, for the consumer. Further, by reducing mortgage origination costs, system 10 facilitates to flow of capital through the housing finance industry. Of course, other configurations are possible which achieve different advantages. For example, in another embodiment, system 10 may be provided as a system custom-built for a lender and not necessarily made to available to other lending institutions.

Referring now to FIG. 2, FIG. 2 is a block diagram showing selected aspects of FIG. 1 in greater detail. As shown in FIG. 2, websites 22 include an automated underwriting website 72 accessible to lenders and brokers for submitting mortgage loan applications for underwriting, workflow websites 74 accessible to various users for performing loan processing (e.g., viewing checklists, viewing status, ordering services, viewing documents, processing documents, clearing loans for closing, preparing loans for sale, delivering loans, and so on), and an administrative website 76 accessible to users for managing rules stored in a rules repository 80. Additionally, web-to-workflow engine middle tier 40 comprises XML integration service logic 106 and master-view-controller (MVC) logic 120. Further, rules management tier 42 comprises rules administration logic 84 which is coupled to rules repository 80. Additionally, workflow management tier 44 comprises workflow gateway 102, task manager engine 108, and workflow engine 114.

Figure 3:
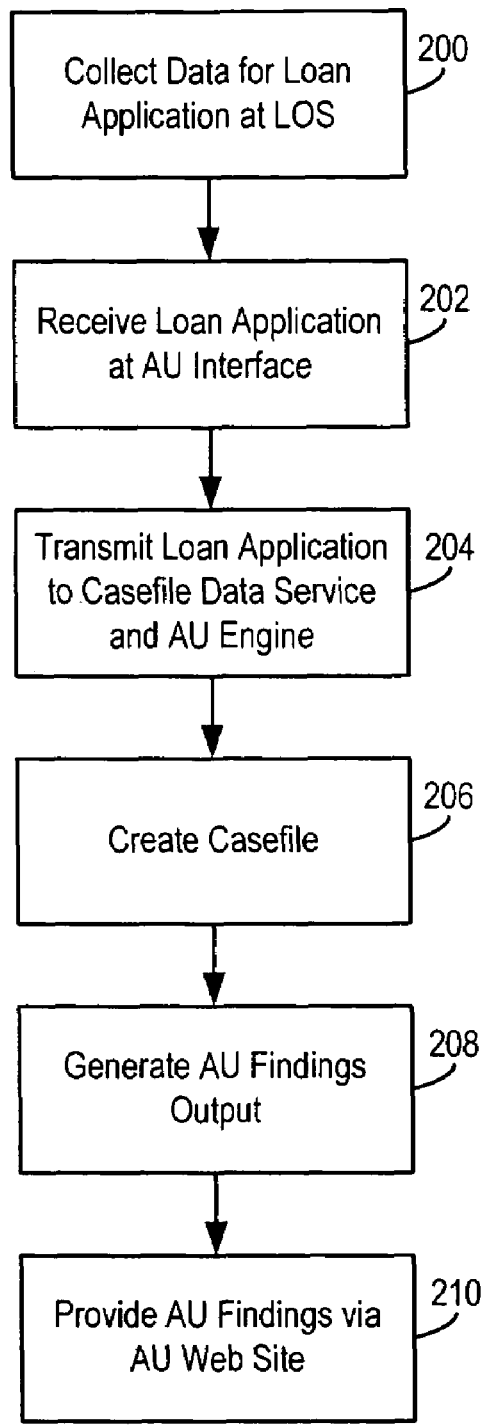
FIG. 3 is a flowchart showing operation of the system of FIGS. 1-2 during an underwriting operation.

Referring now also to FIGS. 3-4, the operation of the system shown in FIG. 2 will now be described. Referring first to FIG. 3, FIG. 3 is a flowchart showing operation of the system of FIG. 2 when a mortgage loan application is initially collected and submitted to automated underwriting engine 52. At step 200, loan application data (e.g., Form 1003 loan application data) is collected from a consumer using loan origination system 28 (FIG. 1). Step 200 may be performed using loan origination system 28. Step 200 may also be performed, for example, using the systems and processes described in connection with FIGS. 11-31 of the above-referenced U.S. patent application Ser. No. 10/736,484, entitled "Systems and Methods for Facilitating the Flow of Capital Through the Housing Finance Industry," filed on Dec. 15, 2003, or FIGS. 6-18 of the above-referenced U.S. patent application Ser. No. 10/733,701, entitled "System and Method for Facilitating Home Ownership," filed on Dec. 11, 2003, and accompanying discussion. The loan application data may be received from a user via a consumer-direct interface, a trusted advisor interface, a call center interface, etc.

At step 202, a user such as a mortgage broker or lender may access automated underwriting website 72 to submit the mortgage loan application for automated underwriting. In practice, website 72 may be configured to interact with loan origination system 28, such that the broker or lender may collect mortgage loan application data from the borrower and submit the mortgage loan application for underwriting without having to manually re-key the mortgage loan application data. Alternatively, website 72 may be a stand-alone website that is not integrated with a loan origination system (e.g., user enters 1003 data directly). Website 72 may be implemented in accordance with the teachings of U.S. Prov. Pat. App. Ser. No. 60/533,851, entitled "System and Method for Facilitating Underwriting of Mortgage Loans" filed Dec. 31, 2003. Website 72 may also be a website that is accessible directly by a consumer (e.g., if a lender provides a website that is useable by a consumer to complete a loan application on-line). Loan application data may be received from loan origination system 28, for example, in the form of an XML file. The loan application data is received via automated underwriting website 72 and transmitted to XML integration service logic 106. XML integration service logic 106 provides an XML interface for exchanging information, e.g., in the form of XML files.

XML integration service logic 106 then transmits the loan application data to casefile data service logic 54 by way of MISMO gateway 130 (step 204). MISMO gateway 130 provides an interface for processing electronic loan applications in compliance with standards set by the Mortgage Industry Standards Maintenance Organization (MISMO). Upon receiving the loan application data, casefile data service 54 creates a new casefile for the loan application and stores the loan application data in the form of a file 134 in casefile database 62 (step 206). The loan application data is also transmitted to automated underwriting engine 52, which generates output in the form of underwriting findings (e.g., a codified findings file 136) (step 208). The underwriting findings are then returned to the user via XML integration service logic 106 and provided to the user via automated underwriting website 72 (step 210).

Referring now to FIGS. 4-5, FIGS. 4-5 depict screen shots showing human-readable messages that may be provided via website 72 and that reflect conditions contained in the codified findings file 136. The lender and consumer messages describe various documents and other items that need to be obtained. System 10 manages the workflow associated with obtaining and tracking the conditions in the codified findings file as reflected in FIGS. 4-5. Likewise, for closing tasks and post-closing tasks, system 10 manages the workflow associated with performing additional tasks as needed.

Figure 6:
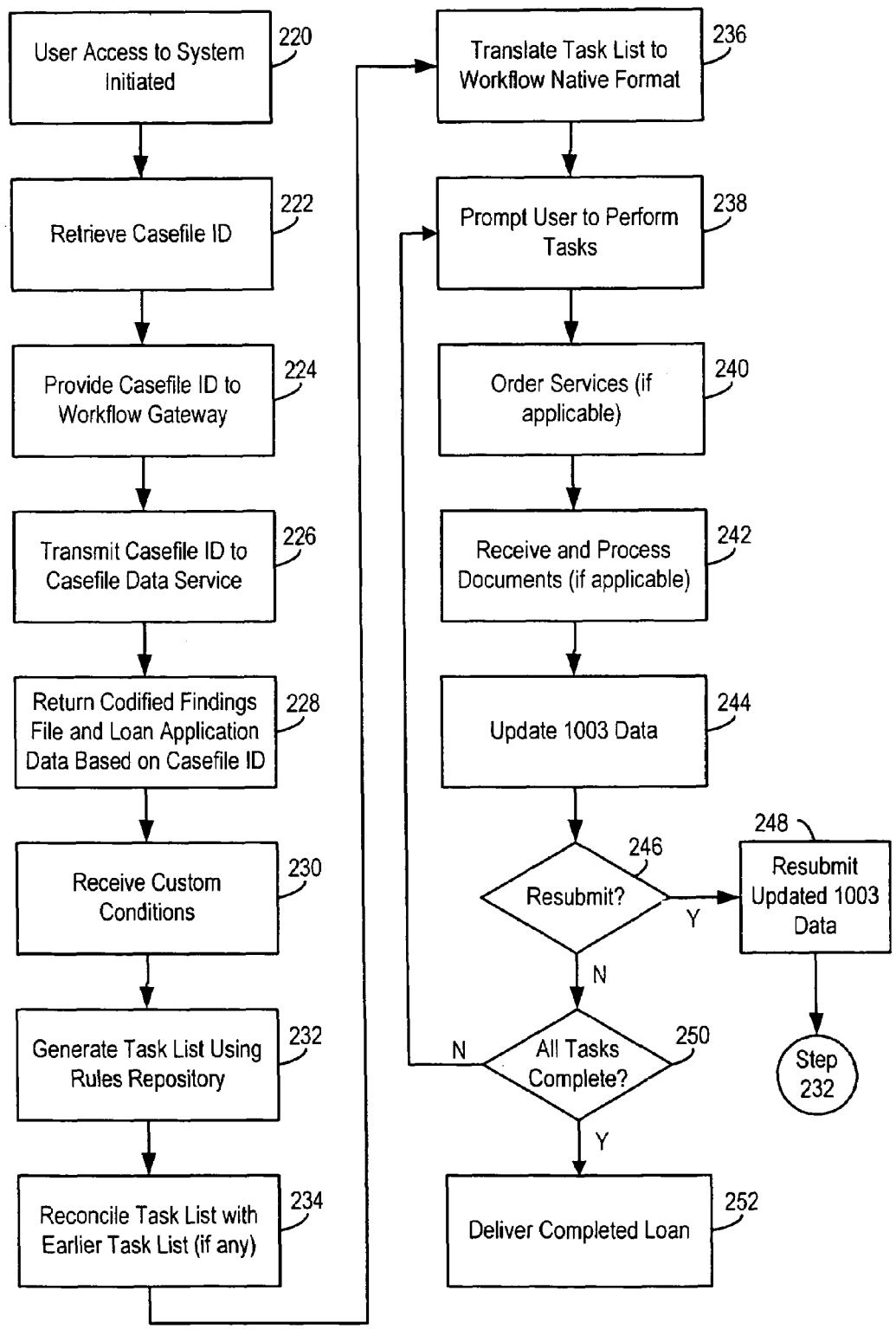
FIG. 6 is a flowchart showing operation of the system of FIGS. 1-2 to manage workflow in connection with a mortgage application.

Referring now also to FIG. 6, FIG. 6 is a flowchart showing operation of the system of FIG. 2 during processing of a mortgage loan application. In order to use the workflow processing capabilities of workflow processing system 24, a user is provided access to workflow processing system 24 by way of workflow websites 74 (step 220). Exemplary screen displays that may be provided via websites 74 are shown in FIGS. 27-50, described in greater detail below. Websites 74 are coupled to workflow engine 114 by way of master-view-controller (MVC) logic 120, which is a web presentation package used to provide a web presentation of data from workflow engine 114 via websites 22. MVC logic 120 decouples the business and application logic of workflow processing system 24 from the presentation layer.

In order to permit a user to perform processing in connection with a particular loan application, a casefile ID is retrieved from the user via websites 22 (step 222). The casefile ID may be retrieved, for example, by user interface 22 responsive to user inputs elicited via a web page. For example, a user may enter the casefile ID of an active loan application via an appropriate data entry field on a web page. Alternatively, a user may be presented with a list of loans (e.g., as a result of a search conducted) and, in response, a selection of one of the loans may be received from the user.

The casefile ID for the selected loan is then transmitted to workflow gateway 102 (step 224). In an exemplary configuration, workflow gateway 102 provides an interface to traffic information back and forth between workflow management tier or system 44 (including task manager 108 and workflow engine 114) and other logic (such as automated underwriting engine 52, service ordering engine 56, quality control engine 57, and so on) that may be widely used by other systems external to system 10.

Workflow gateway 102 transmits the casefile ID to casefile data service 54 (step 226). Casefile data service 54 uses the casefile ID to access casefile database 62, which stores loan application data 134 and a codified findings file 136 for the loan. Casefile data service 54 returns loan application data 134 and codified findings file 136 associated with the casefile ID to workflow gateway 102 (step 228). As will be described in greater detail below, if processing has previously occurred with respect to the loan application and a task list 60 is already in existence, then the pre-existing task list 60 is also returned to workflow gateway 102.

In one embodiment, workflow gateway 102 is further configured to receive other conditions from a user by way of XML integration service logic 106 (step 230). XML integration service logic 106 permits one or more additional conditions to be received from the user, for example, in the form of a custom conditions file 66, which may be another XML file. Any conditions received by way of custom conditions file 66 may then be added to conditions specified in the codified findings file 136. For example, as previously mentioned, if the loan originator notes in the sales contract that the purchaser has conditioned purchase of the property based upon completion of a successful home inspection, the successful completion of a home inspection may be entered as a custom condition.

Workflow gateway 102 cooperates with task manager 108 to generate task list 60 based on the conditions identified by underwriting engine 52 and the conditions provided by the user (step 232). In an exemplary embodiment, task list 60 takes the form of an XML document. In the preferred embodiment, workflow gateway 102 provides the codified findings file 136 and custom conditions file 66 to task manager 108, and task list 60 is generated by task manager 108 using rules in rules repository 80. It will be appreciated, however, that functions may be distributed in other ways. For example, these operations could instead be performed by workflow gateway 102, or logic could be combined.

Task manager 108 parses the codified findings file 122. Based on the codified findings file 122, task manager 108 generates task list 60 and associated messages. Herein, "task manager" refers to logic that manages the performance of tasks in connection with a loan application. Herein, "condition" refers to a requirement that is to be met. For example, an underwriting conditions may accompany a particular underwriting recommendation, e.g., a loan may be recommended for approval conditioned upon one or more requirements being met. As shown in FIGS. 4-5, examples of such conditions or requirements include requirements that particular documents be provided, requirements that particular information in the loan application be verified, and so on. Herein, a "task" refers to an action that needs to be performed during processing of the loan application (e.g., automatically or manually) in order for a condition to be fulfilled. For example, if income verification is a condition of a loan being recommended for approval, tasks may include ordering a copy of the borrower's W-2, receiving the copy of the W-2, and comparing the income as reported on the W-2 with the income as reported by the borrower. Tasks are sometimes referred to herein as sub-conditions. Each different condition that is identified in the codified findings file 136 maps to one or more tasks that need to be performed in order for the condition to be fulfilled. Conditions may also come from other sources, such as conditions related to closing and post-closing. Reference is also made herein to various types of lists related to conditions and tasks (e.g., task lists, checklists, conditions lists, document checklists, shared checklists, and so on). All such lists are representative of tasks that need to be performed in connection with one or more loan applications. Herein, the term "list" is used to refer to any stored data structure that comprises a plurality of data items (e.g., a plurality of tasks). The term "list" is not meant to be limited in any way with regard to the manner (e.g., format, arrangement, location, grouping, sequentialness, etc.) in which the data items are stored, and is not meant to preclude data other than the listed data items being included in the data structure.

Task manager 108 includes a rules repository 80. In order to generate task list 60 from codified findings file 136 at step 232, task manager 108 accesses rules repository 80. Rules repository 80 contains various business rules that govern business processes, requirements around findings, conditions, verification and closing tasks that need to be performed, and so on.

In particular, to generate task list 60 at step 232, task manager 108 accesses underwriting rules 140. Underwriting rules 140 are used to process loan application data 134 and codified findings file 136 generated by underwriting engine 52 to generate task list 60. As indicated above, typically, each different condition that is identified in the codified findings file 136 maps to one or more tasks that need to be performed in order for the condition to be fulfilled. Underwriting rules 140 store the manner in which conditions map to tasks. Task manager 108 may also access closing and post-closing rules 142, which may be comprise rules for tasks relating to such things as scheduling closing services, title recording, quality control, funding, delivery, and so on. Closing and post-closing rules 142 may be custom-configured (created, modified, etc.) by a lender by accessing rules administration website 76. Rules administration website is provided by rules administration interface logic 84, which implements rules management tier 42 (FIG. 1).

Task manager 108 further accesses lender rules 144 to generate task list 60. Lender rules 144 are lender-specific rules for processing loan application data 134 and codified findings file 136. For example, a lender may offer one or more custom mortgage products, and lender rules 144 allow the lender to provide customized rules for the custom mortgage products. As another example, a lender may have a special lending program for customers that conduct other business with the lender, such that the lender has additional information regarding the customer which allows the lender to provide a mortgage with minimal documentation. Lender rules 144 may be custom-configured (created, modified, etc.) by a lender by accessing rules administration website 76.

Task manager 108 further accesses vendor rules 146. Vendor rules 146 may either be accessed to generate task list 60, or may be accessed later during processing of task list 60. Vendor rules 146 are used to determine which service providers are selected to perform services in connection with a mortgage loan application. Preferably, various service providers which may provide services in connection with mortgage loan applications may have access to system 10. Vendor rules 146 may store information concerning the different relationships lenders or mortgage brokers may have with vendors, such that the different relationship may be taken into account. Vendor rules 146 are described in greater detail below in connection with FIG. 11.

Task manager 108 further accesses prioritization rules 148. Prioritization rules 148 may either be accessed to generate task list 60, or may be accessed later during processing of task list 60. Prioritization rules 148 may be used to determine the priority with which various tasks are performed relative to each other. Prioritization rules 148 may embody various business rules and algorithms that determine task priorities based on a variety of conditions. Prioritization rules 148 are discussed in greater detail below in connection with FIGS. 18-20.

Task manager 108 further accesses meta workflow sequencing rules 150. Sequencing rules 150 may either be accessed to generate task list 60, or may be accessed later during processing of task list 60. Meta workflow sequencing rules 150 provide a lender with the ability to store proprietary workflow sequences. Different workflow sequences may be more efficient than others, may detect problems earlier, or may avoid problems altogether. For example, fallout may be more likely to occur at some steps than at others, so it may be more efficient to perform those steps first. As another example, prompt follow-up in connection with certain conditions may prevent a borrower from falling out of the pipeline. Meta workflow sequencing rules 150 instruct workflow engine 114 when to prompt the processor to perform certain tasks, and allow tasks to be resequenced or performed in different orders, e.g., a fraud check may be performed before mortgage insurance is obtained in one case, and a fraud check may be after before mortgage insurance is obtained in another case. Rather than have two different workflows, there is one workflow and the order of the tasks is controlled by meta workflow sequencing rules 150. This allows system 10 to incorporate proprietary ways of sequencing the order in which tasks are performed that a lender may possess. Workflow sequencing rules 150 may also be used to control routing of tasks to different loan processors within an organization. This allows an organization to control the way in which tasks are delegated to different types of processors and/or processors with different skill levels/qualifications. Meta workflow sequencing rules 150 may be used alone or in combination with other routing/sequencing/prioritization rules described herein, for example, to provide a lender with additional ability to customize such rules. Meta workflow sequencing rules 150 may at least in part be implemented by providing a user interface which provides access to a process definition language, such as specified by Workflow Management Coalition, the international organization of workflow vendors, users, analysts and university/research groups (www.wfmc.org).

Figure 7:
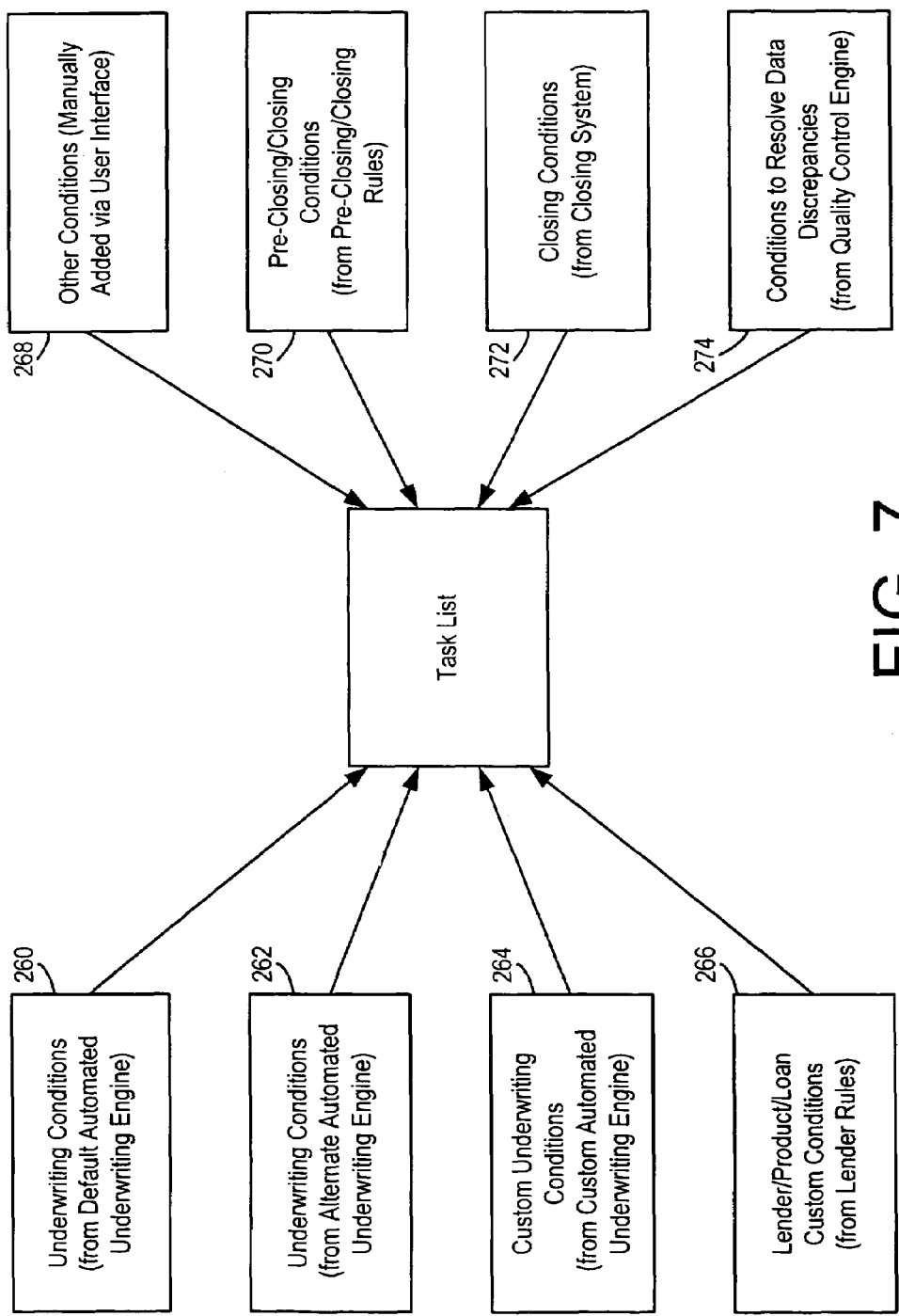
FIG. 7 is a diagram showing sources of tasks in a task list generated by the system of FIGS. 1-2.

Referring now to FIG. 7, conditions used to generate task list 60 may come from a variety of sources, some of which have already been described. For example, task list 60 may be generated based on underwriting conditions 250 from automated underwriting engine 52, as previously described.

As an alternative to having task list 60 be generated by task manager 108 based on underwriting conditions 250, task list 60 may be generated at least partially externally to system 10 and received via XML integration service 106. This configuration would allow system 10 to accept input from other commercially available automated underwriting engines (not shown), so that conditions 252 from the other underwriting engines may be processed. In the preferred embodiment, a standard task list format is defined, and the information received from the other underwriting engines is provided in the form of a task list 60 having the same standard format as a task list 60 generated by task manager 108. That is, if automated underwriting engine 52 is used, a task list 60 is used which is generated by task manager 108 based on underwriting conditions 250. If another commercially available underwriting engine is used, a task list 60 is used which is provided by way of XML integration service 106 by the lender or loan originator using the other commercially available underwriting engine. In this case, task list 60 may be generated by the other commercially available underwriting engine, or by software that is coupled between the other commercially available underwriting engine and XML integration service 106. In another embodiment, task manager 108 may be provided with a separate interface for the other commercially available automated underwriting engines such that information from other automated underwriting engines (e.g., in the form of a codified findings file or other similar file) may be converted to a standard format which is provided to task manager 108. Task manager 108 may then generate a task list 60 based on a codified findings file from the other commercially available automated underwriting engine.

Regardless whether task list 60 is generated based on underwriting conditions 250 from automated underwriting engine 52, or whether it is generated based on underwriting conditions 252 from other automated underwriting engines, task list 60 may further include tasks associated with conditions from other sources. For example, task list 60 may further include tasks associated with conditions from a lender customizable underwriting engine. For example, underwriting engine 52 may be made lender customizable by adding rules logic to allow lender-specific underwriting conditions 254 to be added, as described in the above-mentioned '090 application. As described therein, an administrative interface may be provided which provides tools useable by users at different lenders to create and manage lender-specific underwriting rules and to associate the plurality of sets of lender-specific underwriting rules with a plurality of institution identifiers. The administrative user interface for the customizable underwriting engine may be separately provided or may be combined, for example, with administrative website 76. Routing logic may be included to determine whether to route a mortgage loan application for evaluation by the rules logic, for example, based on product type. To the extent that lender customization of underwriting engine 52 results in fewer conditions, fewer tasks may be added to task list 60.

Tasks based on other conditions (266, 268, 270) may allow other conditions not directly associated with underwriting to be taken into account, and to allow lenders other ways to add tasks to task list 60. A list of other lender and/or product specific conditions that must be met before the loan is approved (e.g., closing, title, etc.) may be utilized. That is, in addition to being able to generate standard workflow conditions based on automated underwriting findings, system 10 is also be able to generate lender-specific workflow conditions. The workflow conditions may be generated based on customizations at the lender level, applying to all loans made by a lender. For example, a lender may want a certain piece of information from all borrowers that is in addition to the information required by a secondary mortgage market purchaser. The workflow conditions may also be generated based on customizations at the product level. For example, the lender may want a certain piece of information from all borrowers, but only in connection with certain mortgage products. The workflow conditions may also be generated based on customizations at the casefile level, e.g., based on specific aspects of a certain transaction. Thus, loan processors are provided with the ability to add conditions that cannot be automatically generated based on the codified findings file 136. In the event that a lender or settlement agent uses a closing system to automate settlement procedures, conditions 272 generated by the closing system may be received by system 10 via an XML file at XML integration service 106 and incorporated into task list 60. Conditions or tasks 274 to resolve data discrepancies may also be generated based on output of quality control engine 57, as described below. System 10 may be used to facilitate processing of conditions 262-274 from such other sources in the same manner as it is used to process conditions 260 from underwriting engine 52.

Referring again to FIG. 2, for loans that have been previously processed, task manager 108 also performs a reconciliation (step 234) of the task list 60 generated based on the most recent codified findings file 122 and the pre-existing task list 60 that was generated as a result of the previous underwriting. Reconciliation is performed using reconciliation rules 156. Operation of task manager 108 in reconciling task lists 60 is described in greater detail below in connection with FIG. 14.

Once task list 60 has been generated, it is transmitted to workflow engine 114. Preferably, task list 60 is transmitted to workflow engine 114 by way of translator 160. Translator 160 translates (step 236) task list 60 to an XML format that is native to workflow engine 114. For example, where different workflow engines have different generic jobs defined, translator 160 determines which jobs should be called by workflow engine 114 for each document. Workflow engine 114 may for example, be implemented using the Automated Work Distributor system available from DST Systems, Inc., 333 W. 11th Street, Kansas City, Mo. 64105 (www.awdbpm.com).

Utilization of translator 160 in combination with permitting lender customization of rules stored in rules repository 80 facilitates integration of system 10 with other existing systems and facilitates providing system 10 as an application that is made available to multiple lenders by an application service provider. Workflow engine 114 may be any one of a number of commercially available workflow engines. Translator 160 provides an interface which allows multiple different commercially available workflow engines to be used by providing different translator logic for each of the different workflow engines. This may be advantageous, for example, where different lenders employ different workflow engines, and it is desirable to provide system 10 such that it integrates seamlessly with existing workflow engines of the different lenders. Also, there is no need for a different instance of the workflow engine 114 to be executing for each different lender.

Additionally, as previously indicated, business logic (e.g., for determining when particular documents need to be obtained, for determining who orders and reviews the document, for determining when the document is ordered, and so on) is contained in rules repository 80. Silo-able rules may be created for each lender in rules repository 80. As a result, workflow engine 114 may be a generic workflow engine, that is, a workflow engine that is substantially devoid of mortgage processing business logic and that instead comprises relatively generic logic not particularly tied to mortgage loan application processing (e.g., containing document processing logic for allowing a user to request a document, receive a document, review a document, and so on). Such logic may be reused in many different ways in prompting the user to perform different tasks identified in task list 60. Permitting lender customization in rules repository 80 rather than in workflow engine 114 permits the same workflow engine 114 to be used for each different lender.

In another exemplary embodiment, workflow engine 114 and task manager 108 (including rules repository 80) are provided in integrated fashion. In this embodiment, task manager logic for generating task lists may reside with workflow engine 114. This embodiment may be used, for example, in an embodiment that is used in connection with only one lender rather than multiple different lenders.

After task list 60 is received at workflow engine 114, workflow engine 114 coordinates processing of the loan application based on task list 60. Workflow engine 114 prompts users (step 238) via workflow websites 74 to perform tasks identified in task list 60, to order services (step 240) and to receive and process documents (step 242) to fulfill underwriting conditions. Exemplary tools for service ordering are described in greater detail below in connection with FIGS. 9-11. Also, as will be appreciated, depending on the number of conditions identified, steps 238-242 may be performed numerous times during processing of a loan application. Steps 238-242 are described in greater detail in connection with FIGS. 21-25.

Workflow engine 114 may include various components, such as an XML transformer, a decision engine, a view server, an application server, and/or other components. Workflow engine 114 creates work objects and sources. Workflow engine 114 parses the XML file received from the translator 160. An administrative interface 122 may also be provided for workflow engine 114 to allow administrative functions in connection with workflow engine 114 to be performed.

In step 242, tasks that involve the collection of documents, either paper or electronic, may be fulfilled through the submission and/or receipt of those documents by data capture services logic 116. Data capture services logic 116, which is coupled to data base 118, is used to implement an electronic document repository. Data capture services logic 116 comprises logic for automating or partially automating document management services, including services for loading documents and document-derived data into database 118. For example, such services may include mail processing, image scanning indexing, long term vaulting, faxing, data entry, and so on, as described in greater detail below. Data that may be stored may include loan application data such as alphanumeric data and/or image data associated with loan application documents (e.g., 1003 forms, appraisal documents, real estate purchase contracts, pay stubs, W-2's etc.), data relating to one or more product characteristics of mortgage products offered by one or more lenders, and so on. Documents may be made available for viewing by some or all of the relevant users (e.g., lender, third-party originator, consumer). Database 118 provides a file management system for managing electronic copies of documents and associating particular documents and electronic data with particular mortgage loan applications. Operation of data capture services logic 116 is described in greater detail below in connection with FIG. 8. Exemplary screen displays that may be provided as data is captured and processed using data capture services logic 116 and websites 74 are shown in FIGS. 27-50, described in greater detail below.

As services are ordered and loan documents are collected, loan application data may be updated (step 244). Update rules 154 are used to process data received as a result of loan processing to update loan application data for a loan application. For example, information contained in the loan application data file 134 may be updated based on data extracted from a W-2, so that the loan the lender has underwritten exactly matches the loan the lender delivers. The updated 1003 data may be transferred back to the loan origination system 28, so that the updated information may be reflected in the loan documents. The system may also provide the ability to update non-1003 specific data, typically found in an loan origination system, into any system including, but not limited to, additional products, systems of record and delivery systems. Update rules 154 may also be used to provide the updated information to other systems, such as automated underwriting engine 52.

Resubmit rules 152 are used to determine how to proceed if a discrepancy is detected between information provided by the borrower and information obtained from trusted sources. Particularly, resubmit rules 152 are used to determine whether to resubmit a loan application for underwriting (step 246). If a discrepancy is detected between the information provided by the borrower and information obtained from the trusted sources is sufficiently substantial, the loan application may be resubmitted for underwriting (step 248). Resubmit rules 152 may also be used for related tolerance processing to take different courses of action based on whether and by how much the discrepancy exceeds other tolerances (e.g., provide an alert to the user, provide a fraud alert, send an e-mail, and so on). When the loan application is resubmitted for underwriting, the loan application data file 134 as updated in step 244 is provided to automated underwriting engine 52. The process then returns to step 232, where an updated task list 60 is generated. Resubmission using resubmit rules 152 is discussed in greater detail below in connection with FIG. 13.

Steps 232-248 repeat in iterative fashion as all of the necessary documentation is collected and other tasks in connection with processing of the mortgage loan application are completed. Each document may require a different set of workflow steps to move toward completion status. The iterative process of steps 232-248 is described in greater detail below in connection with FIGS. 21-25. Eventually, when it is determined that all tasks are complete (step 250), the completed loan is ready for delivery (step 252). As will be appreciated, the steps in FIG. 6 need not be performed in any particular order and, in some scenarios, many of the steps may be performed in a different order or skipped altogether, as is the case with other processes described herein.

System 10 may further include workflow analysis logic 170 which is coupled to receive information regarding loan processing, e.g., from workflow gateway 102. Workflow analysis logic 170 includes performance modeling logic 1202, fallout prediction logic 1204, pipeline risk management logic 1206, credit policy analysis logic 1208, and fraud detection logic 1210, as discussed in greater detail below in connection with FIGS. 55-57.

Quality control engine 57 may be used to determine that an electronic mortgage document has undergone a computer-implemented quality control process that verifies the content of the electronic mortgage dataset and to verify that the paper mortgage documents correspond to the electronic mortgage data. Quality control engine 57 may be used to check data integrity, validity and consistency across multiple electronic and paper forms that have been digitized. An exemplary implementation of electronic quality control engine 57 is further described in above-referenced U.S. patent application Ser. No. 10/405,890, entitled "Electronic Mortgage Quality Control," filed Apr. 1, 2003. Quality control engine 57 may be integrated with the document checklist to perform quality checks against the document checklist. For example, this may be provided to the extent in which (i) documentation received by an electronic service order, (ii) the validation points of documents received in a digitized format, and (iii) the electronic documents resident in existing systems (such as the uniform residential loan application and credit report) may be validated against one another resulting in an itemized description of differences and/or a list of tasks resulting from the differences. As shown in FIG. 7, conditions or tasks 274 generated as a result of operation of quality control engine 57 may then be incorporated into task list 60, so that further processing of the loan application may be performed (e.g., ordering of new documents and so on) in order to reduce or eliminate the differences. Differences identified by quality control engine 57 in the same manner as differences identified by resubmission rules 152, as described below.

Figure 8:
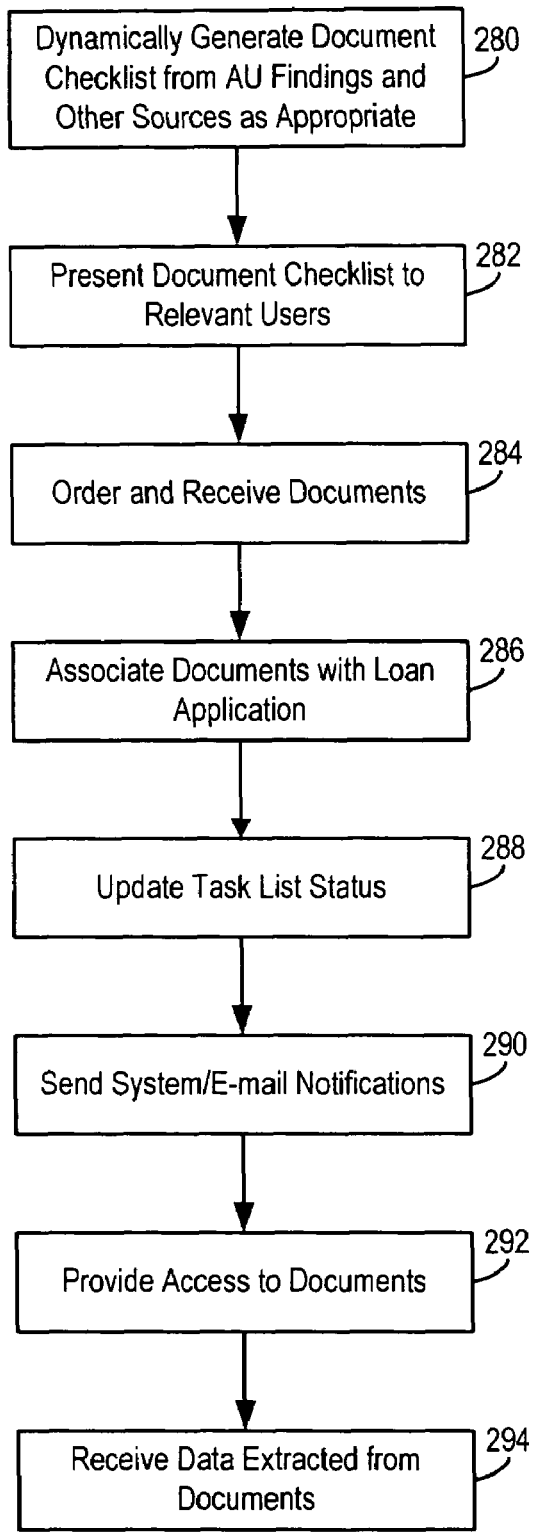
FIG. 8 is a flowchart showing operation of the system of FIGS. 1-2 to manage document ordering and processing in connection with a mortgage application.

Referring now to FIG. 8, data capture services logic 116 will now be described in greater detail. Data capture services logic 116 may comprise logic for automating or partially automating document management services, including image capture and image processing logic for loading documents and document-derived data into database 118. Data capture services logic 116 may be relatively generic logic, that is, comprising logic for scanning in documents, associating documents with particular files, and so on. Data capture services logic 116 may be relatively devoid of mortgage processing business logic related to mortgage loan application processing, such as logic for determining what information gets displayed to which users, what processing is required, and so on. As in the case of workflow engine 114, business logic for driving operation of data capture services logic 116 is preferably contained in rules repository 80, workflow gateway 102, and task manager 108. As a result, where existing lender systems already include data capture systems for other business operations, system 10 may integrate more seamlessly with the existing lender systems.

Data that may be stored may include loan application data such as alphanumeric data and/or image data associated with loan application documents (e.g., 1003 forms, appraisal documents, real estate purchase contracts, pay stubs, W-2's etc.) and other data. Documents may be stored in database 118 and be made available for viewing by some or all of the relevant users (e.g., lender, third-party originator, consumer). Database 118 provides a file management system for managing electronic copies of documents and associating particular document images and alphanumeric data with each other and with particular mortgage loan applications. Although database 118 and database 62 are shown as two separate databases, it will be appreciated that database 118 and database 62 may also be implemented using a single database, or may be used to store duplicate copies of the same information.

FIG. 8 shows operation of system 10 including data capture services logic 116 in greater detail, as well as other components such as workflow engine 114, service ordering engine 56, task manager 108, and so on. It may also be noted that exemplary screen displays that may be provided as data is captured and processed using data capture services logic 116 and websites 74 are shown in FIGS. 27-50, described in greater detail below in Section 3.

At step 280, a document checklist is generated. The document checklist is configured to facilitate document ordering and processing by listing documents necessary to satisfy all or substantially all underwriting and pre-closing conditions. The document checklist provides users (lenders, processors, underwriters, brokers, consumers) with the ability to view the status and retain a record of the various steps that have been taken to order and receive the documentation. The document checklist may be configured to be a dynamic tool enabling users to submit and communicate information and statuses and may be generated for each loan/casefile submission.

The document checklist may be generated automatically or may be generated responsive to user inputs, for example, depending on the level of integration with loan origination system 28. At least some level of integration between the lender's loan origination system and the remainder of system 10 is useful in order to facilitate the exchange of information. If a greater degree of integration exists, the document checklist may be set up automatically and may be made accessible with a link made available in the user interface of the loan origination system. If a lesser degree of integration exists, manual set up may be required by the designated casefile owner and the document checklist may be made accessible by e-mailing the appropriate loan processor a web URL for the document checklist for the particular casefile. It may also be desirable to allow lender configurability of the document checklist in order to allow a lender administrator to manually designate in the document checklist such things as which processors should perform certain tasks or which vendors should provide certain services in connection with the loan application.

The document checklist is preferably generated based at least in part on codified findings file 136. In an exemplary embodiment, the document checklist is generated based on task list 60, which in turn is generated based on codified findings file 136. The document checklist is itself a task list in that it lists multiple tasks to be performed (i.e., it lists multiple documents that need to be obtained). Herein, however, the term "document checklist" is used specifically to refer to a task list which is presented to a user via a graphical user interface and which lists multiple documents that need to be obtained. Preferably, the document checklist is only a list of documents that need to be obtained, and does not include other tasks that need to be performed (e.g., a task to order closing services, a task to order mortgage insurance, and so on). The document checklist may represent conditions contained in the codified findings file that require action on the part of the consumer, loan originator, processor, and so on, for example, in the categories of eligibility, credit, employment/income, required funds and appraisal. Also, the document checklist may provide an indication of the status (e.g., "document requested," "document received," and so on) for at least some of the needed documents. Various other information for each document may also be shown, such as a date/time stamp, a submission date/time, a status change date/time, and so on. An exemplary document checklist is shown in FIG. 32, described in greater detail below.

The document checklist may also be organized in a variety of ways. For example, documents on the document checklist may be organized by borrower or by document type or document category. For example, the document checklist may be organized by borrower to provide a list of documents required for a particular borrower. This may be useful where a user is processing the mortgage application of a particular borrower. The document checklist may also be organized by document type to provide a list of same-type documents that need to be obtained. For example, if a particular processor specializes in ordering and processing property appraisals, the processor may be presented with a document checklist showing the status of appraisals that need to be obtained/reviewed in connection with different mortgage loan applications for different borrowers. Some users (e.g., processors, brokers) may have the option of selecting the manner in which they wish to view the document checklist (e.g., by borrower, by document type, and so on).

At step 282, a document checklist is displayed or otherwise communicated to one or more relevant users. Step 282 may be performed as part of prompting users to perform tasks (step 238). The document checklist may be displayed to different types of users (lender processors, underwriters, loan officers, brokers, consumers, settlement agents, other service providers, and so on) by way of any of the computer systems 20 shown in FIG. 1.

System 10 may be configured to create different role-views of the document checklist (e.g., one for lender processors/underwriters, one for loan originators such as broker or loan officers, one for settlement agents, one for consumers, and so on). For example, the originator may have the ability to view the checklist and documents submitted, view instructions/tools for the submission of paper and digital documents to data capture services logic 116, access condition text associated with a specific document, choose between multiple sets of documents to satisfy a specific condition, provide comments in the checklist specific to a document submitted, view lender's comments in the checklist specific to a document, and view document statuses. The lender processor/underwriter may have the ability to view the checklist and documents submitted, maintain/display the current status of all document tasks, record document verification, access condition text associated to a specific document, provide comments in the checklist specific to a document submitted, review broker/loan officer's comments in the checklist specific to a document, update document statuses, add case specific documents and retrieval tasks to the document checklist, and add lender-level items through administrative functionality. Lender administrators may be able to view an audit trail of checklist events (by user, date, or activity such as status changes, deletes, and so on). The consumer may have the ability to view a consumer-friendly version of the checklist and documents submitted, view instructions/tools for adding, viewing, and deleting paper and digital documents to data capture services logic 116, and access condition text associated with a specific document. Other combinations are possible. Although different views are provided, all users preferably access the same underlying data concerning what tasks must be performed and the status of those tasks.

In an exemplary embodiment, various users are only able to view loans which are relevant to the particular user. As previously noted, system 10 may be made available as an application to users from different lenders (i.e., lending institutions) and from different mortgage brokers (i.e., mortgage broker institutions). However, for example, each particular lender is only able to view loans being made by that particular lender. Likewise, each particular broker is only able to view loans being originated by that particular broker. Since the loans being made by a particular lender may include loans from multiple brokers, however, a lender is able to view the loans from multiple brokers, so long as the loans are loans being made by the lender. Likewise, since loans being originated by a particular broker may include loans for multiple lenders, brokers may be able to view loans for multiple lenders, so long as the loans are being originated by the particular broker. In one embodiment, the broker must log into system 10 separately for each different lender, and therefore is only able to see loans for a particular lender at any given time. In another embodiment, the broker may perform a generic login into system 10, and may see all of the broker's loans for multiple different lenders. This arrangement may also be implemented for each of the other service providers. With regard to the consumer, each consumer is preferably only able to view the document checklist for the loan of that particular consumer.

At step 284, documents are ordered and received. Ordering of documents using service ordering engine 56 is discussed in greater detail below in connection with FIG. 10. In addition to ordering and receiving documents from service vendors, documents may also be ordered and received from other interested parties, such as borrowers. Documents may be received by data capture services logic 116 in a variety of ways, including faxing, scanning, uploading, and so on. For example, to fax a document into the data capture services logic 116, a user may fax the document with a bar-coded and human-readable cover sheet. The document may be faxed to a fax machine associated with data capture services logic 116, such that a digital image of the received fax is captured by data capture services logic 116. The fax cover sheet may include (in human-readable format and bar-code format) the following information: casefile ID, document ID, document type, lender name and/or ID, loan originator name and/or ID, system workflow ID, system user ID, and so on. Data capture services logic 116 may be configured to generate a fax coversheet with instructions for each document responsive to user request (e.g., the fax coversheet can be printed out for the user at a local printer responsive to user inputs received by way of workflow-related websites 22). Consumers or service providers can fax paper documents to a designated fax number indicated on the fax coversheet. Loan originators, processors and underwriters can also scan documents locally and upload the documents directly through the web interface 74. Electronic documents (e.g., MI certification) can be delivered directly to the data capture services logic 116 by the document provider, as will be described below in connection with FIGS. 9-10. Digital documents (pdf, scanned image) can be also emailed directly to the data capture services logic 116 by relevant parties.

At step 286, the documents are associated with a respective loan application. Data capture services logic 116 may include logic to associate the documents with particular casefiles, for example, based on information contained in machine-readable (e.g., barcode) format on a fax coversheet, based on the message content of an e-mail containing the document as an attachment, based on the file content of an XML file received from a service provider, and so on. For example, if a document is faxed, and the fax cover sheet includes a bar-code indicating information such as casefile ID, document ID, document type, and so on, the document may be automatically associated with a case file. A similar arrangement may be used to associate an e-mailed document based on message content of the e-mail. On the other hand, if this information is provided on the fax cover sheet only in human-readable form, then the documents may be associated with the loan application by logic 116 responsive to user inputs (e.g., a display screen is provided which allows a user to enter information to associate a particular document with a particular loan application).

At step 288, task list 60 is updated to reflect receipt of the documents. Documents received electronically or through fax/scan/email features can dynamically update status to "received" if the document is appropriately coded for case identifier and document type identifier. Documents coded for case identifier only may be manually reviewed and tagged for document type in order to trigger "received" status. If any non-standard documents have been added to an otherwise standard document checklist, such non-standard documents may be manually reviewed and checked as received.

Document-level status or case-level status may be maintained, updated, and displayed using the document checklist. In an exemplary embodiment, the following statuses are generated at the document level: New-Select (user may select from a set of documents that may be submitted), New-Required (document has been added to the checklist (via underwriting condition or added at case-level) and has not been requested), Requested (document has been requested either by an order to a service provider order or from a consumer; document has not been received from the source), Received (document has been submitted either by fax or upload to the document repository; document has not been reviewed for authenticity or accuracy), Accepted (document has been reviewed by lender processor or underwriter and determined to be the correct document), Rejected (document has been reviewed by lender processor or underwriter and determined to be incorrect or invalid), Not Required (document is not required to satisfy the current document checklist condition, e.g., incorrect, erroneous, non-applicable document). Select users may be able to logically delete a document (if it is an incorrect document) or reassign the document to another borrower or casefile. The date on which each of the events (status transitions) occurs may be tracked and displayed to the user. Date tracking may also be used to support expiration notifications (e.g., e-mail notifications, notifications on the document checklist that a particular document has expired or will expire prior to closing, and so on).

Changes in document-level status may result in changes in case-level status, which may also be displayed to the user in connection with the document checklist. The following statuses may be generated at the case-level: New (Checklist has been generated. No document statuses have changed.), In Process (Checklist statuses have changed since generation. At least one document on checklist has not been accepted.), Complete (All documents on the checklist have been accepted.), Suspend, Cancel. Again, date information (e.g., date of most recent status change, due date, received date, and so on) may also be tracked and displayed.

At step 290, an e-mail notification or other system notification may be sent. The e-mail may be sent to provide confirmation that the document has been received. The e-mail may provide an indication of which documents have been received and which documents are still needed. System notifications may be sent to other user tools with the same information. For example, a system notification may be sent to loan origination system 28 so that any display screens provided by loan origination system 28 to a user may reflect updated status information. Likewise, to the extent that the user is able to directly access service ordering engine 56, a system notification may be sent to service ordering engine 56 so that any display screens provided by service ordering engine 56 to a user may reflect updated status information. As will be seen, e-mails and other system notifications may also be sent at other times during document collection. For example, in order to facilitate consumer access to the document checklist, an e-mail notification may be sent with a URL for the document checklist along with login information. When a loan application file is complete, an e-mail notification may be sent to the consumer to provide confirmation that the loan application is cleared to close. Checklist, due dates and expiration dates can automatically drive role appropriate notifications and alerts.

At step 292, access is provided to the documents to one or more loan processors. Access to view documents by users with different roles may be governed in accordance with the above discussion concerning access to view the document checklist. System 10 may generate and display data in one or more different formats such as HTML (e.g., for workflow screens), monochrome TIFF (e.g., for scanned document images or uploaded documents), PDF (e.g., for certificates from 3rd party services providers), other file formats that employ compression (e.g., JPEG), and so on. Documents may be viewed in native or other format in a web browser via the public interne. Lenders may also have the ability to download or export documents from the database 118 for auditing and/or other business purposes. Downloading/Exporting may be available by loan (e.g., all documents associated to that loan/casefile (status specific)), by document (individual documents of a loan/casefile), or in another mariner.

At step 294, a user extracts data from the loan documents and data capture services logic 116 receives the extracted data from website 74 and associates it with the loan application file. For example, data may be extracted in order to verify information provided by the borrower. Data extraction may involve a loan processor reviewing a document image and entering alphanumeric data based on the document image. Such an arrangement is described in greater detail below in connection with FIGS. 39-40, for example. In another embodiment, the data may be provided in a format in which manual data extraction is not necessary, such as in the form of an XML file accompanying or substituting for an image-type electronic document. After the user has reviewed the document, the status of the document in the document checklist may again be updated.

A comment history may be maintained and associated with the document checklist. Comments may include date/time stamp, an author/user name/id, and other information. Other free-format user comments may be maintained, such as any comments loan processors may have regarding a particular document or casefile, or issues requiring clarification or further investigation. More recent comments may be listed first in sequence. An audit trail of actions and accesses of documents may also be maintained.

As previously noted, the above process is iterative and various ones of the above steps may be performed concurrently as various documents are in different stages of being ordered, received, and reviewed at any given time by one or more different users. Furthermore, the content of the document checklist (including the documents listed and the status of each document) may be constantly changing as various users (lenders, processors, underwriters, brokers, consumers) interact with the document checklist and as mortgage loan applications are resubmitted for underwriting. As will be described in greater detail below, each time a loan is resubmitted to underwriting, new findings may change the documents required for a loan, and reconciliation rules 156 may be used to reconcile the task list 60 in use before resubmission and the new task list generated as a result of resubmission. After reconciliation, the document checklist may also be updated to reflect current status of required documents in view of the updated underwriting findings.

In order to communicate such changes to various users, the document checklist may be dynamically updated as such changes occur. For example, system 10 may generate an updated document checklist automatically, periodically, whenever a user logs on, and/or upon a user's explicit request (e.g., when a user presses a "refresh" button on a browser). System 10 may present the most recent document checklist generated, may identify new or additional documents and statuses not previously required, may identify documents and statuses that continue to be required, may identify documents that are no longer required and update their status to "Not Required," and so on. Accordingly, the document checklist presented to different users may be dynamically updated to reflect changes in documents required and changes in document status that occur as a result of other activities by other users relative to the same mortgage loan application.

Once all of the required documents are received into system 10, and any data is extracted from the received documents, digital documents can be delivered to the lender for local or alternate storage after closing. Data extracted from the document as described above may remain associated with the document, so that image copies of documents and associated alphanumeric data may remain associated with each other indefinitely (e.g., after the loan is sold one or more times in the secondary mortgage market) for subsequent processing of the information in the mortgage loan application.

In another embodiment, data capture services logic 116 is not employed. For example, documents may be received in paper or electronic format and the workflow engine 14 is used by a loan processor to log ordered/received status and data stamp, and to record data from documents, without maintaining an electronic document repository.

Figure 9:
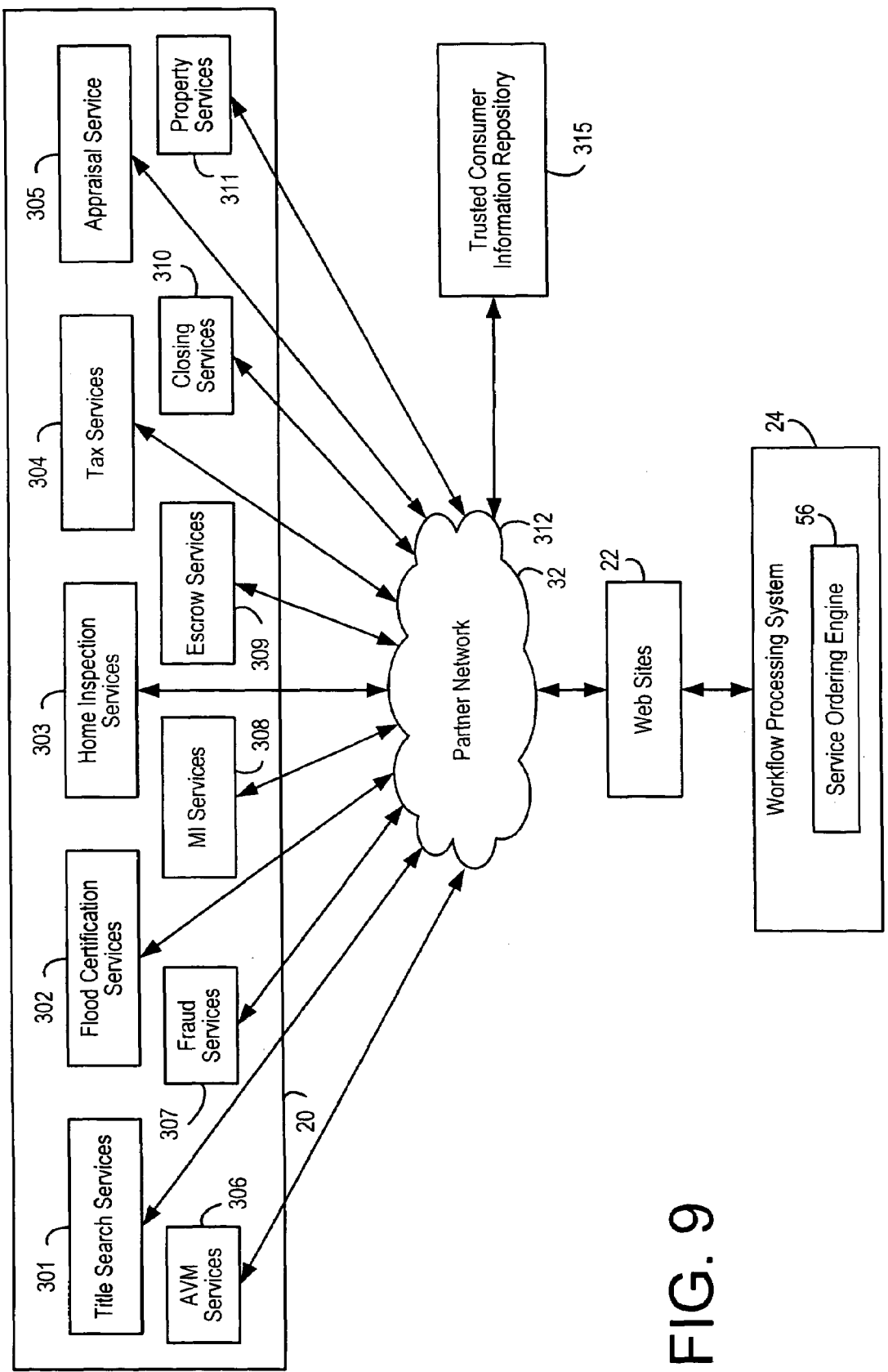
FIG. 9 is a block diagram showing connection between a service ordering engine of the system of FIGS. 1-2 and service providers in greater detail.

Referring now to FIG. 9, tasks that involve the ordering of services may be fulfilled through the use of service ordering engine 56. Service ordering engine 56 provides a tool for centralized ordering and fulfillment of one or more services that need to be performed in connection with a particular loan application. Service ordering engine 56 may be accessed by lenders to establish a connection with computer systems 301-311 associated with service providers in order to assess, validate or confirm information, or to populate data on the loan application and other documents. Interfaces may also be provided to allow the service providers with a view into the borrower's loan application data, e.g., in the event that certain data is needed to facilitate performance of the requested service. The interfaces with service providers may be implemented as data feeds into system 10 or as more comprehensive web-based interfaces (e.g., allowing employees at the service providers to access system 10 to view information and to upload documents).

Computer systems 301-311 include computer systems associated with title search services, flood certification services, home inspection services, tax services, appraisal services, AVM (automated valuation model) services, anti-fraud services, mortgage insurance services, escrow services, closing services, and property listing services, respectively. A separate computer system may be associated with each different service (e.g., each different title search service, etc.).

Computer system 301 associated with a title search service may be accessed by system 10 to receive a title search report on a property. The title search may provide an indication regarding the extent to which a current owner has clear/unencumbered ownership of the property, or whether the ownership of the property is encumbered by liens, easements, clouded title, and so on.

Computer system 302 associated with a flood certification service may be accessed to determine whether a particular home is in a flood zone. An indication that a property is in a flood zone may prompt a condition that the consumer obtain flood insurance.

Computer system 303 associated with a home inspection service may be accessed to order home inspection services. The home inspection vendor may be selected by a consumer using a consumer interface to system 10. Issues raised during the home inspection may be included as part of the report transmitted to system 10, such that other parties involved in originating the loan can assess whether any issues were raised that may result in the borrower deciding not to purchase the property.

Computer system 304 associated with a tax service may be accessed to obtain information regarding the tax status of the property (such as if annual property taxes have been paid, amounts of tax assessments, etc.). If annual property taxes have not been paid, the value of the property may be impaired inasmuch as the property may become subject to foreclosure proceedings. Also, to the extent that property taxes are escrowed, the amounts of tax assessments may be used to determine the amount of the monthly mortgage payment.

Computer system 305 associated with an appraisal service may be accessed to have an appraisal performed on the property. The appraisal may provide an indication of the fair market value of the property.

Computer system 306 associated with an automated valuation model (AVM) service. Like the appraisal service, the AVM service may be accessed to obtain an indication of the fair market value of the property. An AVM service provides the indication through an automated valuation model to model property price rather than through a human appraiser.

Computer system 307 associated with a fraud detection service (e.g., postal service, social security number database) may be accessed in order to provide verification and/or fraud protection service with regard to the loan application. For example, the address information provided in the loan application may be compared to a postal database in order to confirm that the address is valid. The consumer name or social security number may be compared with other databases to confirm the identify of the consumer.

Computer system 308 associated with a mortgage insurance provider may be accessed to order mortgage insurance. Ordering of mortgage insurance may be triggered automatically, for example, if the borrower will have less than 20% equity in the property once the loan is closed.

Computer system 309 associated with an escrow service may be accessed in order to arrange for escrow services. The escrow services may be performed, for example, by the entity that services the mortgage loan. Funds paid by the borrower may be held in escrow for taxes, mortgage insurance, lease payments, hazard insurance premiums, and other payments until such payments are due.

Computer system 310 associated with a closing service may be accessed to request and schedule closing services. A closing service can return scheduling information, which system 10 may parse and display and use to build prioritization keys. A closing platform may be fully integrated into the system. Computer system 310 may also be used to obtain access to the lender's data to generate loan documents, to obtain access to loan documents generated by the lender, and to return documents after closing (i.e., as in the case of an eMortgage).

Computer system 311 associated with a property listing service 311, such as the Multiple Listing Service (MLS), may be accessed to obtain information about a property. For example, property service 311 may be accessed to confirm property information contained in a loan application and to confirm that a property exists. Alternatively, property data may also be downloaded to system 10 and used to pre-populate the loan application, without the need for the consumer to manually enter data. According to an exemplary embodiment, the MLS number may be entered in lieu of complete property data. System 10, using the MLS number, may then access the MLS database and retrieve any and all property data.

While certain types of vendors are shown in FIG. 9, it will be appreciated that fewer, different or additional vendors may also be connected to system 10. For example, in exemplary embodiments, one or more of the services (e.g., mortgage insurance) may instead be ordered via an alternate system, and/or one or more other services may be added (e.g., post-closing services, such as a title recordation service).

Figure 10:
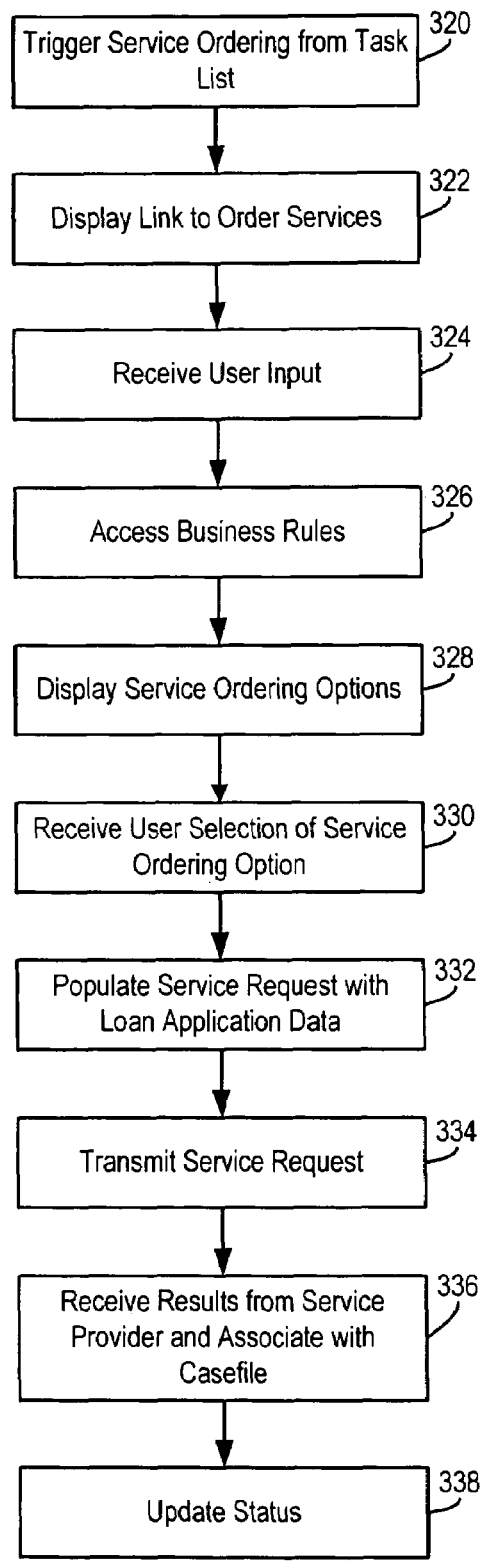
FIG. 10 is a flowchart showing operations in connection with a service ordering engine of the system of FIGS. 1-2.

Referring now to FIG. 10, an exemplary process for ordering a service and processing information returned is shown. The process of FIG. 10 may be used in connection with any combination of the services shown in FIG. 9, for example. It may also be noted that, in operation, during the process depicted in FIG. 10, service ordering engine 56 may access routing rules, delegation rules, deal management rules, and other rules to determine who is responsible for ordering services, what service providers may be used and under what circumstances, and so on. These rules are discussed in greater detail below in connection with FIG. 11.

At step 320, service ordering is triggered. In an exemplary embodiment, service ordering is triggered based on conditions listed in codified findings file 136, either directly or indirectly (e.g., based on tasks listed in task list 60, which is generated based on codified findings file 136). For example, codified findings file 136 may indicate that mortgage insurance is required, and the presence of the mortgage insurance condition in the codified findings file 136 and/or in the task list 60 may prompt logic in the service ordering engine 56 to initiate the service ordering process. Service ordering may also be triggered based on other conditions, such as closing conditions, post-closing conditions, and custom conditions added by a lender on a loan-by-loan basis, on a product-by-product basis, or for all loans/mortgage products offered by the lender. Again, inasmuch as such conditions typically result in tasks on task list 60, task list 60 may serve as a basis for triggering the ordering of services needed to fulfill any such conditions.

At step 322, the user is provided with a prompt to proceed with ordering one or more services. Conditions that require ordering of services from third-party service providers may result in a link (e.g., "Order Now") being displayed to the user as part of screen displays which permit the user to order the services. Such screen displays may be presented to the user during condition processing, as will be discussed in greater detail below in connection with FIGS. 26-50. At step 324, user input is received. For example, the user may click on a particular option to proceed with ordering services (e.g., user clicks on the "Order Now" link).

At step 326, vendor rules 146 in rules repository 80 are accessed. Vendor rules 146 are used to determine which service providers are selected to perform services in connection with a mortgage loan application. Vendor rules 146 may store information concerning different relationships lenders may have with service providers, such that the different relationships may be taken into account when services are being ordered. Vendor rules are described below in greater detail in connection with FIG. 11. In another exemplary embodiment, lenders or originators may manually select the service provider.

At step 328, service ordering options are displayed, such as with a menu or drop-down select box listing various service providers. The set of service ordering options that is displayed is determined based on vendor rules 146. The options may include, for example, which one of a series of service providers the user may select, at step 330, to perform a particular service.

In the exemplary embodiment illustrated in FIG. 10, a screen-based approach for ordering services is used in which a user is involved in the service ordering process. In another exemplary embodiment, a lights-out approach for ordering services may be used in which services are ordered automatically without user input. In this embodiment, steps 322-324 and 328-330 are skipped, and vendor rules 146 are configured to narrow the list of potential service providers that may provide a particular service in connection with a particular loan application to a single service provider, such that it is not necessary to display a series of options to a user or to receive a selection of one of those options. Accordingly, service ordering may occur as a background operation potentially without knowledge or awareness by any users (unless it is desirable to provide the status of such requests on an informational basis while such requests are being processed).

At step 332, the service request is populated with loan application data. Particularly, loan application data (e.g., 1003 data) may be used to pre-populate service order requests, minimizing re-keying and errors associated with manual processes to produce a higher quality product and faster turn times. For example, for services that relate to the property (e.g., title search, flood certification, home inspection, tax, appraisal, and AVM) information that is pre-populated based on the loan application data may include address information concerning the property. For services that relate to the borrower (e.g., fraud, mortgage insurance, escrow), information that is pre-populated based on the loan application data may include borrower identification information. Additionally, the service request may be populated with information such as casefile ID, document ID, document type, lender name and/or ID, loan originator name and/or ID, system workflow ID, system user ID, and so on, so that this information may be included with when the service provider transmits documents to data capture services logic 116 after the service has been performed. This allows the documents to be associated with the loan application, as described above in connection with step 286. Order screens may also be pre-populated with other information pre-designated by the lender using administration website 76.

At step 334, the service request is transmitted to the service provider. The service request may be transmitted via the arrangement shown in FIG. 9. Once the service provider receives the request, the service provider may respond with an order confirmation, scheduling information, periodic status information, and/or by performing the requested service and transmitting a report or other document containing the results of the requested service.

At step 336, results are received from the service provider. Information from the service provider may be received electronically. As previously indicated in connection with FIG. 8, in an exemplary embodiment, the information from the service provider may be received in a form that allows the information to be automatically associated with a particular casefile. For example, the information may be received as an e-mail which also includes the identifying information transmitted with the service request (e.g., casefile ID, document ID, document type, lender name and/or ID, loan originator name and/or ID, system workflow ID, system user ID, and so on). As another example, the information may be transmitted as an XML file which contains this information. Accordingly, the document from the service provider may be returned without requiring the user to take specific actions to retrieve the document from the service provider or to associate the document with the loan application. In other embodiments, to accommodate a lower level of integration with service provider computer systems 301-311, documents may be received in image format and may be manually associated with the loan application.

At step 338, the status of the service request is updated. Status may be updated as described in connection with updating the status of requested documents in FIG. 8. Once a service has been performed, task list 60 and corresponding information displayed to the user (e.g., in a document checklist) may be automatically updated to reflect the fact that the service has been performed. In some cases, where no further action is required, status information may also be updated to reflect that the condition has been cleared.

As previously noted, the document checklist may be organized, for example, by borrower or by document type. In the event the document checklist is organized by borrower, multiple different links may be provided to order different types of documents, and the user may order multiple documents for the same borrower. In the event the document checklist is organized by document type, the user may order multiple documents of the same type for different mortgage loan applications. For example, a skill-based routing arrangement may be used in which tasks are routed based on the skills of particular users. Different users may specialize in processing different underwriting conditions and may correspondingly be responsible for ordering different services. Users may be provided with tools that provide the user with the ability to sort, group and/or otherwise analyze loans for ordering services from different service providers. For example, if a user is aware that certain service providers are offering favorable pricing for performing services in connection with properties meeting certain parameters (e.g., properties in certain geographic regions), the user may use the tool to identify those loan applications associated with properties meeting the service provider's parameters.

In an exemplary embodiment, computer system 301-311 may be configured to provide and system 10 may be configured to receive an actual or estimated cost of the service provided by each of the service providers. Using such information, system 10 may be configured to generate an accurate estimation of the actual closing costs of the mortgage loan at a point early on in the process of originating the mortgage. The borrower then is able to make a more informed decision about the feasibility of obtaining the mortgage since the actual costs are disclosed upfront. In one configuration, system 10 may be configured to provide all of the actual closing costs, e.g., as a single "all-inclusive" fee. In another configuration, system 10 may be configured to provide at least some of the closing costs (e.g., one or more of the appraisal costs, document recording costs, title insurance, etc.). In an embodiment where a borrower is initially provided with mortgage product options for approved mortgage products from a variety of lenders, as disclosed in the above referenced '701 and '484 applications, this allows a more accurate estimation of closing costs to be provided and therefore permits a more accurate comparison of mortgage product options between different lenders.

In one embodiment, delegation of tasks, determining how to route service requests to different service providers, and other decisions made relative to processing a loan application may be made manually, for example, by a lender administrator. In such an embodiment, the lender administrator may provide user inputs during the generation of the task list and document checklist to ensure that these decisions are reflected in the task list and the document checklist. In another embodiment, as has been described herein, vendor rules 146 include business logic to allow these decisions to be made partially or entirely by system 10 in order to facilitate conditions processing and assist with ordering services to fulfill such conditions.

Figure 11:
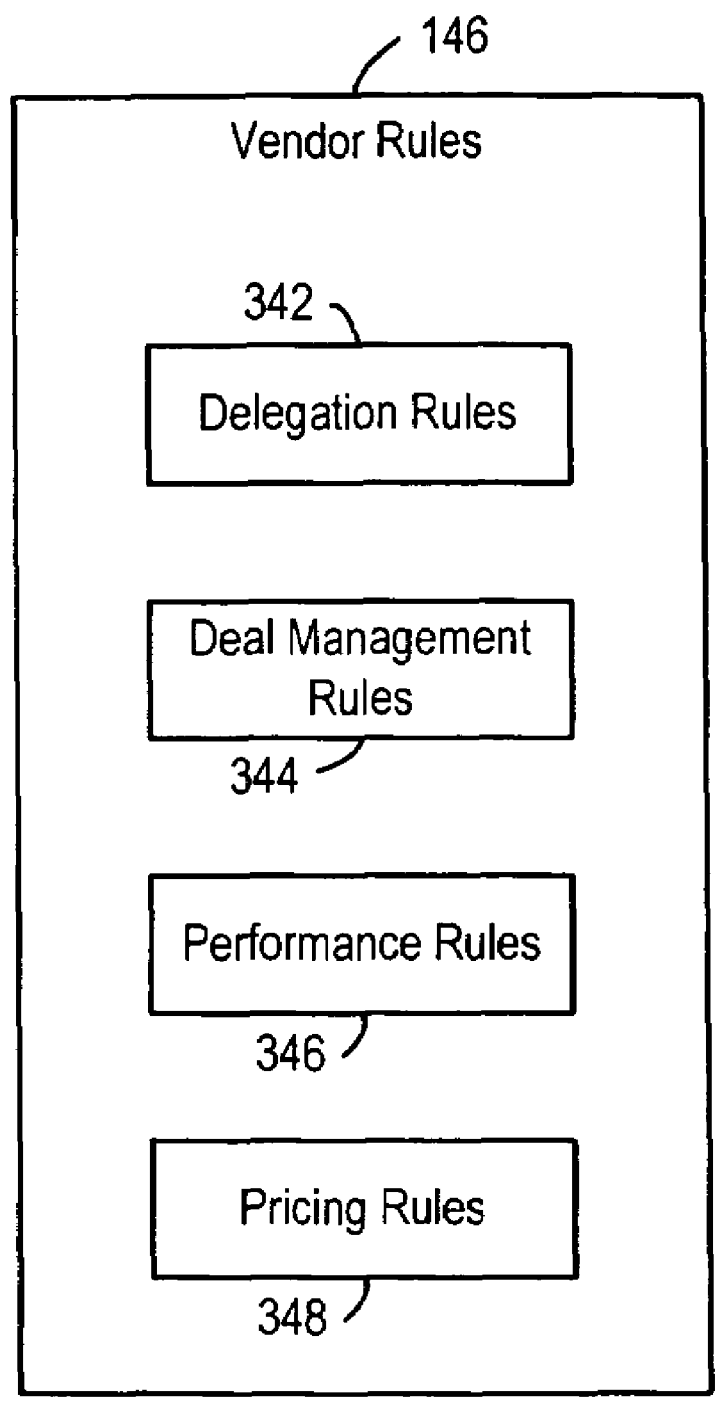
FIG. 11 is rules logic accessed by the service ordering engine of the system of FIGS. 1-2.

Referring now to FIG. 11, vendor rules 146 are now discussed in greater detail. Service ordering engine 56 may be configured in different ways by different users, e.g., by permitting configurability of vendor rules 146 by the different users. For example, if different lending institutions use service ordering engine 56, each lending institution may configure vendor rules 146 to configure the service ordering engine 56 according to the preferences of the particular lending institution. Likewise, if different brokers use service ordering engine 56, each broker may configure vendor rules 146 to configure the service ordering engine 56 according to the preferences of the particular broker (to the extent delegated). Vendor rules 146 may be configured using administrative website 76, as will be described in greater detail below in connection with FIG. 12.

As shown in FIG. 11, vendor rules 146 may include delegation rules 343, deal management rules 344, performance rules 346, and pricing rules 348. Delegation rules 342 may be accessed to determine whether the service provider that will be used to perform a particular service in connection with a particular loan application is to be selected by the lender or whether the lender has delegated the authority to select the service provider to a broker. As previously indicated, tasks can be fully delegated (broker/loan originator has full control of selection of vendors), partially delegated (selection of vendors is restricted to list defined by the lender) or not delegated (selection of vendor is performed by lender processor only). In an exemplary embodiment, delegation rules 342 may be configured on a broker-by-broker basis for a given lender. That is, a given lender may delegate more authority to some brokers than to others to select the service provider.

Deal management rules 344 may be used to permit business relationships, contracts, or other obligations with various vendors to be taken into account. Deal management rules 344 store contract or other obligation data relating to service providers and update information regarding fulfillment of those obligations. For example, a lender or broker may enter into a business agreement with a service provider in which the lender agrees to order a certain amount of services from the service provider in exchange for more favorable pricing terms. Further, the lender or broker may want to apportion its work between multiple service providers according to predetermined percentages (e.g., to make sure that each service provider stays busy and no one vendor becomes overloaded). Information regarding arrangements entered into with multiple different service providers may be maintained and tracked along with the amount of work actually sent to the different service providers. When a user is in the process of ordering a service, the user may be provided with data relating to existing arrangements/contracts and a comparison of the amount of work sent to each service provider. For example, information may be provided to the user regarding the extent to which certain contracts have yet to be fulfilled (e.g., including the dollar value of services which must be purchased under the contract, and the deadline for purchasing such services or the expiration date of the agreement). The tool may then be used to monitor a lender's open contracts. Further, the tool may be used to sort the available loans and select loans meeting particular parameters. Data relating to the lender's agreements may then be updated to reflect the services purchased from the service provider.

Performance rules 346 may be used to allocate service orders based on a comparison of a measured performance of various vendors. For example, service requests may be allocated such that lenders that have available capacity (as indicated by recent turnaround time) may be allocated a greater percentage of service requests. As previously indicated, the date and time of various status changes may be tracked. The status change information may be used to determine the average turnaround time (e.g., the amount of time elapsed between when a service request is first transmitted and when results of the service are received) for each vendor. The average turnaround time may be calculated based on data collected over a predetermined time frame (e.g., the preceding month). With this information, service requests may be allocated such that the vendor with the fastest turnaround time during the preceding month receives the greatest percentage of the service requests. Accordingly, if multiple vendors are offering equivalent pricing on services, the service requests may be allocated to those vendors that have available capacity to turn around the service requests quickly.

As another example, performance rules 346 may be used to allocate service requests based on quality and/or satisfaction rankings. Lenders may use websites 74 to solicit feedback from borrowers or brokers regarding the services provided by different vendors. Alternatively, after loan status in system 10 changes to closed, an e-mail solicitation may be sent out to one or more relevant users at e-mail addresses stored in their user profiles soliciting such feedback. The vendors may then be ranked according to the satisfaction feedback, and the vendors with the highest rankings may receive a greater percentage of the service requests. Performance rules 346 may also allocate service requests based on a combination of the above factors.

Pricing rules 348 may be used to determine which service provider to use in view of different pricing arrangements that may be offered by different service providers. Pricing rules 348 may also be used to help evaluate the tradeoff between price and other non-price factors in selecting a service provider. For example, some service providers may have a faster turnaround time than other service providers. In some situations, faster turnaround time may be valuable, e.g., where historical data shows that certain types of borrowers are likely to fall out of the mortgage pipeline if certain conditions in the codified findings file take too long to be resolved or if the mortgage application as a whole takes too long to be cleared for closing. Alternatively, historical data may be used to track the performance quality of service providers in connection with certain types of loans, borrowers, or properties, and pricing rules 348 may be used to evaluate a tradeoff between price and quality for the service vendor in dealing with the different types of loans, borrowers or properties.

Lender administrative website 76 may be used to monitor the allocation of service requests between different vendors. This allows a lender to ensure that overall allocation of service requests based on vendor rules 146 is generally consistent with whatever other expectations the lender may have based on experience.

Figure 12:
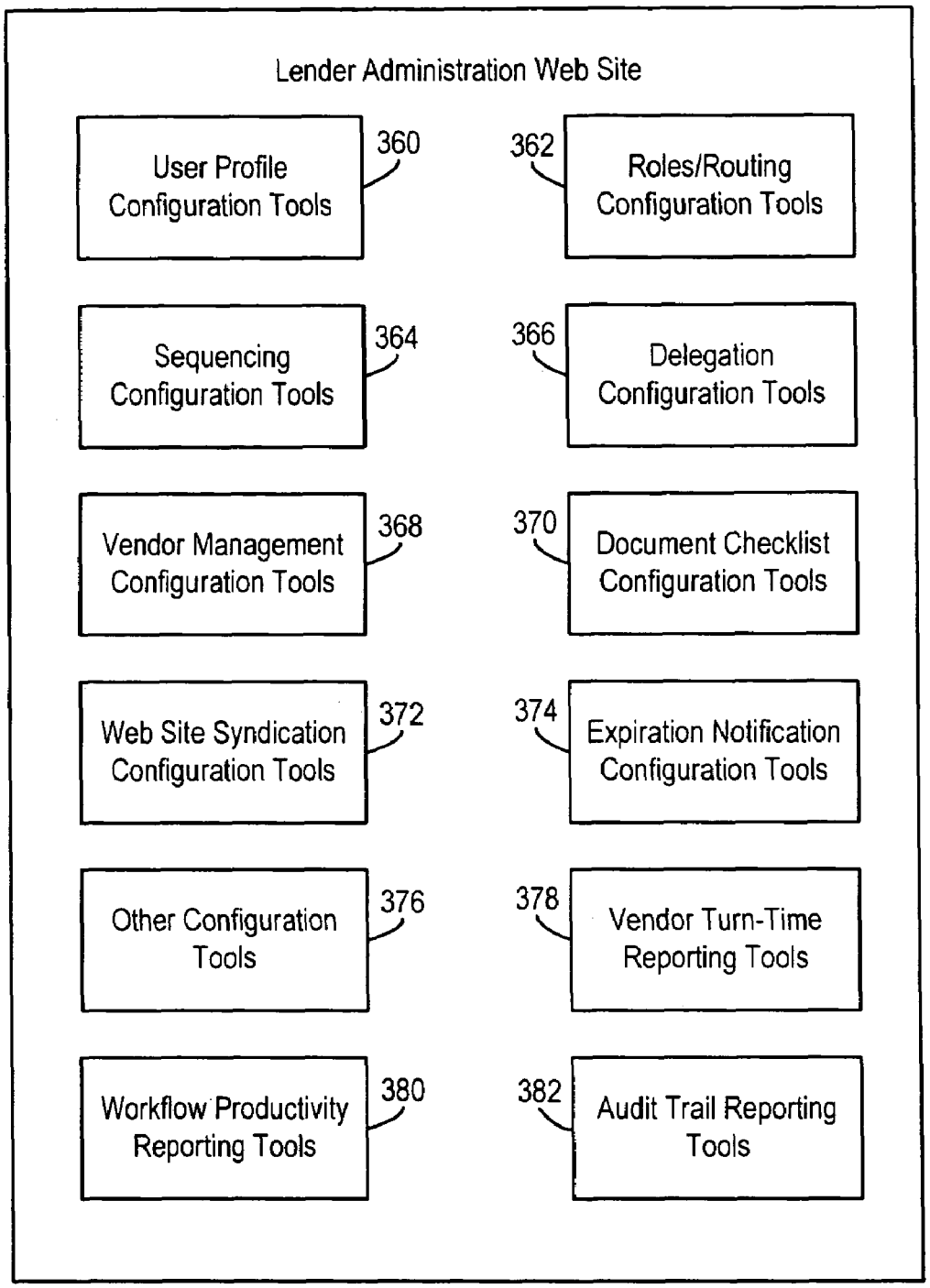
FIG. 12 is an administrative website of FIG. 2 shown in greater detail.

Referring now to FIG. 12, as previously noted, system 10 may be provided to multiple lenders and brokers as an application made available by an application service provider, with many of the features of system 10 being customizable to the business operations of individual lending institutions. Administrative website 76 may be used to configure such lender-configurable parameters. Administrative website 76 may also be used by brokers to configure such parameters, to the extent permitted by lenders. As will be seen, in addition to vendor rules 146, other rules and features of system 10 may also be configured by way of administrative website 76. Particularly, administrative website 76 may include various tools for custom configuring system according to the lender's preferences, including user profile configuration tools 360, roles/routing configuration tools 362, sequencing configuration tools 364, delegation configuration tools 364, vendor management configuration tools 368, document checklist configuration tools 370, website syndication configuration tools 372, expiration/notification configuration tools 374, other configuration tools 376, vendor turn-time reporting tools 378, and workflow productivity reporting tools 380.

User profile configuration tools 360 may be used by a lender to set up and manage the profiles of different individual users that access system 10 in connection with a particular lender, including individual loan processors, individual underwriters, individual broker users, individual consumers, and so on. The profiles may include access rights. For example, for brokers, the lender may configure the broker's ability to fax, upload and view documents, the broker's ability to add comments to a checklist, the broker's ability to send e-mails through their profile, and so on. The profiles may also include contact information including e-mail addresses. Users may be given some ability to manage their own profiles, e.g., to reflect user preferences. Users may be registered through a batch upload (e.g., file with user names, ID's, e-mail addresses, etc., into system) or through a manual registration process through website 76. Updates to end-users' profiles, ad-hoc additions, etc., may be managed manually by a system administrator. Tools may also be provided for a system administrator to manage user names and passwords of individual users.

Roles/routing configuration tools 362 may be used by a lender to define the roles played by different types of users. For example, roles configuration tools 362 may be used to configure which tasks are performed by loan processors versus which tasks are performed by underwriters. Also, sub-roles may be defined, for example, to the extent that different loan processors specialize in performing different types of tasks. A skill-based routing arrangement may be used in which tasks are routed based on the nature of the task as opposed to the loan application with which the task is associated. Different categories of users may be defined which specialize in processing different underwriting conditions. This allows loan processors to become more specialized and to handle a smaller number of different tasks for a larger number of loan applications.

Sequencing configuration tools 364 may be used to configure the sequences in which tasks are performed and the prioritization given to tasks under certain conditions. Sequencing configuration tools 364 may be used to configure the sequencing rules 150 and may be implemented using a process definition language, such as Transitions by the Workflow Management Coalition, or other suitable language.

Delegation configuration tools 366 may be used by a lender to configure delegation rules 342. As previously indicated, tasks can be fully delegated (broker/loan originator has full control of selection of vendors), partially delegated (selection of vendors is restricted to list defined by the lender) or not delegated (selection of vendor is performed by lender processor only.).

Vendor management configuration tools 368 may be used by a lender to configure deal management rules 344 and pricing rules 348. Vendor profile configuration tools 370 may be used to set up a profile for each vendor for the particular lender, indicating the circumstances under which a particular vendor may be used, in accordance with other rules. Different vendors may be set up for different types of services. The profile may also include information in the generic profile set up by the vendor, such as the vendor's name, contact information, and e-mail address. Additionally, lender presets and default values may be stored to facilitate pre-population of service requests and ordering of services without user input.

Document checklist configuration tools 370 provides another tool for a lender to add custom conditions for a particular loan application at the case file level. Using the document checklist configuration tools 370, a lender may view the conditions for a particular loan application and edit the conditions (e.g., add new conditions).

Website syndication configuration tools 372 provide the user with one or more tools to configure the various websites and display screens to be branded for a specific lender. The websites may be branded by including trademarks/logos of the lender, content provided by the lender, graphics relating to the lender, pricing data configured by the lender, operational data of the lender (such as holidays, credit agency relationships, etc.), and business policies of the lender. The fonts, colors, and other aspects of the consumer interface 140 may be customized, for example, to make them consistent with the corporate identity of the lender. The document checklist may accommodate syndication, i.e., it can be branded as (or part of) any lender's website or application. HTML templates may be used to facilitate changes to the visual design and appearance of websites.

Expiration/notification configuration tools 374 provide the user with one or more tools to set up rules/parameters for alerts and expiration notices that are sent to relevant parties for notification. For example, the parties which receive the notices and how often the parties receive the notices may be configured.

Other configuration tools 376 may be used by a lender to configure other rules not mentioned above. A lender may use tools 376 to configure lender rules 144, which include rules for adding conditions at the lender-level or at the product level. For example, at the product level, special product conditions may be provided in connection with special products targeted at emerging markets loans or loans for underserved borrowers. Tools 376 may also be used to configure closing and post-closing rules 142, for example, to allow a lender to easily pre-configure all checklists to include standard conditions not included in codified findings file 136 generated by underwriting engine 52, such title insurance, flood insurance, property insurance, regulatory and compliance requirements, and closing conditions. Other rules, such as prioritization rules 148, resubmission rules 152, update rules 154, and reconciliation rules 156 may also be lender-configurable using tools 376.

Vendor turn-time reporting tools 378 provide the user with one or more tools to generate reports on vendor performance/timeliness. Timing information collected and tracked as part of service ordering and document collection may be used to measure service provider performance through turn-time reports.

Workflow productivity and quality assurance reporting tools 380 provide the user with one or more tools to generate reports on productivity and quality. Reports may be generated on service providers or on internal processors. Reports may be generated showing how much time elapses before status changes for each possible status change and for each different condition. The report may be reviewed to determine where bottlenecks are occurring, and where new processes might be put in place to reduce the bottlenecks. Reports may be generated at the individual, group, or entity level.

Audit trail reporting tools 382 may be used to generate reports showing audit trail activity (e.g., by user, date or activity (status changes, deletes, etc.)), volume activity (e.g., documents received by broker, date, type), and fallout (e.g., loans cancelled, suspended, etc.)

Audit trail reports of user access and actions may also be generated. The system may generate a history of all actions taken against each individual condition. For each action, the following information may be made available: a description of the action, the loan identifier, the date/time that the action took place, tracking number, and an identification of the person initiating the action. Management information reports for pipeline status may also be generated.

Figure 13:
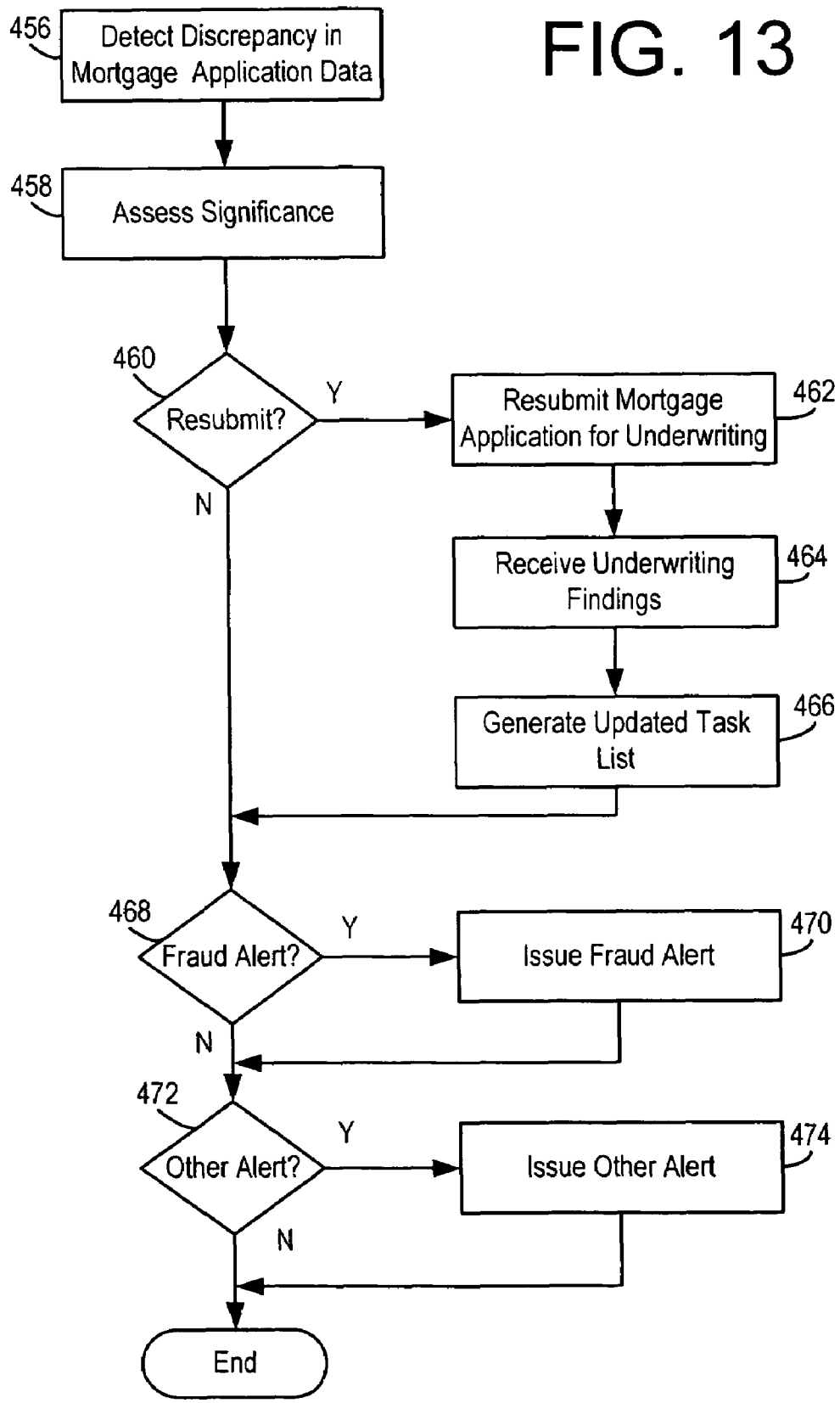
FIG. 13 is a flowchart showing operation of the system of FIGS. 1-2 in connection with a resubmission operation.

Referring now to FIG. 13, FIG. 13 is a flowchart showing operation of system 10, and particularly task manager 108 and resubmission rules 152, in a situation in which a mortgage loan application is resubmitted for underwriting (FIG. 6, steps 246-248). As previously indicated, in some instances, a discrepancy may be detected between the mortgage loan application data included as part of the mortgage loan application submitted for underwriting and other data received from one or more trusted sources during loan processing. FIG. 13 shows the operation of system 10 in responding to such a discrepancy which may include, in some instances, resubmitting the mortgage application for underwriting.

At step 456, the discrepancy is detected. Any information in the loan application file 134 may be compared with information obtained from other sources to determine whether a discrepancy exists. Discrepancies may be detected in a variety of ways. For example, a comparison of the borrower's income as self-reported may not match the borrower's income as reported by trusted sources (e.g., the borrower's W-2). The discrepancy may be detected by comparing information extracted by a loan processor from the borrower's W-2 with information in the loan application file 134. For documents in which data is received in a format that does not require manual data extraction, the discrepancy may be detected by comparing information received in the electronic file from the service provider with information in the loan application file 134. The discrepancy may also be detected, for example, as a result of information received from one or more of the service providers. In an exemplary embodiment, the discrepancy is detected by workflow engine 114 and information concerning the discrepancy is forwarded to task manager 108 for further processing. In another embodiment, task manager 108 information from workflow engine 114 obtained during loan application processing and compares the information with information originally provided in loan application file 134 to determine whether a discrepancy exists.

At step 458, the discrepancy is evaluated to assess its significance. The significance of the discrepancy may be assessed based on a variety of factors, such as the particular parameter for which the discrepancy occurred, the magnitude of the discrepancy, and so on. Also, different tolerance thresholds may be used for different parameters. For example, a 5% variance may be permitted for some parameters, while a greater or smaller variance may be permitted for other parameters.

At step 460, a determination is then made whether to resubmit the mortgage loan application for underwriting based on the significance of the discrepancy. If the discrepancy is significant, the mortgage loan application is resubmitted for underwriting (step 462). Preferably, update rules 154 are utilized to update the loan application data file 134, such that the loan application data file 134 is updated and the updated file is transmitted to underwriting engine 52 to perform the underwriting. New underwriting findings output is then received from underwriting engine 52 (step 464) and a new task list is generated (step 466). (It will be appreciated that steps 460-466 in FIG. 13 generally correspond to steps 246, 248, 228, and 232, respectively, in FIG. 6.) In one embodiment, the resubmission occurs automatically without input from the loan processor. In another embodiment, the loan originator may be provided with an alert that there is a discrepancy in the loan application data and be given the option to resubmit the loan application for underwriting. For example, where the borrower's debt as self-reported does not match the borrower's debt as shown in the credit report, the error may be in the credit report and not in the self-reported information. Providing an alert in this situation may provide an opportunity for the information in the credit report to be corrected and a new credit report to be ordered. The determination whether to automatically resubmit the loan application for underwriting (without operator input) or to resubmit the loan application for underwriting (upon operator approval) may be made on a case-by-case basis dependent on the parameter under consideration and the significance of the discrepancy. The business logic for making this determination is stored in resubmission rules 152, which may further utilize the output of other logic such as workflow analysis logic 170.

It may also be desirable to issue one or more other alerts to a user. For example, a determination may be made whether to issue a fraud alert (step 468) and, if the discrepancy is adequately significant, to issue the fraud alert (step 470). Likewise, a determination may be made whether to issue one or more other types of alerts (step 472) and, if the discrepancy is adequately significant, to issue such alerts (step 474). The determination whether to issue particular alerts may be made based on the parameter under consideration and the significance of the discrepancy. Again, the business logic for making this determination is stored in resubmission rules 152.

In another embodiment, discrepancies in multiple parameters may be tracked and accumulated. For example, a 2% variance in borrower income and a 2% variance in borrower debt may each alone be considered inadequate to trigger a resubmission, but the combination of discrepancies may be considered adequately significant to trigger a resubmission. Each discrepancy that is located (even if not alone considered significant) may be tracked and stored. Whenever a new discrepancy is found, calculations used to determine whether to resubmit the loan application may be a function of not only the new discrepancy but also earlier discrepancies. The number of discrepancies may also be used to trigger a fraud alert. For example, if no one discrepancy appears significant, but the number of discrepancies is enough to raise suspicion, a fraud alert may be triggered.

Figure 14:
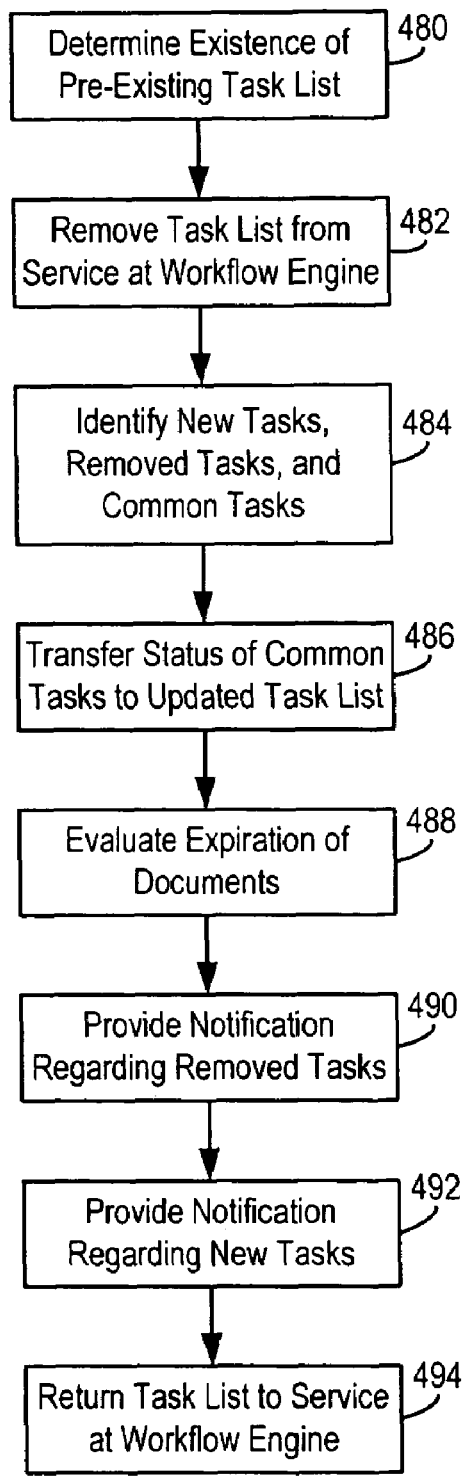
FIG. 14 is a flowchart showing operation of the system of FIGS. 1-2 in connection with a reconciliation operation.

Referring now to FIG. 14, FIG. 14 is a flowchart showing operation of the system of FIG. 2, and particularly task manager 108 and reconciliation rules 156, in a situation in which a task list 60 is reconciled with a pre-existing task list 60 after a mortgage loan application has been resubmitted for underwriting. As described above in connection with FIG. 13, a new task list 60 may be generated when the mortgage loan application is resubmitted as a result of a discrepancy that is detected in the loan application data during document processing using workflow engine 114. Resubmissions may also occur as a result of other changes in loan application data. For example, a borrower may decide to put more money down, add another borrower to the loan application, change the term of the loan (and thereby the monthly payment), and so on. In such circumstances, the mortgage loan application is typically resubmitted for underwriting to obtain a revised underwriting recommendation in view of the changed loan application data. Typically, such changes in loan application data file 134 are received by way of loan origination system 28 or automated underwriting website 72, as opposed to by way of workflow engine 114, as is the case when a discrepancy is detected. As another alternative, system 10 may be configured such that resubmissions occur for other reasons. For example, system 10 may be configured such that all loans in a lender's pipeline are automatically resubmitted on a periodic basis (e.g., weekly, daily, hourly, etc.), such as daily on a batch-processing basis during off hours.

When a loan application is resubmitted for underwriting, as in the above situations, an updated codified findings file 136 and an updated task list 60 may be generated. The updated task list 60 reflects tasks that need to be performed in connection with clearing conditions generated in connection with the updated underwriting recommendation. However, since it is the same general transaction, a number of the conditions may have already been met (or may have been in the process of being met) before the loan application was resubmitted for underwriting. It is desirable for this status to be reflected in the new task list 60, so that the processing work performed before the mortgage application was resubmitted for underwriting is not lost.

FIG. 14 shows the process in greater detail. At step 480, after the updated task list 60 has been generated, it is determined that the loan application has previously been underwritten and that there is a pre-existing task list 60. In FIG. 2, if there is no pre-existing task list 60, then the process described therein proceeds directly to step 236, without performing the reconciliation process described in FIG. 14. If a pre-existing task list 60 does exist, as is assumed in the process of FIG. 14, then reconciling the pre-existing task list 60 with the updated task list 60 is part of the process of generating the updated task list 60 before the updated task list is put into service.

At step 482, pre-existing task list 60 which is in use at workflow engine 114 is taken out of service. This prevents users from trying to operate on pre-existing task list 60 during the time period during which reconciliation occurs. In one embodiment, pre-existing task list 60 is then transmitted from workflow engine 114 to task manager 108. In another embodiment, task manager 108 may query workflow engine 114 as to the status of various tasks, and workflow engine 108 may provide an answer file which specifies the status of the various tasks.

At step 484, task manager 108 identifies tasks which are newly added in updated task list 60, tasks which have been removed from updated task list 60 as compared to pre-existing task list 60, and tasks which are common as between pre-existing task list 60 and updated task list 60. For example, if another borrower is added to a loan application and the additional borrower brings additional money for a down payment, a number of underwriting conditions may change. For example, with the larger down payment, mortgage insurance may no longer be needed. Accordingly, ordering mortgage insurance may be identified as a removed task. However, the income of the second borrower may now need to be verified. Accordingly, income verification may be identified as a new task. Task manager 108 also identifies tasks from other sources (e.g., closing tasks) that are unlikely to change as a result of re-underwriting.

At step 486, for tasks that are common as between pre-existing task list 60 and updated task list 60, the status of such tasks is transferred from the pre-existing task list 60 to updated task list 60. For example, if an appraisal has already been ordered, it is undesirable and unnecessary to order another appraisal. Reconciliation rules 156 are used to match the status of the in-progress tasks and pass along the status to updated task list 60. The status of document requests (e.g., whether documents have been ordered, received, reviewed, accepted and so on) may also be reflected in a document checklist generated based on the updated task list. For documents that have been received, any documents that have been received are associated with the updated task list 60 and document checklist. In some situations, common conditions may be routed to a loan processor for manual reconciliation to determine whether work performed previously for a particular condition is useable in connection with the updated task list. The status of tasks unrelated to underwriting may also be transferred from the pre-existing task list 60 to updated task list 60.

In some situations, service orders may be changed. When the change occurs, a notification (e.g., a system notification, an e-mail, etc.) may be sent to the service provider to notify the service provider of the change. For example, if initial underwriting required an appraisal with a full interior inspection appraisal, and the updated underwriting requires an appraisal with an exterior-only inspection, a notification may be sent to the appraisal service. A computer system that maintains a scheduling information for services to be performed may be automatically updated. In another embodiment, if the list of services to be performed is maintained by system 10, the service request information may be automatically updated. Human processing is not required to update the service request.

At step 488, task manager 108 reviews the status of completed tasks and associated documents to assess whether any of the documents have expired. For example, if a new closing date has been set, documents may be out of date. System 10 may update task list 60 to reflect that documents need to be reordered. For example, the consumer may be advised that a more recent paystub is needed.

At step 490, notification is provided regarding removed tasks. For example, if mortgage insurance has been removed from the new conditions list, a notification may be sent to a service provider to cancel a service request. This keeps the user aware of the changes in the conditions lists and avoids wasted work.

At step 492, a notification is provided regarding new tasks. If additional documents are required from the borrower, an e-mail may be sent to the borrower indicating that new documents are required and indicating the reason for the change.

At step 494, the updated task list 60 is transmitted to workflow engine 114, where it is put back into service. The status of tasks listed in task list 60 may be dynamically changing due to ongoing processing of the loan application. However, since all users then work from the updated task list 60, when task list 60 is updated, the change in status will be apparent the next time a user views the document checklist for the loan application. It is therefore possible to keep all interested parties up to date on the conditions required for closing a particular loan application. Wasted work is reduced.

Figure 15:
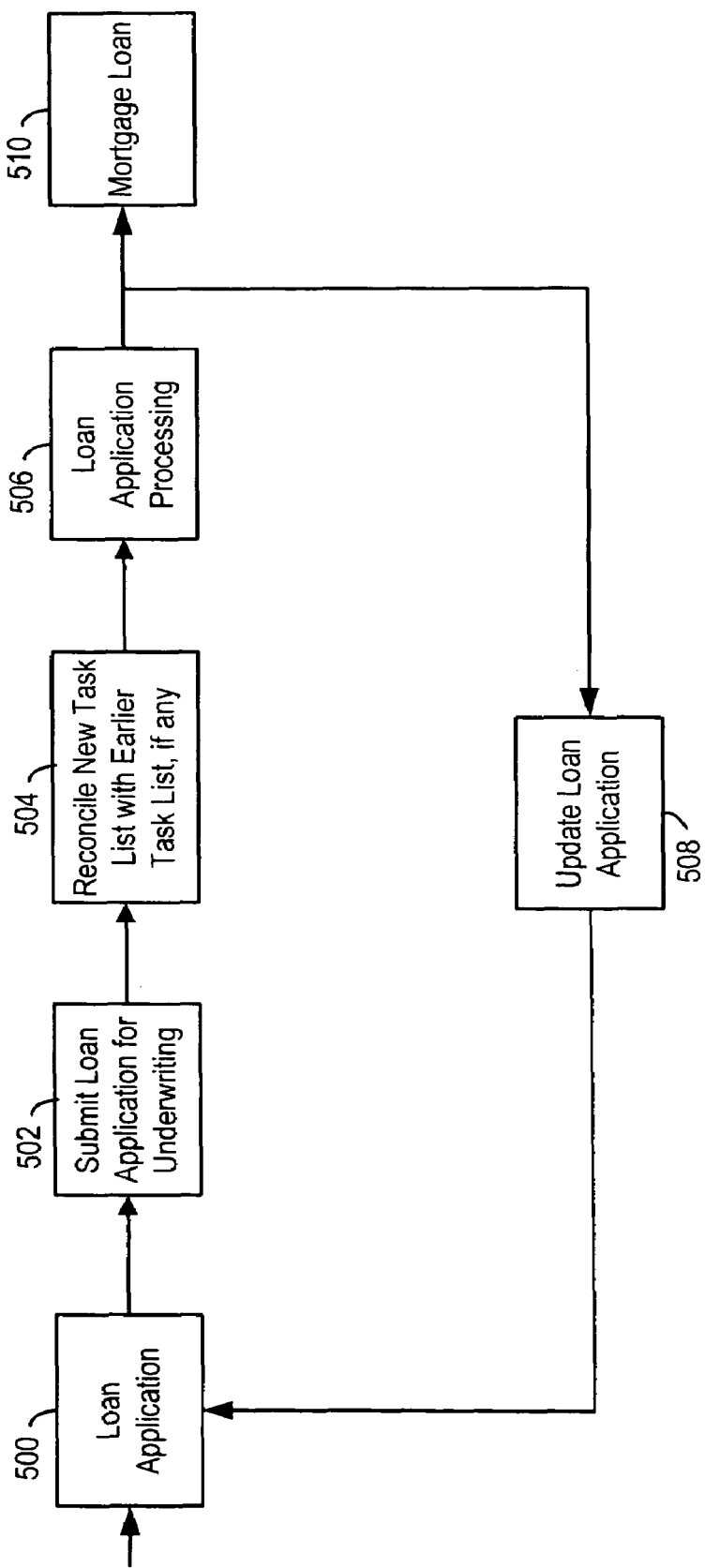
FIG. 15 is a diagram showing a manner in which the system of FIGS. 1-2 implement a feedback loop for loan processing.

Referring now to FIG. 15, FIG. 15 is a diagram depicting a loan processing method that is implemented with system 10. FIG. 15 depicts similar subject matter as has previously been described, except that it depicts the manner in which a feedback loop may be created to improve loan processing. Loan application data is received at block 500. The loan application data is submitted for underwriting at block 502 and a task list is generated at block 504. Loan application processing occurs at block 506 which may result in updates to the loan application data at block 508. The loan application is then resubmitted for underwriting, and an updated task list is generated which is then reconciled with the earlier task list. A synchronous feedback loop is thereby created in which loan application data is resubmitted for underwriting based on changes in loan application data that occur downstream during loan application processing. The loan application data may be updated numerous times and may be resubmitted for underwriting. Eventually, a point in the process is reached in which the loan application data is correct and the mortgage loan is ready for closing at block In the process of FIG. 15, information flow is improved and relevant parties are kept more up to date. In addition to having access to a role-specific versions of the checklist, relevant users may have access to a shared checklist. The checklists may access common information, such that all users are synchronized. Role specific e-mail notifications may be used to notify loan originators, lender processors/underwriters, consumers and other involved users of a change of status or other event, so that relevant users have up-to-date information. For example, a loan originator may receive a notification when a document status changes (as defined by an aggregate of statuses or events) or when a loan status changes (as defined by an aggregate of statuses or events). A lender processor/underwriter may receive notification when the broker has submitted documents, when a re-submission has occurred (e.g., a status indication or workflow message), and so on. Email notification may also be provided to relevant parties regarding aging tasks or expiring documents.

Figure 16:
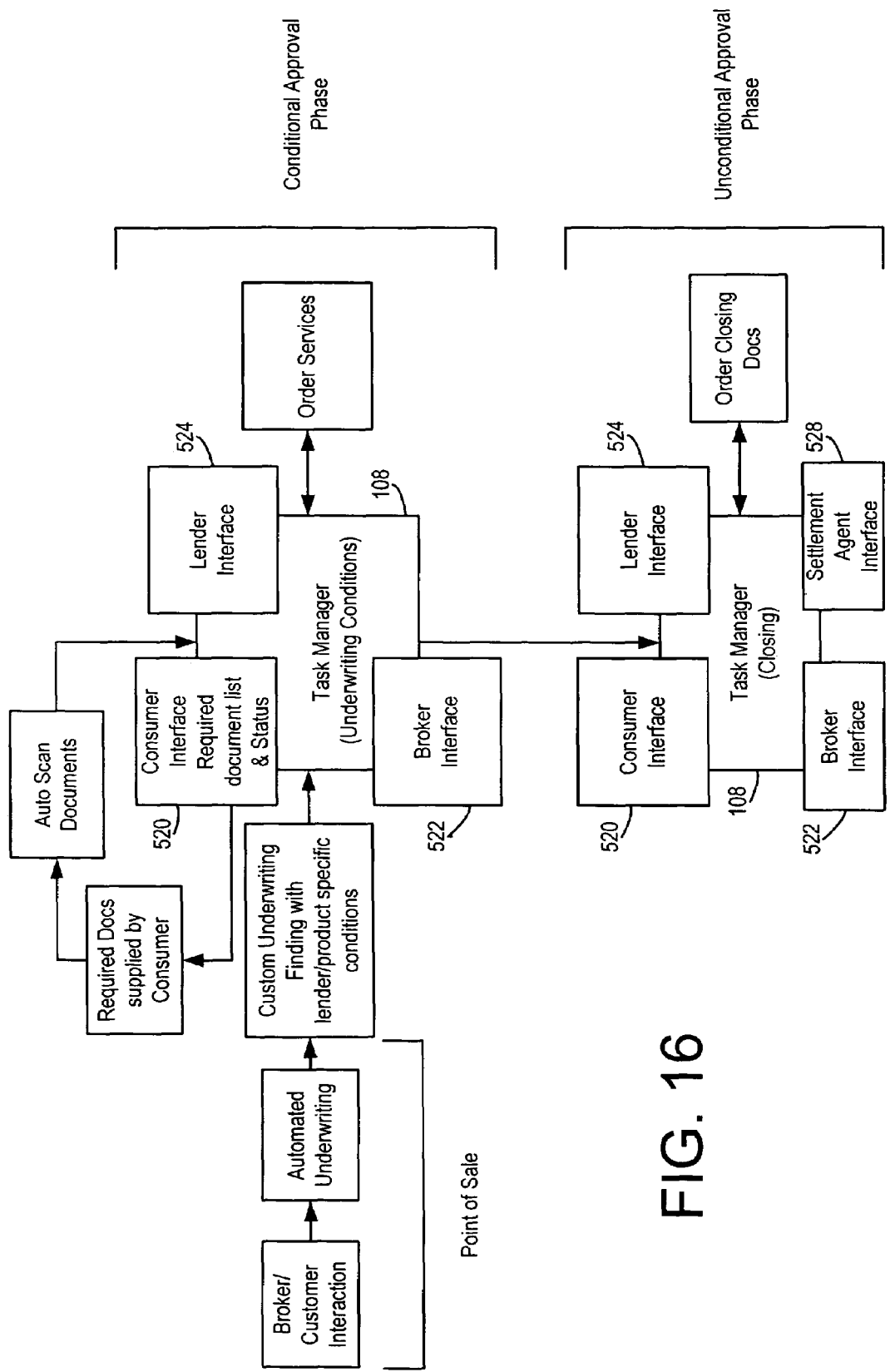
FIG. 16 is a block diagram showing functional relationships between various user interfaces and a task manager of the system of FIGS. 1-2.

Referring now to FIG. 16, FIG. 16 depicts how various users may be provided with views into loan processing using system 10. During the conditional approval phase, before underwriting conditions have been cleared, operations focus around task manager 108. A consumer interface 520, broker interface 522, and lender interface 524 (including processors and underwriters) are each able to access up-to-date loan processing information. Additional links may be provided to service providers. In the unconditional approval phase, after the underwriting conditions have been fulfilled, a settlement agent interface 528 is able to access the loan application data to generate closing documents.

Figure 17:
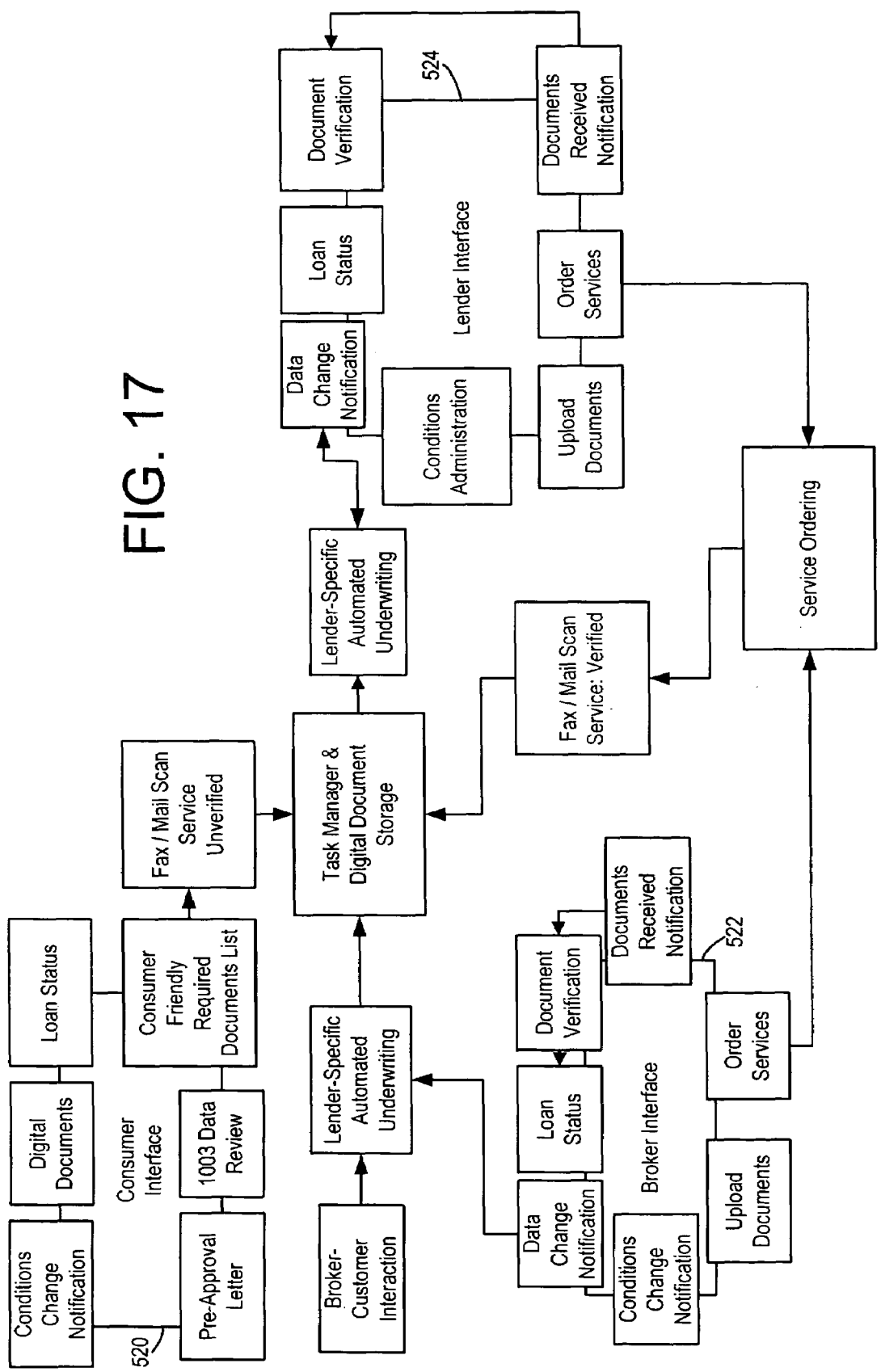
FIG. 17 is a block diagram showing functions available to be performed via various user interfaces in the system of FIGS. 1-2.

Referring now to FIG. 17, FIG. 17 depicts functions that may be performed using consumer interface 520, broker interface 522, and lender interface 524. Consumer interface 520 may provide the borrower with access to conditions changes notifications, digital documents, loan status, a consumer friendly required documents list, 1003 data, pre-approval letters, and so on. Broker interface 522 may provide the broker with access to document upload tools, service ordering tools, documents received notifications, document verification tools, loan status information, data change notifications, condition change notifications, and so on. Lender interface 524 may provide the lender with tools for uploading documents, service ordering tools, documents received notifications, document verification tools, loan status information, data change notifications, and so on. The lender is also provided with administrative tools for conditions management (e.g., specifying conditions at the lender, product, or casefile level). Some tools, such as the service ordering tools, are shared.

Figure 18:
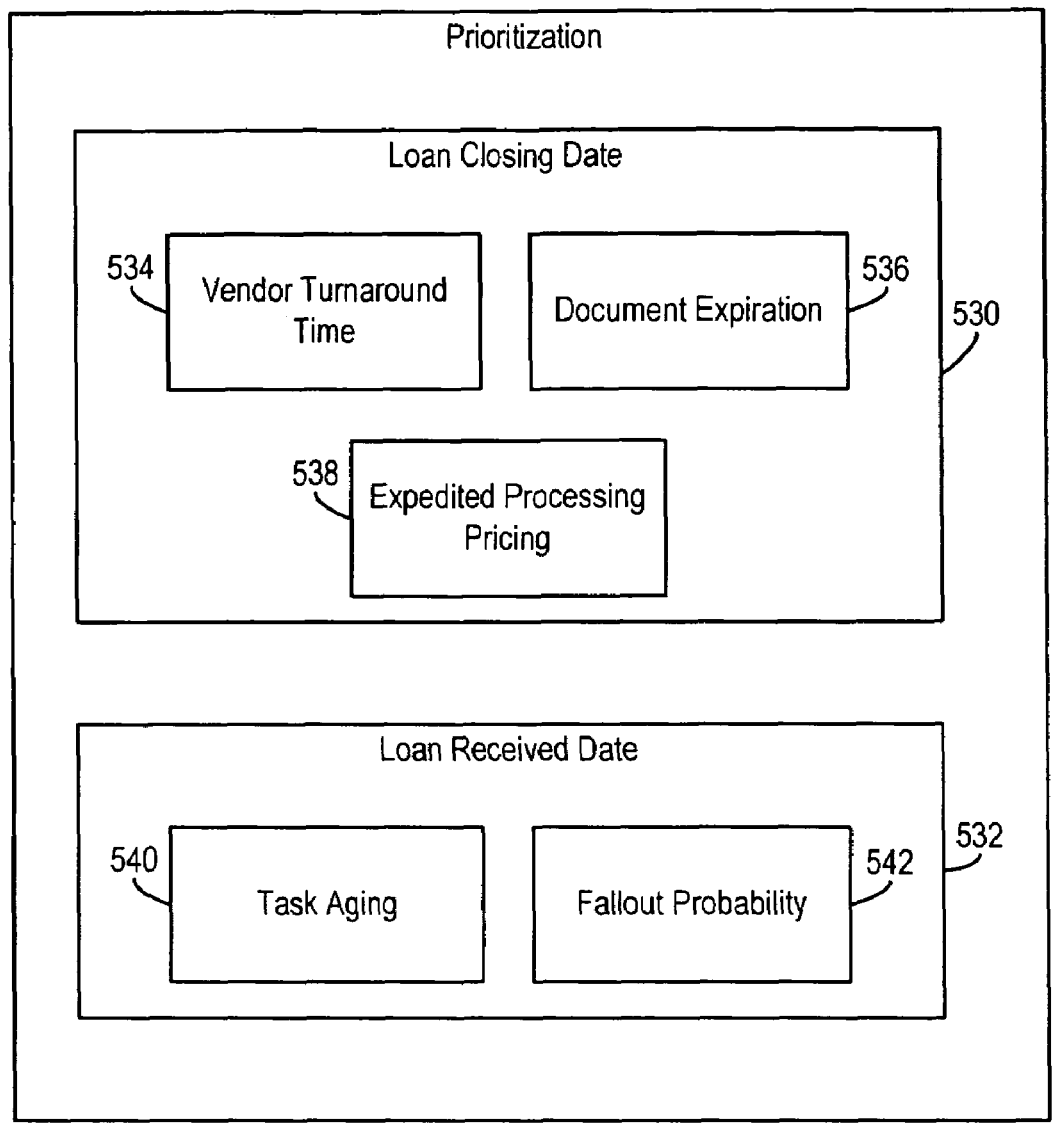
FIG. 18 is a diagram showing prioritization rules of FIG. 2 in greater detail.

Referring now to FIG. 18, FIG. 18 is a block diagram showing prioritization rules 148 in greater detail. Prioritization rules 148 may assist the mortgage professional in determining the level of immediacy required for a specific loan, condition or subcondition (task).

Prioritization may be performed based on a number of factors, such as loan closing date and/or loan received date (e.g., the date the loan application was originally submitted for underwriting). For example, closing date logic 530 may be used to generate prioritization information based on loan closing date. As a closing date approaches, tasks may become more urgent. The prioritization logic may work backwards from the closing date. For example, if several tasks need to be performed, and the total expected turnaround time for the tasks is greater than the amount of time remaining until the closing date, then the first task may be given a high priority, even though it does not take long to perform and even though the closing date is two weeks away (e.g., in a situation where the middle task in the sequence typically takes 1½ weeks to perform).

In an exemplary embodiment, prioritization rules 148 operate by allowing priority to be set to one of a discrete number of levels, or categorical values, such as "low" urgency, "medium" urgency, "high" urgency, and "extremely urgent." Separate rules may be established for each task and for each different condition, including threshold levels at which the task advances from one level of urgency to the next. For example, at four weeks from closing date, a task may be considered "low" priority. At three weeks from closing date, the task may advance to "medium" priority, and so on.

Prioritization based on closing date may also take other factors into account. For example, logic 534 may be used to take vendor turnaround time into account. Some services may take longer to perform or set up and therefore may have a longer expected turnaround time than others. These differences may be reflected in turnaround time logic 534. Further, prioritization based on expected turnaround time may be vendor-specific. That is, if it is known that a particular service is to be performed by a specific vendor, the prioritization may take into account the expected turnaround time of that vendor. Accordingly, for example, the threshold levels at which a task advances from one level of urgency to the next may be variable and may be a function of the expected turnaround time of the vendor that is expected to perform the service.

Prioritization based on closing date may also take into account document expiration using logic 536. For example, if moving the closing date back two weeks would not cause any documents to expire in the case of one loan, but would cause documents to expire in the case of a second loan, the threshold levels for the second loan may be set such that tasks advance from one level of urgency to the next level of urgency earlier than in the case of the first loan, other things being equal.

Prioritization based on closing date may also take into account costs associated with expedited processing fees for faster turnaround time using logic 538. For example, service providers may have different pricing structures that take into account whether a service is requested on a non-expedited basis or whether the service is requested on an expedited basis. The service provider may charge more if the service is provided on an expedited basis. Where expedited processing fees are significant, thresholds may be set such that tasks advance from one level of urgency to the next as compared to situations where expedited processing fees are minimal or non-existent.

Loan received date logic 532 may be used to generate prioritization based on loan received date. Task aging logic 540 may be used to evaluate how long particular tasks have been sitting without being acted upon, and to generate prioritization information based on this information. Fallout probability logic 542 may be used to take into account the extent to which a particular task/condition is correlated with fallout. Some conditions may be more highly correlated with fallout than other conditions. For example, it may be the case that if a borrower does not receive favorable news from a lender in connection with a particular underwriting condition in a relatively short period of time, the borrower may become discouraged or be under the impression that there is a problem and the loan is unlikely to close. From the lender's perspective, it may not otherwise matter when the task is performed so long as it is performed prior to closing. From the borrower's perspective, the borrower may abandon the loan application process if favorable news is not received in short order. As will be described in greater detail below, system 10 may include logic to identify which conditions are correlated with fallout. Fallout probability logic 542 may utilize such information to give such tasks/conditions a higher priority. Where correlation with fallout is significant, thresholds may be set such that tasks advance from one level of urgency to the next earlier as compared to situations where correlation is minimal or non-existent.

Prioritization may also be based on other parameters. For example, if a lender has made it a priority to serve underserved borrowers, and has a group of loan products that target underserved borrowers, the threshold levels for the loan products targeting underserved borrowers may be set such that tasks advance from one level of urgency to the next earlier as compared to threshold levels for products that do not target the class of borrowers. This may provide a simple mechanism for reducing fallout among this class of borrowers.

Prioritization rules 148 may be based on one or more of the above parameters, or based on other parameters. In the event that multiple parameters are used, prioritization rules 148 may weight the above factors or may select the most urgent rating. That is, if a condition is considered "low" urgency according to one metric, but is considered "high" urgency according to another metric, the higher of the two urgency ratings may be selected and used and the other one discarded. Also, as will be appreciated, rather than using a system of assigning categorical priority values based on rules logic, an equation may be developed which assigns a score or other continuous priority value based on one or more of the above parameters and/or other parameters. In either case, default values (e.g., threshold levels or weighting coefficients) may be provided but may be made lender-configurable.

Figure 19:
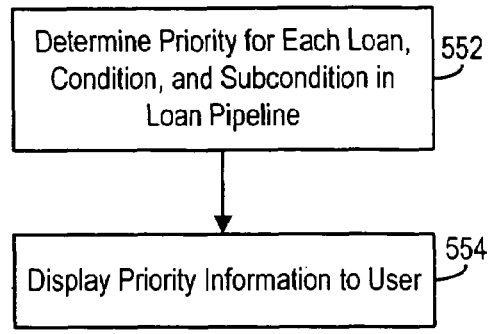
FIG. 19 is a flowchart showing operation of prioritization rules of FIG. 2 in greater detail.
Figure 20:
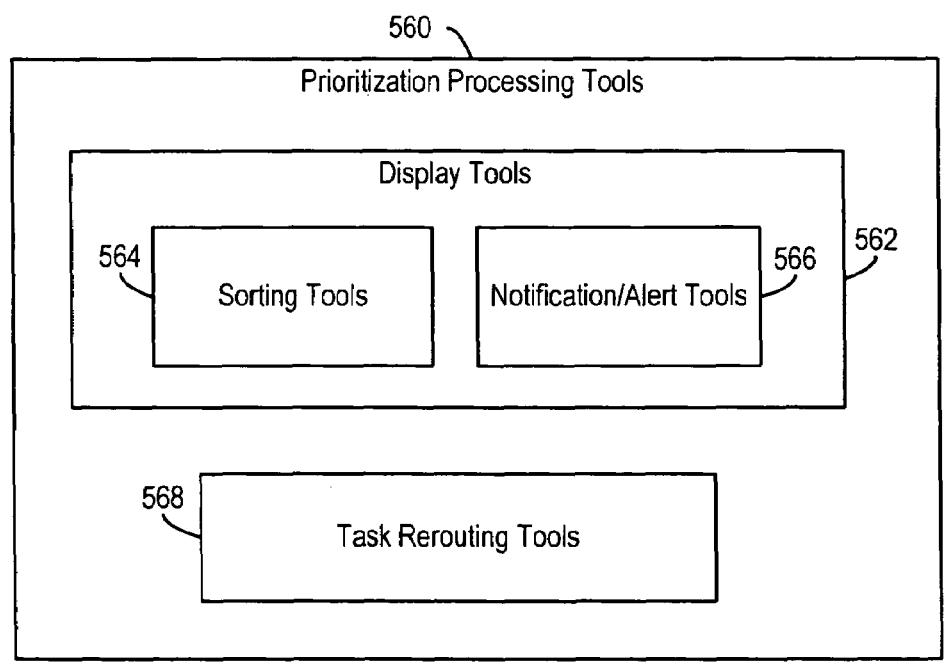
FIG. 20 is a block diagram showing prioritization processing tools of FIG. 2 in greater detail.

Referring now to FIGS. 19-20, FIG. 19 is a flowchart showing operation of prioritization rules 148. As shown in FIG. 19, at step 552, the priority for each loan, condition and/or subcondition in a lender's pipeline is determined. At step 554, the priority information is displayed to the user. FIG. 20 shows various tools 562 that may be utilized in displaying the priority information to the user. The workflow prioritization determines how work tasks are displayed in the user interface, in addition to driving the suggested order of work. Prioritization levels may be viewed at the casefile, processor, or lender level, or at other levels. Priority levels may be displayed next to individual documents in the document checklist. Sorting tools 564 may be configured to allow a processor to sort their list of tasks by prioritization level. Rules 566 may also be provided to generate alerts based on these parameters. System 10 may alert users when a task becomes extremely urgent, or when documents may expire if closing date is pushed back any further. Again, such alerts may displayed adjacent to documents in the document checklist, or may be e-mailed to users (e.g., in the case of borrowers).

Tasks of an organization may be prioritized so that a determination may be made whether to shift tasks between loan processors. Task rerouting rules 568 may be used to identify situations where one processor has a disproportionate number of urgent tasks, and where some of those tasks might be transferred to another processor with a less urgent workload.

2. Exemplary Processes for Overall Management of Information Flow

Referring now to FIGS. 21-25, a loan application processing method that may be implemented using the system of FIGS. 1-2 is shown. FIGS. 21-25 provide, from a user perspective, a general overview of the manner in which system 10 may be used to assist mortgage brokers, loan officers, loan processors, service providers, consumers and other entities and persons involved in mortgage origination process with managing the flow of information and the associated documents related to the mortgage origination process.

Figure 21:
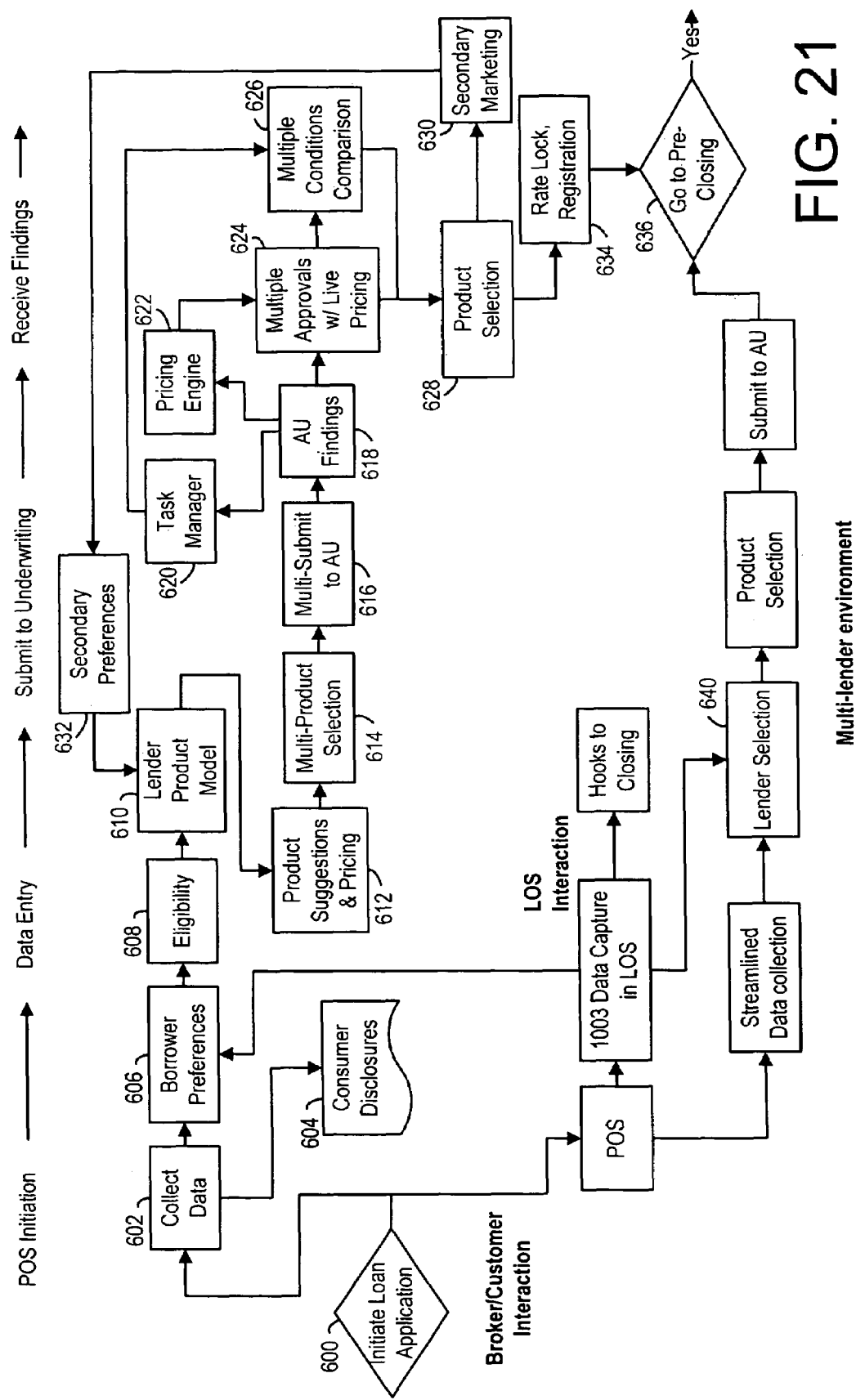
FIGS. 21-25 are a loan application process implemented by the system shown in FIGS. 1-2.

Referring first to FIG. 21, FIG. 21 shows an initial portion of the mortgage origination process in which data is collected from a consumer through the point at which a rate lock is received. The process depicted in FIG. 21 may be implemented using loan origination system 28 and/or automated underwriting website 72. The process depicted in FIG. 21 may also be performed, for example, using the systems and processes described in connection with FIGS. 11-31 of the '484 application or FIGS. 6-18 of the '701 application and accompanying discussion.

As shown in FIG. 21, the initial portion of the mortgage origination process may be divided into several phases, including point-of-sale initiation, data entry, submission to underwriting, and receive findings/post underwriting processing. At step 600, the mortgage application process is initiated. At step 602, loan application data (e.g., Form 1003 data) is collected. At step 604, disclosures are provided to the borrower. At step 606, information regarding the borrower's preferences for a mortgage product are collected. At step 608, the borrower's eligibility for particular types of mortgage products is assessed. At step 610, the lender mortgage product model is applied to mortgage products for which the borrower has received a recommendation as being eligible. At step 612, multiple product suggestions and pricing information are provided to the borrower. At step 614, a borrower selection of one or more of multiple mortgage products is received and, at step 616, the multiple mortgage products are submitted for underwriting to an automated underwriting engine 52. At step 618, the automated underwriting engine 52 generates automated underwriting finding (in the form of a codified findings file 136) which are provided to a conditions interpreter at step 620, to a pricing engine at step 622, and to the user at step 624. In the exemplary embodiment, the conditions interpreter is implemented with task manager 108 which accesses rules stored in rules repository 80 to interpret conditions in the codified findings file 136. At step 626, the approved products, pricing, and conditions are compared and, at step 628, a product selection is made by the borrower and received by system 10. At step 630, the mortgage product selected by the borrower is provided to secondary marketing logic which, at step 632, updates the lender product model. At step 634, a rate lock and registration are received from the borrower. At step 636, the borrower is able to proceed to pre-closing. Separate paths to pre-closing 636 may be taken if other loan origination software is used. In a multi-lender environment, the process also includes a lender selection step 640. The loan application data may be received from a trusted advisor via a consumer-direct interface, a trusted advisor interface, a call center interface, etc.

Figure 22:
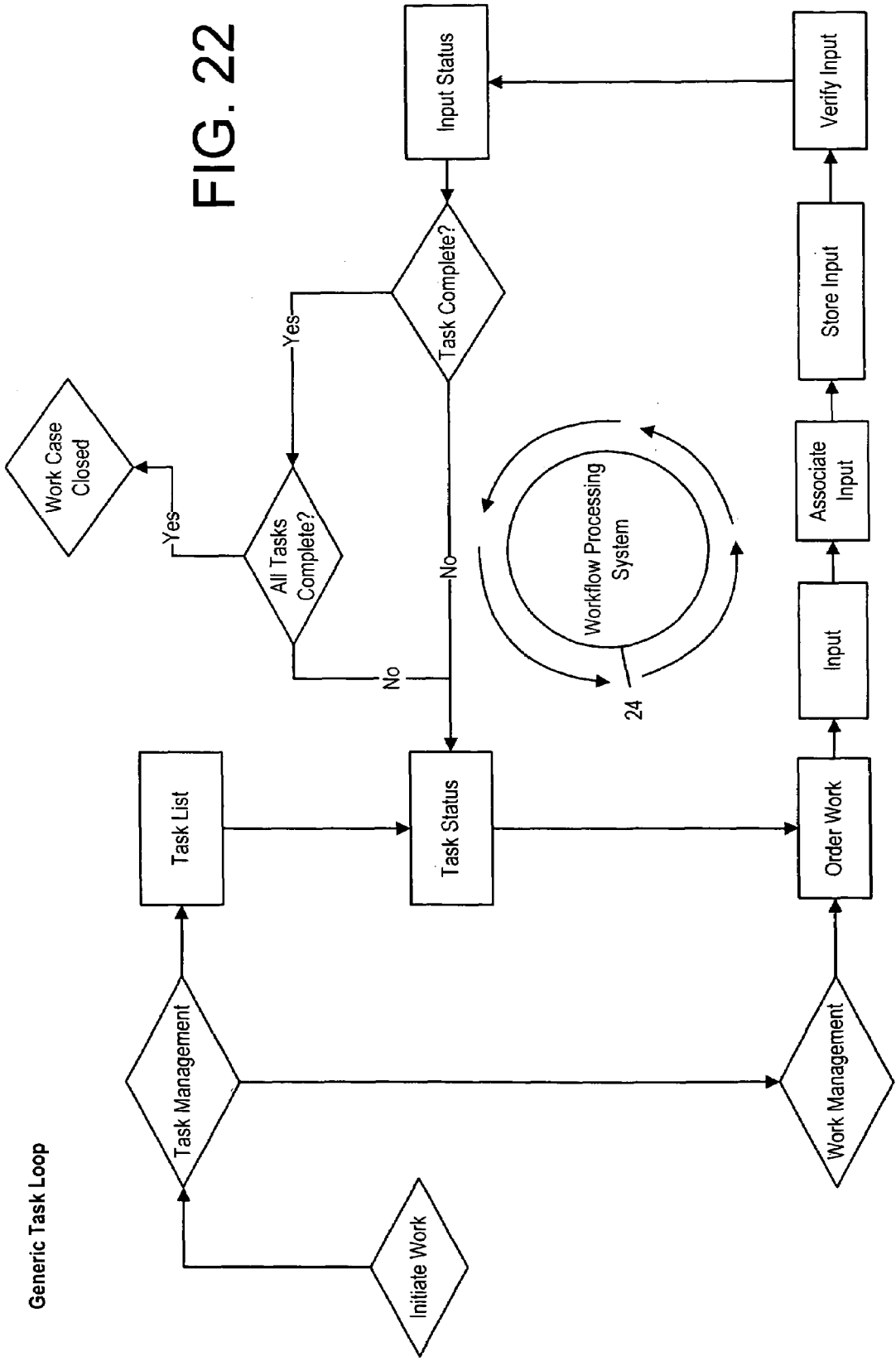
Figure 23:
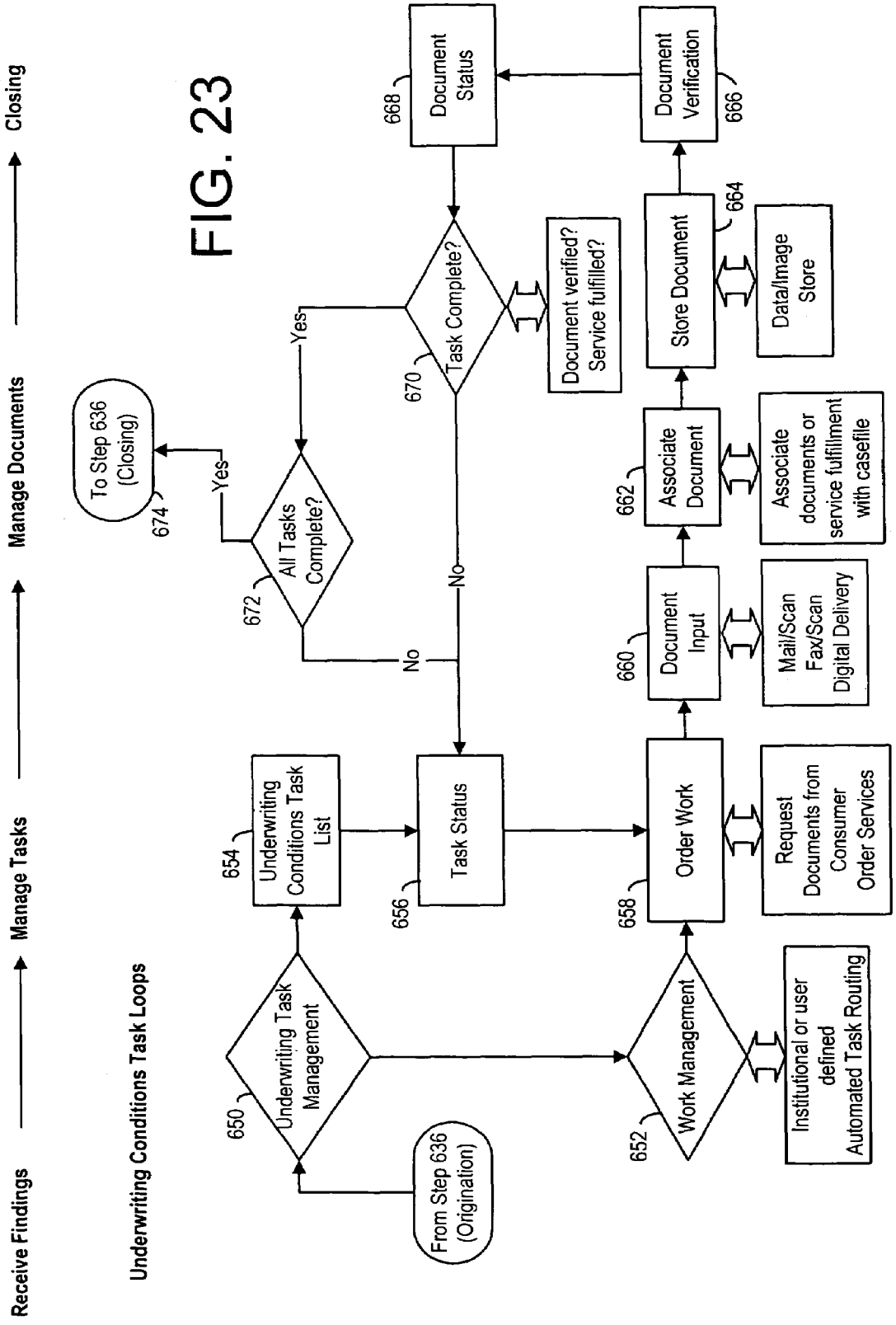
Figure 24:
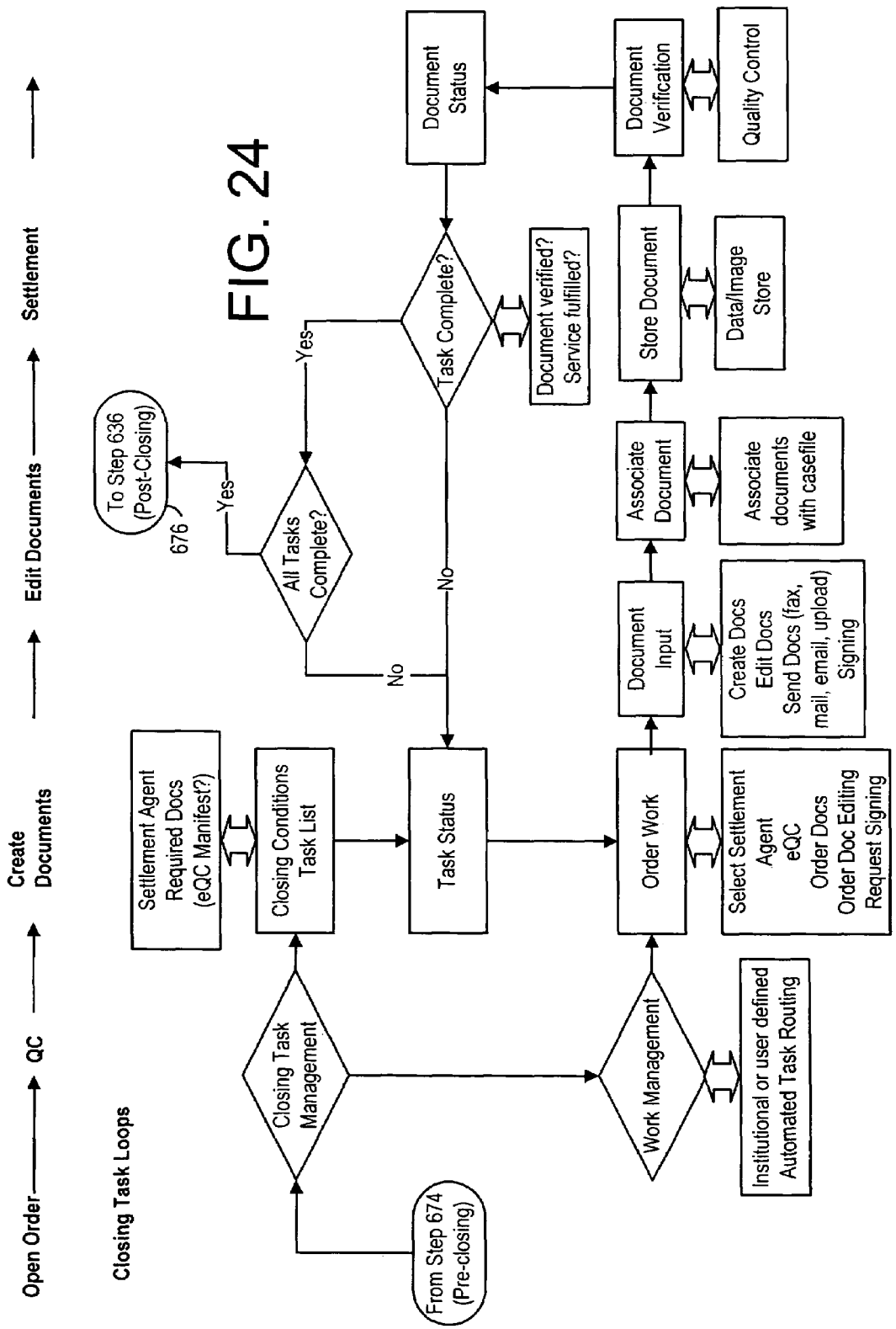
Figure 25:
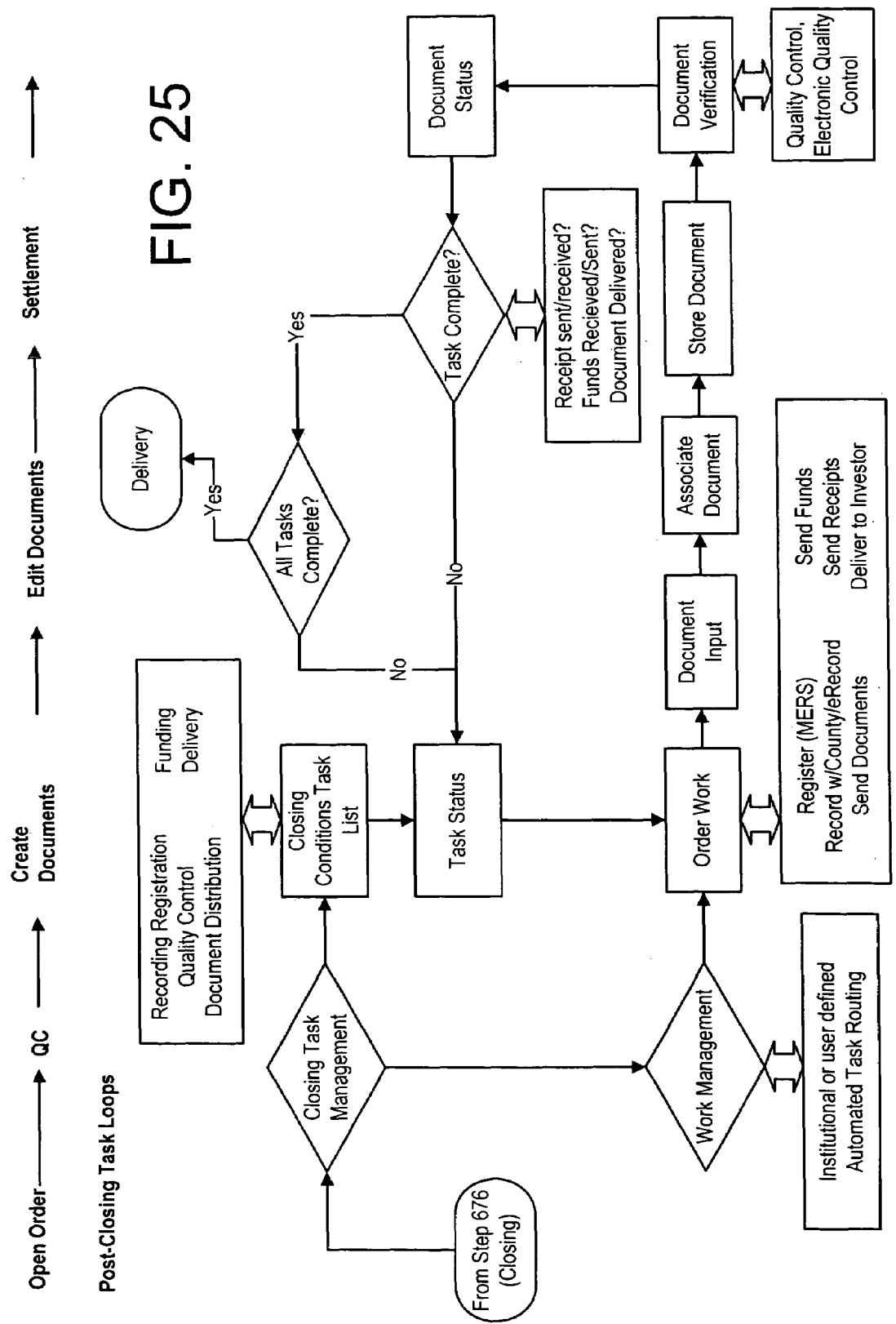

FIG. 22 is a generic version of FIGS. 23-25. As previously noted, workflow engine 114 may be a generic workflow engine, that is, a workflow engine that is substantially devoid of mortgage processing business logic. Workflow engine 114 may instead comprise relatively generic logic which may be reused in many different ways in prompting the user to perform different tasks identified in task list 60. FIG. 22 depicts a generic process that may be implemented using workflow engine 14 and that may be customized to implement more mortgage-specific processes using business logic contained in rules repository 80.

FIGS. 23-25 show how the generic process of FIG. 22 may be customized to create processes for underwriting conditions tasks (FIG. 23), closing tasks (FIG. 24), and post closing tasks (FIG. 25). Referring first to FIG. 23, FIG. 23 shows the operation of system 10 for tasks related to underwriting conditions. The steps shown in FIG. 23 have been described elsewhere and are described only briefly here. From step 636, the process proceeds to an underwriting task management step 650 and a work management step 652. For step 650, an underwriting conditions task list is generated at step 654 and task status is managed and monitored at step 656. For each task on the task list, a third party service may be contacted at step 658 pursuant to the work management step 652. At step 658, documents are requested, for example, to provide verification of information on the borrower's loan application. At step 660, documents received from the third party services are input in digital form. At step 662, the received document is associated with a particular loan application. At step 664, the document data is stored in the electronic data repository. At step 666, the document is verified and, at step 668, the document status is updated. The document status as noted in step 668 may be used to make a determination at step 670 whether a task is complete. At step 672, once all tasks are complete, the loan processing may proceed to closing at step 674. In FIG. 22, as shown, customizations to the generic process of FIG.

22 may relate to the manner in which tasks are routed (step 652), the generation of a task list based on underwriting conditions (step 654), the determination of which documents and services are to be ordered (step 658), and so on. FIGS. 24-25 show how the same generic task loop can be customized for use with other tasks, including closing tasks and post-closing tasks. As will be appreciated, the allocation of business logic between workflow engine 114 and rules repository 80 may vary. While in the exemplary embodiment workflow engine 114 is relatively generic and devoid of business logic, other arrangements are also possible.

3. Exemplary User Interface

Referring now to FIGS. 26-50, operation of system 10 will now be described in greater detail in connection with representative display screens presented via websites 22 to a user using a web browser. The web browser may, for example, be Internet Explorer or Netscape Navigator. For simplicity, aspects of the screen display associated with the browser itself (e.g., various web browser buttons, web addresses, and so on) are not shown.

Figure 26:
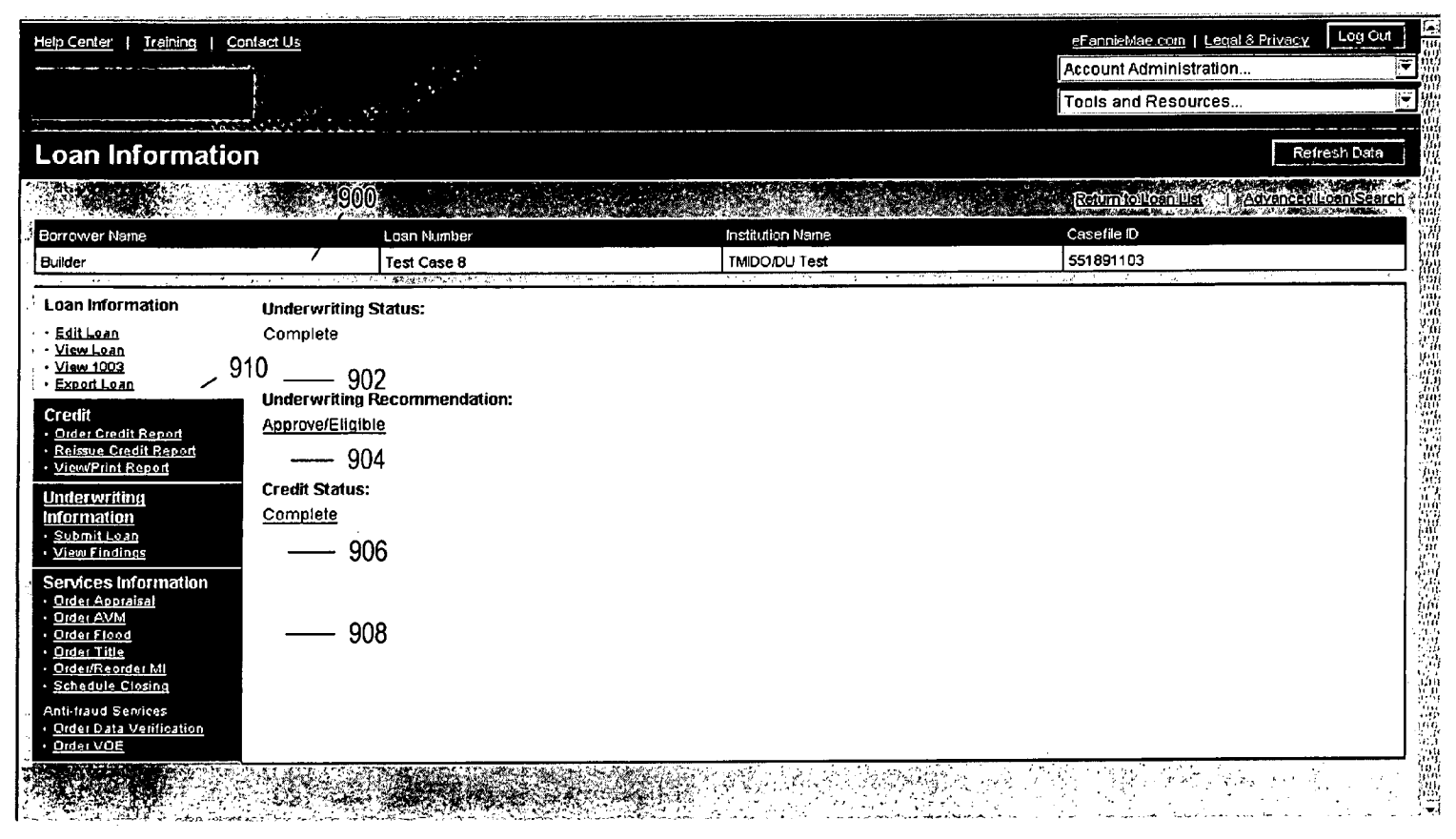

Referring first to FIG. 26, FIG. 26 shows a display screen which may be provided to a user by an automated underwriting engine 52 via automated underwriting website 72. As shown in FIG. 26, in field 900, the display screen indicates that the user is currently working on a loan application for a fictitious borrower named Suzi Builder. In region 902, the user may be presented with loan application-related options, including options to edit loan information, view loan information, or export loan information to workflow management components of system 10. In an exemplary embodiment, automated underwriting website 72 may be integrated with loan origination system 28, such that clicking on the links in region 902 causes the user to be presented with the types of display screens and functionality commonly associated with loan origination systems. The display screen further includes a region 904 in which the user is presented with credit report-related options, including options to order a credit report and view/print a credit report. The display screen further includes a region 906 in which the user is presented with underwriting-related options, including options to submit a loan application for underwriting and to view underwriting findings. The display screen further includes a region 908 in which the user is presented with service-related options, including options to order various services from third party service providers. Using button 910 in region 902, the user may export the loan application to workflow management components of system 10. The user may be presented with one or more additional screens (not shown) to transmit the loan application file via XML integration service logic 106. After the loan application has been exported, users may access workflow related websites 74 in order to process the mortgage application.

A workflow interface for loans transmitted to system 10 may be presented to users via websites 74 as shown in connection with FIGS. 27-50. Referring now to FIG. 27, after a user (such as a mortgage broker, loan processor, loan officer, etc.) logs in using a suitable login screen (not shown), the user may be presented with one or more fields 920 useable to enter search parameters to search for a loan of interest. When the "Find Loan" button 922 is pressed, the search parameters are submitted and search results are returned. In FIG. 27, the search results of a hypothetical search are displayed in region 924, and the search results identify a loan to the fictional borrower, shown as Suzi Builder, of Milwaukee, Wis. It will be appreciated that, depending on the search parameters, multiple loans may be listed, and the user may then be selected from the search results. Status information and other information may also be displayed for each loan returned in the search results, such as scheduled closing date, days to process, loan age, and last modified date/time, as shown. The user may be provided with the ability to sort loans according to one or more user-specified criteria.

Referring now to FIG. 28, upon clicking on a loan of interest (in FIG. 27, the Suzi Builder loan), the user is presented with additional information. In FIG. 28, the user is presented with a conditions list identifying conditions that need to be fulfilled and documents that need to be obtained. The conditions list, in a region 930, identifies a number of conditions that need to be met before closing of the loan (e.g., closing services need to be ordered, mortgage insurance needs to be obtained, and borrower income must be verified). The conditions information shown in FIG. 28 may be displayed based on task list 60 and/or based on codified findings file 136. For loan applications with multiple borrowers, distinctions may be made in the conditions list between conditions that relate to a single borrower, co-borrowers and multiple borrowers or any combination.

Status related information may be provided at the condition and loan level. In FIG. 28, the status of each of the conditions is designated as "New," the same as the condition status of the loan itself (as shown in region 932). Additional status information may also be displayed in other comment fields, such as "last modified by" and "last modified date/time." The user may click on various ones of the conditions shown in FIG. 28 in order to conduct further loan processing. For example, if the user clicks on the "Borrower income must be verified" condition, the user is taken to one or more screens that allow the user to perform tasks related to income verification.

Referring now to FIG. 29, a screen is shown that may be accessed by a user to perform tasks related to income verification. The screen display includes a region 940 which provides explanatory information regarding the selected condition. As described in region 940, for this particular condition, a number of options exist for satisfying the selected condition. The display screen further includes a region 942 which is configured to receive a user selection of one of the options for satisfying the selected condition. When a button press is received from the user via the "Next" button 944, the user is delivered to the next screen.

Referring now to FIGS. 30-31, a screen display is shown that is configured to track status and receive information concerning the selected loan condition. In the example of FIG. 30, the screen display is configured to track status and receive information relating to verifying the borrower's income and, particularly, to collecting documentation in connection with verifying the borrower's income. For example, the user is able to indicate that a pay stub has been requested from the borrower in a check box 950, and is able to indicate the date of the request in a field 952. As shown in FIG. 31, additional check boxes and fields 962, 964 are provided to receive indications from the user that a second paystub dated within thirty days of closing and a W2 from the prior year have been requested. Once the request has been made to the borrower and the information concerning the request has been entered by the user, a "Save Changes" indication from the user may then be received by way of a "Save Changes" button 966.

In an exemplary embodiment, in order to request documents from the borrower, a borrower checklist (such as that shown in FIG. 51) may be generated and presented to the borrower, along with a link to a fax coversheet for submitting the updated paystub. If the borrower then faxes in the updated paystub, the paystub may be associated with the borrower's loan application based on machine-readable information contained in the fax cover sheet, and the condition status may be automatically updated without user input from a loan processor. A system-generated e-mail or telephone call may also be sent to the borrower reminding the borrower of any missing documents. In the case of an e-mail, message content of the e-mail may be used to allow the borrower to submit the document electronically (e.g., via reply e-mail) and have the document associated with the loan application without user input. The loan processor or mortgage broker may also telephone the borrower to advise the borrower of requested documents or to provide such reminders.

Referring now to FIG. 32, a screen display is shown that is similar to the screen display shown in FIG. 28, but that has been updated to reflect progress made in processing the borrower's loan application. In the conditions list, the "Borrower income must be verified" condition is now shown to be "In Process" in field 970. Further, the documents that the user indicated had been requested now appear with a "document requested" status in fields 972. As previously indicated, where documents or services are ordered and received automatically, the status information may be updated without user involvement. As also previously noted, up-to-date status information as shown in FIG. 32 may be made available in different view-formats to a variety of users (e.g., broker, underwriter, lender processor, consumer, etc.) that are involved in processing the Suzi Builder loan application. When the status associated with a particular document or other condition changes, other users may be instantly provided with updated status information. The user may continue processing the borrower's loan application by selecting (clicking on) one of the other conditions to be satisfied. Assuming, for example, the user selects the mortgage insurance option, the user may be taken to one or more display screens configured to facilitate ordering mortgage insurance.

Figure 33:
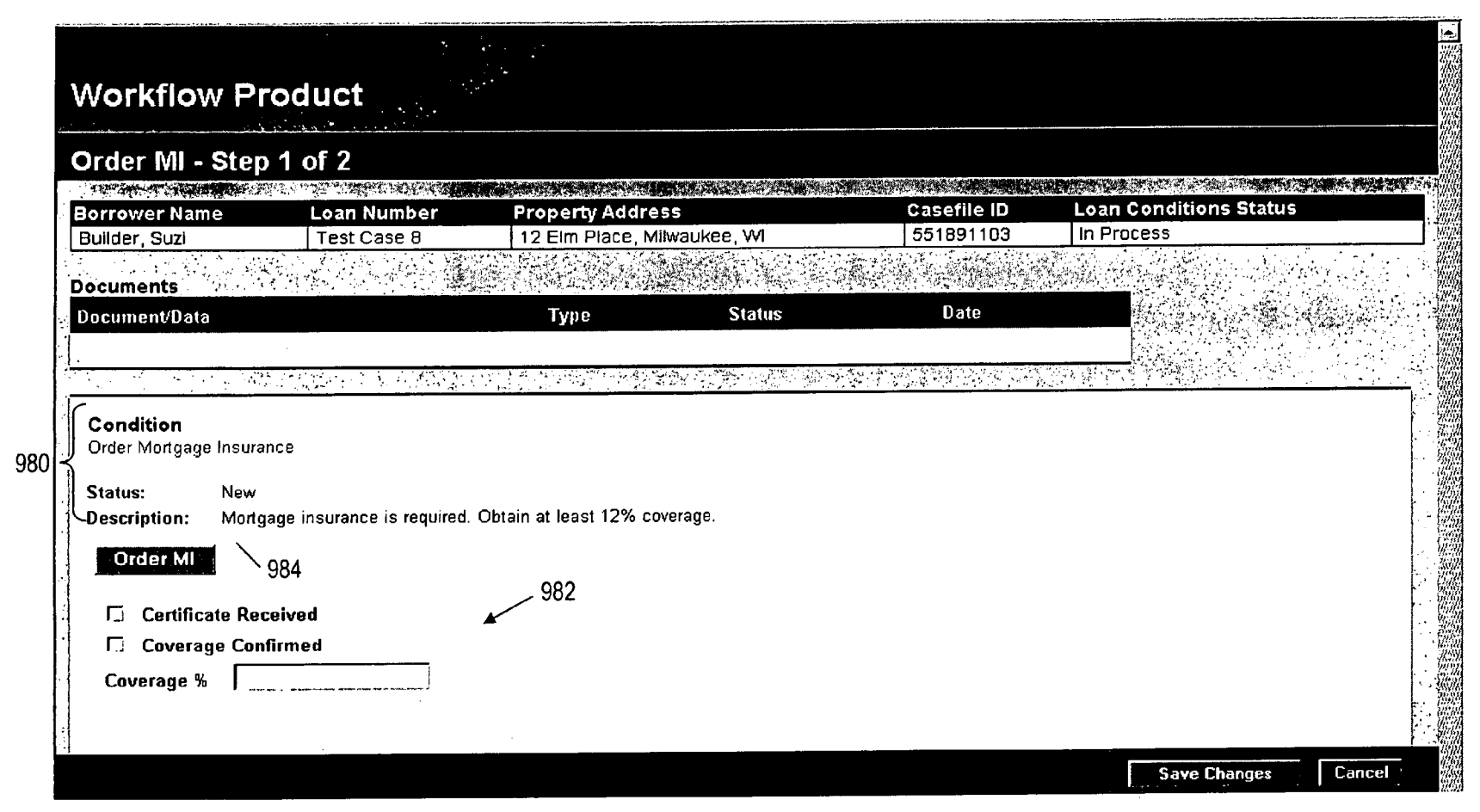
Figure 34:
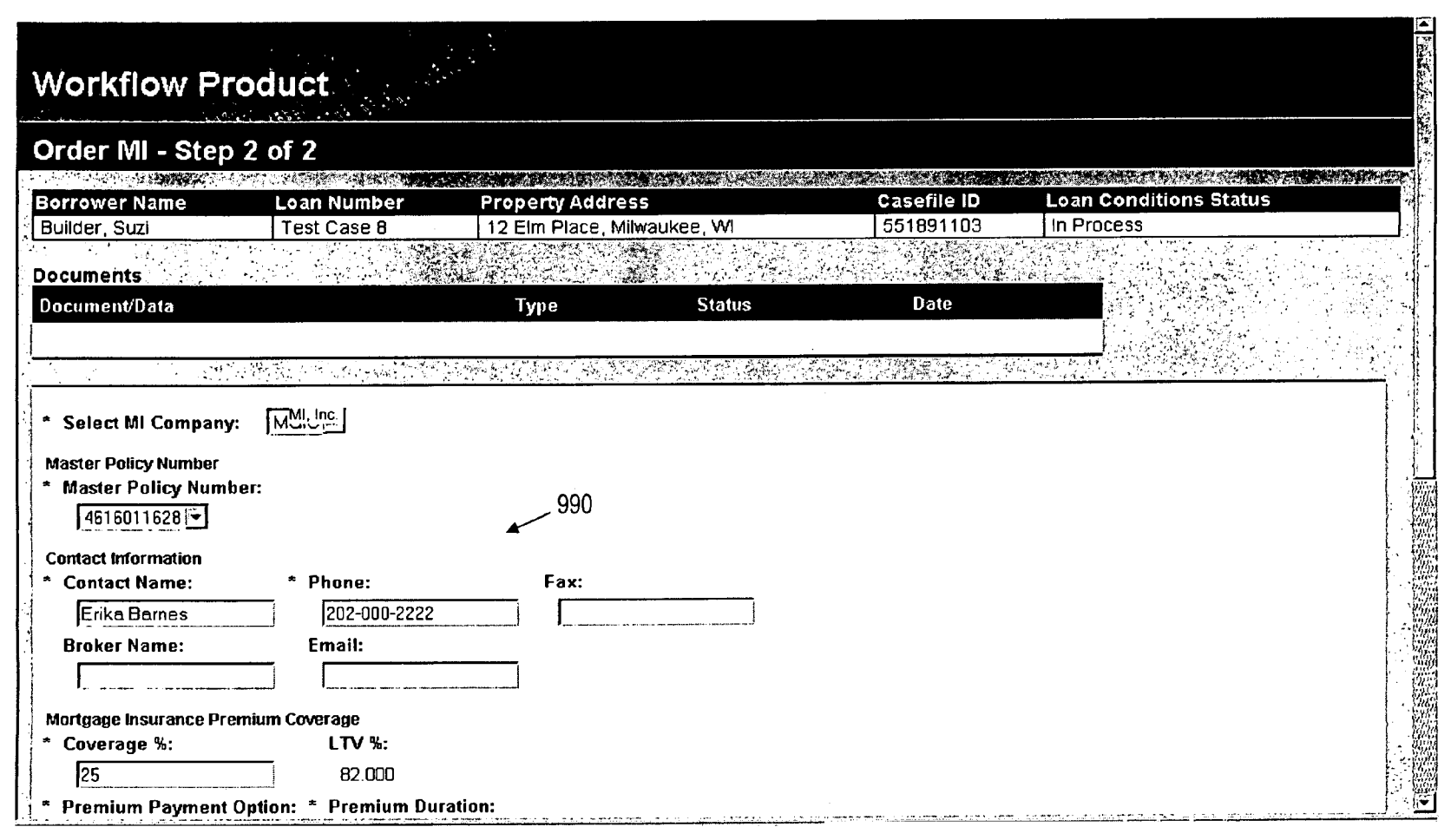

Referring now to FIGS. 33-35, screen displays are shown which facilitate ordering mortgage insurance. Referring first to FIG. 33, a screen display is shown which includes a region 980 that provides explanatory information regarding the mortgage insurance condition. The screen display also includes fields 982 configured to receive indications (certificate received, coverage confirmed) that mortgage insurance has been obtained and the coverage percentage for the mortgage insurance. In FIG. 33, mortgage insurance has not yet been obtained. Accordingly, user may press button 984 to proceed with ordering mortgage insurance.

Referring next to FIGS. 34-35, a screen display is shown which includes fields 990 that are configured to receive information for ordering mortgage insurance. (FIG. 35 is a continuation of the screen display shown in FIG. 34.) In one embodiment, the fields may receive information from the user. In another embodiment, the fields 990 may receive information from system 10 (i.e., may be prepopulated). Any information that is not prepopulated based on information contained in the loan application may be entered by the user. Once all of the information has been entered, the user may press the "Order MI" button 994, at which point the service request is transmitted to the service provider. If all required information has been pre-stored as a lender pre-set, all of the information may be populated by system 10 and mortgage insurance may be ordered without the need to present display screens or obtain input from the user.

Referring again to FIG. 28, the user is able to define custom conditions for individual loans. A button 998 may be pressed to add a new condition. If a press of button 998 is received, system 10 delivers the user to a screen display such as that shown in FIG. 36. Referring now to FIG. 36, an "Add New Condition" screen display is shown. The screen display includes a field 1000 configured to receive a title/name for the condition and a field 1002 configured to receive free-form text describing the condition. In the illustrated embodiment, the borrower is assumed to have a credit account with a hypothetical merchant ("ABC Merchant") and is assumed to have made a payment on the account which was more than thirty days late. (This information may, for example, have shown up in the borrower's credit report.) The user then names the condition "ABC Merchant Account" and provides the condition text "Collect explanation from borrower on over thirty day late payment." The condition title and condition text in fields 1000 and 1002 are entirely user-specifiable such that unusual/atypical conditions may be reflected in the conditions list. Additionally, the user may be provided with additional templates to add more fields or to otherwise specify tasks that need to be performed (e.g., documents that need to be obtained and verified) in connection with custom conditions. A predefined list of documents and templates may be provided that may be associated with a custom condition. A customizable form may be provided where custom sub-conditions may be added to the condition on an itemized basis. When this information has been entered, the user may press button 1004 to finish adding the new condition. Once the new condition is entered, task list 60 is updated. In the event of a reconciliation, the custom condition and associated status may be transferred to the updated task list.

Figure 38:
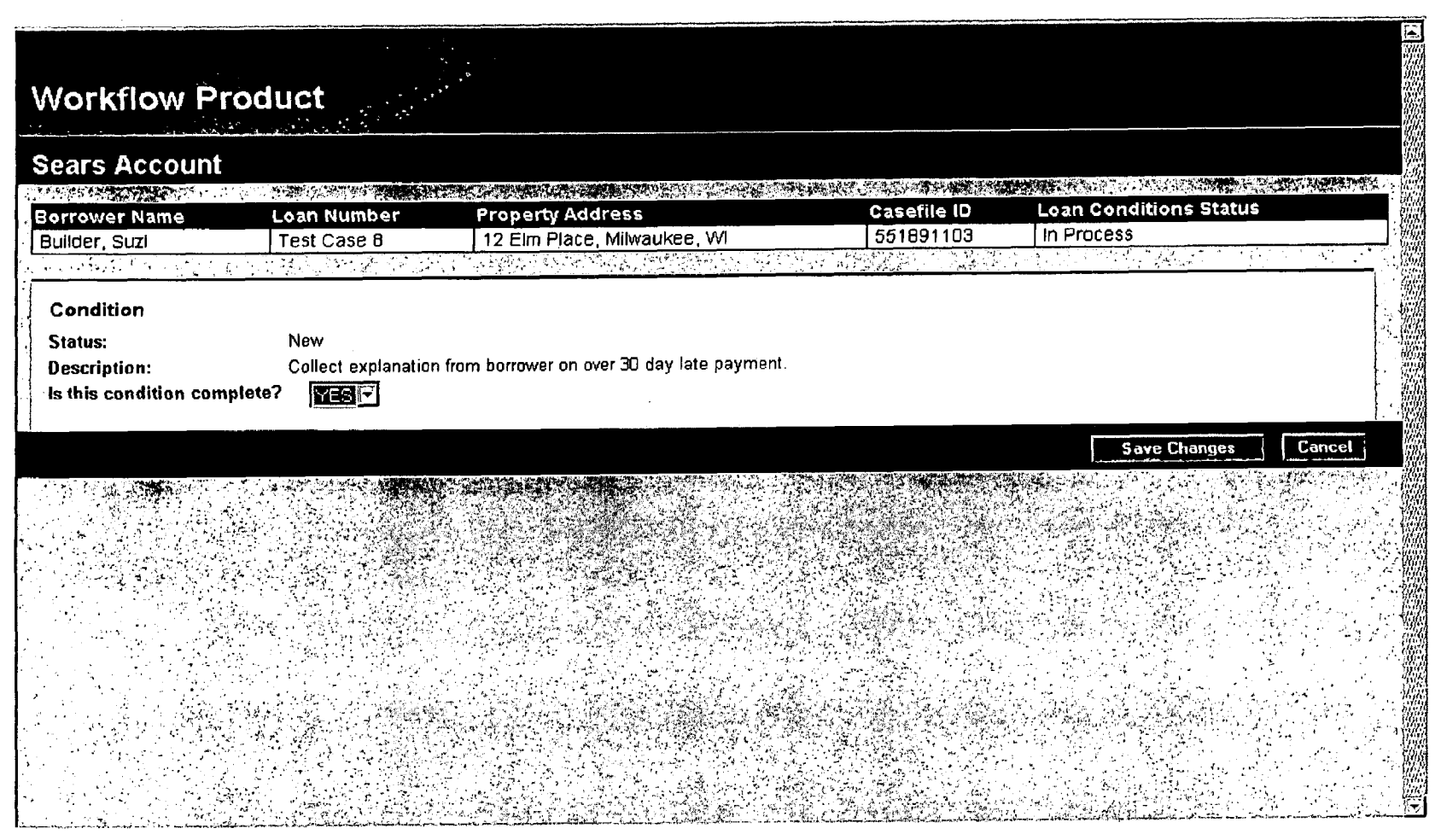

Referring now to FIG. 37, an updated status screen is shown which reflects additional progress. In FIG. 37, an updated conditions list 1010 reflects in field 1012 the new "ABC Merchant Account" condition added in FIG. 36. Because the condition has just been added, the status is shown as "new" in field 1014. With reference to FIG. 38, the user may indicate via a radio button 1014 when the condition has been completed. Although not shown, it will be appreciated that additional fields may be included, for example, for purposes of receiving additional comments regarding completion of the condition (e.g., a field to receive the borrower's explanation for the late payment).

Referring again to FIG. 37, after processing of the income verification and mortgage insurance conditions has occurred (as shown in FIGS. 29-31 and 33-35), the "in progress" status of these conditions may be reflected as such in fields 1016. Additionally, in updated documents list 1018, a number of the documents are shown as having been received in fields 1020. Such documents may have been received electronically and associated with the Suzi Builder loan application by data capture services logic 116 based on content contained in the electronic transmission, as previously described. Once a document has been received, the user may click on the document to open a viewer tool which allows the user to view the selected document.

Figure 39:
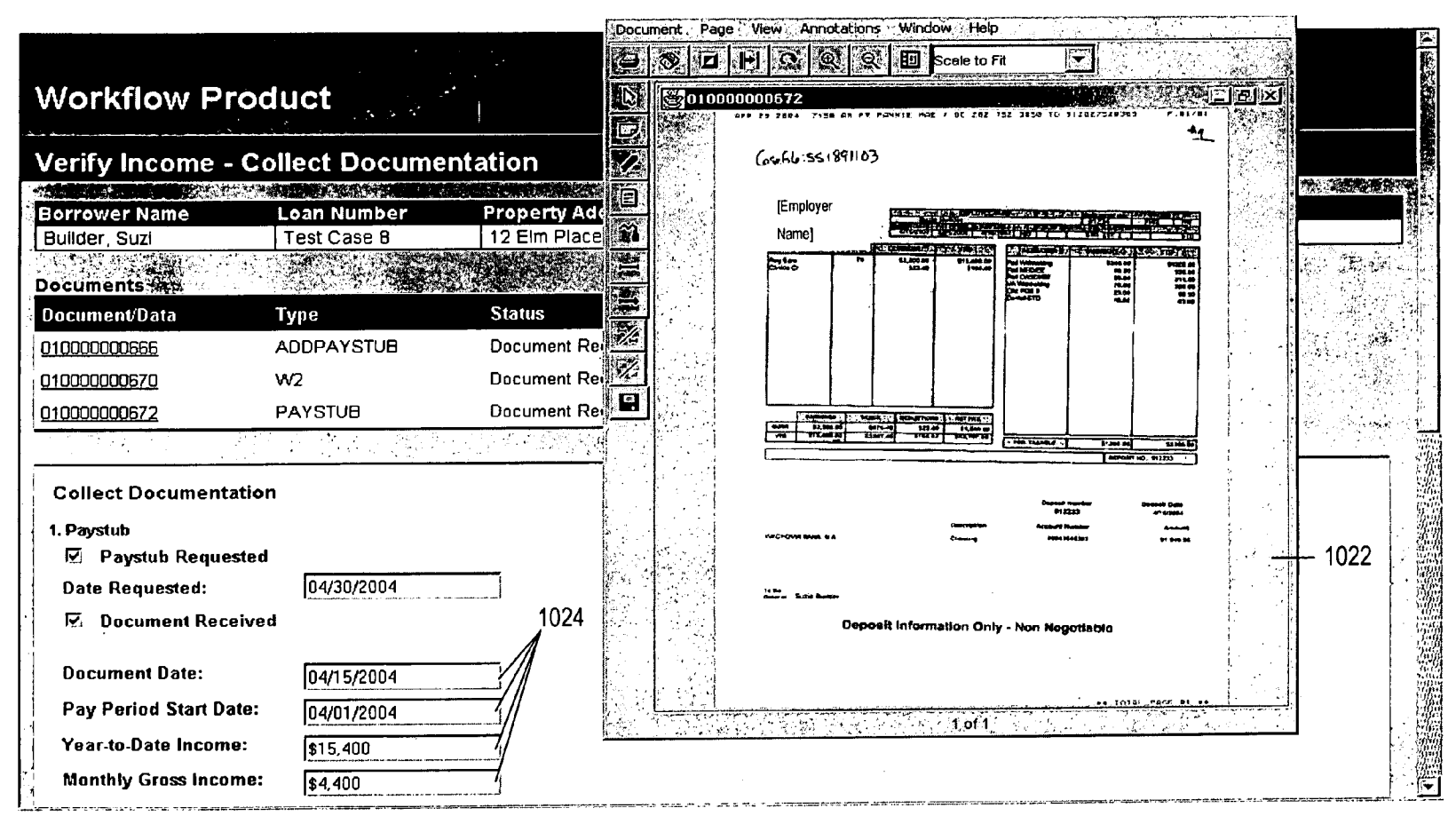

Referring now to FIG. 39, if the user clicks on the "Paystub" document, the user is presented with an image of the borrower's paystub in a window 1022. The user may then enter data from the paystub into fields 1024 so that the data may be transferred into a non-image format. The system validates data entered against data contained in the loan application file 134 and determines whether any discrepancies exist, as previously described. If discrepancies exist, the loan application may be resubmitted for underwriting and an updated task list may be generated. Messages may also be provided to the user about changes/discrepancies, and instructions may be provided to the user on how to reconcile differences, if necessary. Any changes in the loan application data are saved to the loan application data file 134 and ultimately transmitted back to loan origination system 28 so that the changes may be reflected in the eventual documents signed by the borrower.

Figure 40:
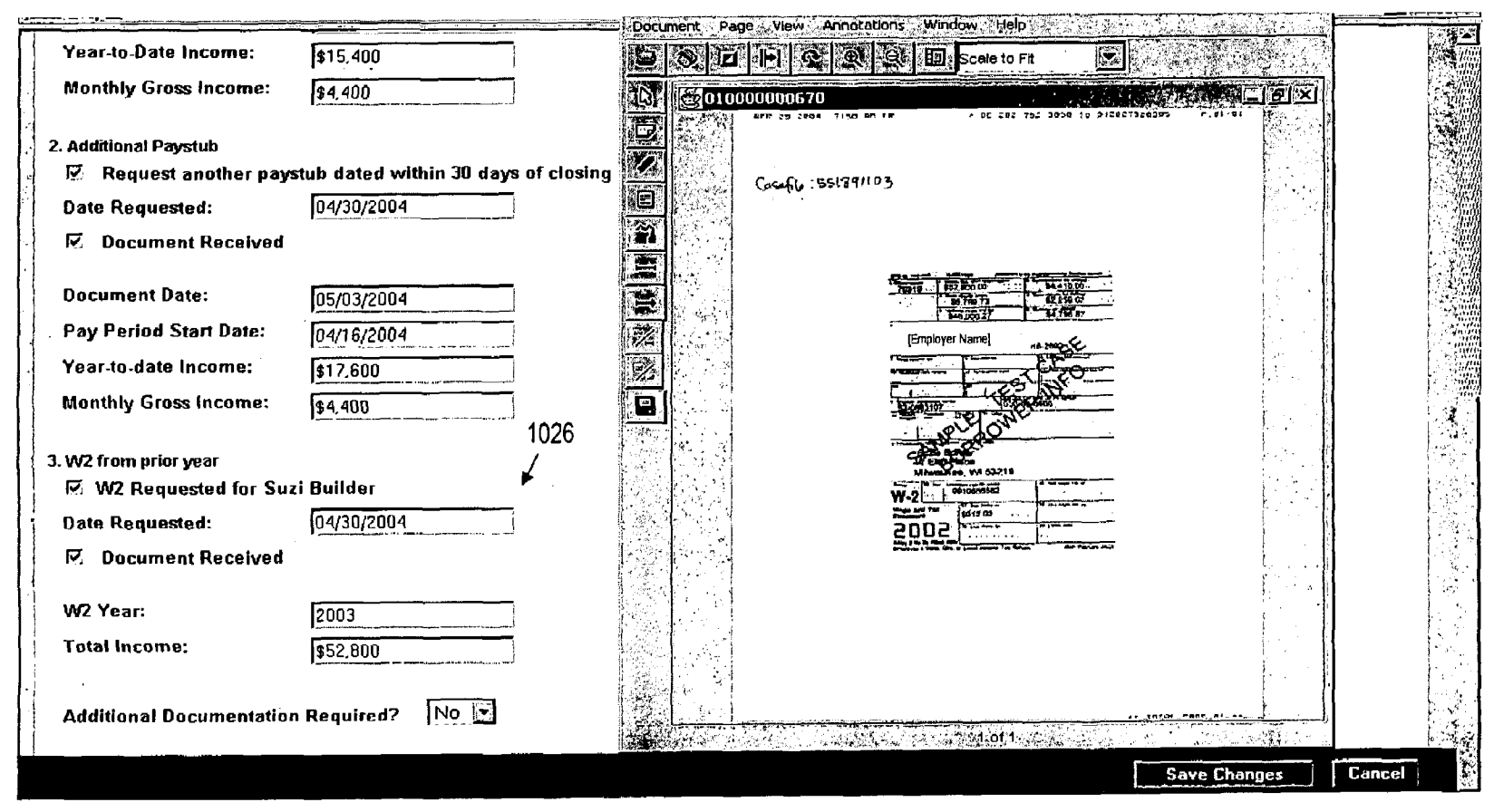
Figure 41:
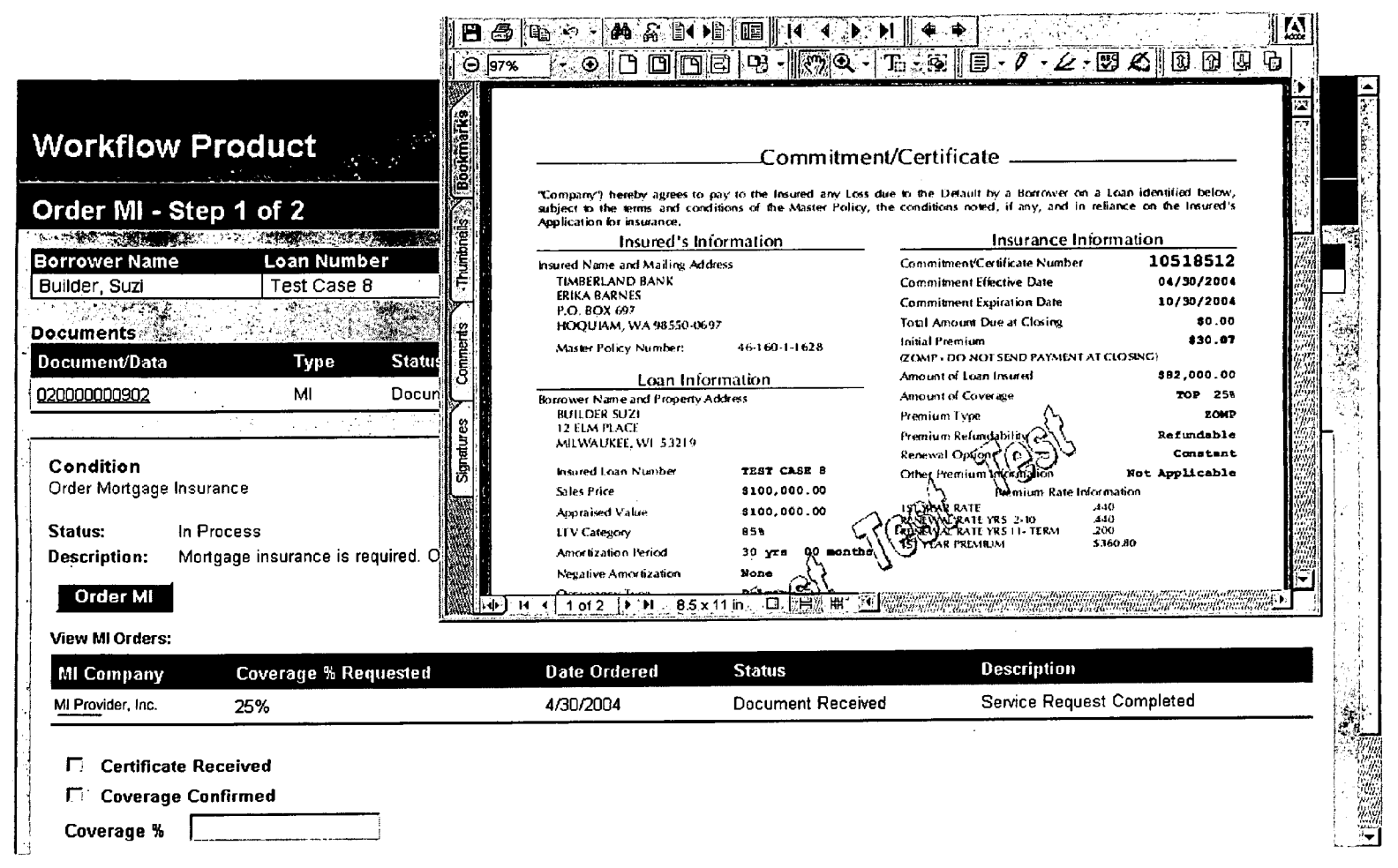

Referring now to FIGS. 40-41, FIG. 40 depicts a similar arrangement in which the borrower's W-2 is displayed after having been selected by the user. The user may then enter data from the borrower's W-2 into fields 1026. Again, changes in loan application data may be processed as described above. FIG. 41 depicts a similar arrangement in which a mortgage insurance commitment/certificate may be viewed such that the user can confirm (check boxes 1030 and 1032) that a mortgage insurance has been received and that coverage has been confirmed. Additional information may be entered (e.g., coverage percentage information may be entered into field 1034).

In an exemplary embodiment, a user may be provided with the ability to manually clear a condition by indicating to the system that the condition was satisfied outside of system 10. For example, if the borrower has given the loan processor a paper copy of the borrower's paystub or W-2, the loan processor may be provided with the ability to clear the condition even though an electronic copy of the paystub or W-2 has not been received by system 10. The loan processor may then scan in the documents after closing, if desired, for example, to complete the electronic loan file. Alternatively, if it is known that mortgage insurance has been obtained from a recognized mortgage insurance provider, albeit not from a mortgage insurance provider that is recognized by system 10, the condition may still be manually cleared by the loan processor.

Figure 42:
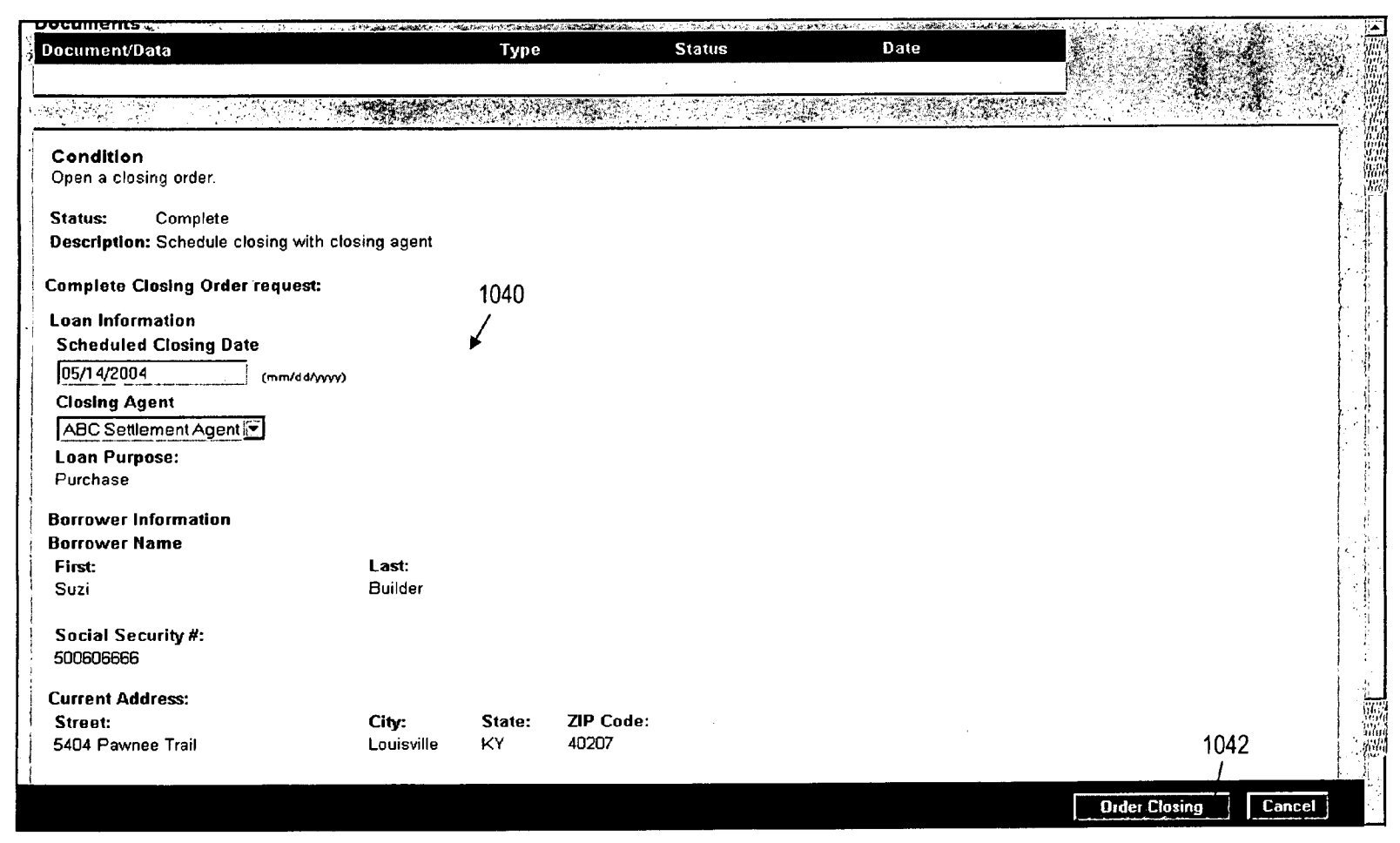

Referring now to FIG. 42, a portion of a screen display presented to a user for purposes of ordering closing services is shown. Again, fields 1040 may be prepopulated based on information contained in the borrower's loan application. Once the information has been entered, the user may push button 1042 to transmit the service request to the closing service. In another embodiment, all of the needed information is contained in the borrower's loan application data and in lender pre-set information, and the closing agent is selected in accordance with vendor rules 146, such that the service request may be transmitted to the closing service without user input and without using the display screen shown in FIG. 42.

Referring now to FIG. 43, an updated status screen is shown which reflects additional progress. In FIG. 43, the documents listed in an updated documents list 1050 have all been received and the conditions listed in updated conditions list 1052 have all been completed. As indicated in field 1054, the loan condition status is "Cleared to Close." FIG. 44 shows a loan list screen display. Although only the Suzi Builder loan is shown, it will be appreciated that other loans may be included in the loan list depending on the search parameters entered in the search template. In FIG. 44, in addition to showing that the loan has a status of cleared to close as in FIG. 43, other information including the closing date is also shown. In FIG. 44, the closing date is shown as May 14, 2004.

Referring now to FIGS. 45-46, the closing date in FIGS. 45-46 has been updated/postponed to Jul. 8, 2004 in field 1060. When the closing date is updated, system 10 may review previously met conditions to ensure that the conditions are still met. For example, system 10 may review time-sensitive documents (e.g., where the document must be dated within a predetermined time frame before the closing date) to determine whether the postponement causes one or more of the documents to be out of date in view of the new closing date.

For example, and referring now to FIG. 47, the borrower's income verification information will now be expired when the closing date arrives because the closing date has been moved about two months back. Accordingly, as indicated by a text message 1064, the additional paystub that is required for closing is no longer within 30 days of the closing date, and so a new paystub needs to be obtained. Also in FIG. 47, the paystub is indicated as being expired in field 1066, and alerts have been issued in fields 1068 and 1070. If the user clicks on the condition, the borrower may be delivered to a display screen as shown in FIG. 48, which provides additional information and which allows the user to proceed with obtaining updated information in a manner as previously described. In an exemplary embodiment, system 10 may create a system-generated e-mail message which is sent to the borrower and which notifies the borrower that an updated paystub is required, along with a fax coversheet for submitting the updated paystub. If the borrower then faxes in the updated paystub, the paystub may be associated with the borrower's loan application based on machine-readable information contained in the fax cover sheet, and the condition status may be automatically updated without user input from a loan processor.

Referring now to FIG. 49, an updated status screen is shown which reflects updated status. In FIG. 49, a field 1080 indicates that the borrower income verification condition is no longer considered completed but rather is considered in progress. Further, document list 1082 indicates that the original additional paystub for the borrower is expired, and that a new paystub has been requested. Field 1084 indicates that the loan as a whole is considered "In process." When the updated paystub is received, the user may manually extract and enter information from the paystub into system 10, or the information may be received in an electronic data file (e.g., an XML file), as previously described. The loan is then considered to be considered in a "Cleared to close" condition as indicated by field 1090 in FIG. 50.

Referring now to FIGS. 51-54, additional display screens are shown which may also be provided to users. In FIG. 51, a borrower checklist for a specific borrower is shown. The borrower checklist may list all the required documents and may include instructions for sending in the documents. The borrower checklist may be made available to the borrower, for example, by e-mailing the borrower a link to a website at which the display screen is located. The borrower checklist presents the borrower with information concerning what documents are required from the borrower in order to complete the loan application. The borrower checklist may be dynamically updated to reflect the receipt of documents or to reflect a change in status (e.g., a document that is no longer required) in the event the loan application is resubmitted for underwriting. If desired, additional explanatory information may be presented to the borrower with the borrower checklist concerning the documents the borrower needs to submit.

In FIG. 52, a comprehensive checklist is shown. The comprehensive checklist includes a comprehensive list of documents that need to be obtained and other conditions that need to be fulfilled. The comprehensive checklist allows the user to view all of the requirements that need to be satisfied for the selected condition. It allows the processor to view all the digitized documents associated with the condition, as well as the status of the documents. Underwriters can add custom conditions so that the conditions become part of the checklist. Again, custom conditions such as flood certification which are not typically included in underwriting findings may be included in the comprehensive checklist. The checklist may further include information such as the person to whom the condition is assigned for processing, the date and time assigned, priority, associated documentation, associated sub-conditions, and so on. The comprehensive checklist may be provided to the borrower to facilitate obtaining needed documents from the borrower. For example, the comprehensive checklist may be e-mailed or may be made available to the borrower by providing the borrower with a URL and login ID/password. In the borrower's version of the comprehensive checklist, additional information may be included, such as instructions for submitting documents and/or fax cover sheets for use in faxing in documents.

In FIG. 53, a productivity report is shown. The report may be presented to the user via administrative website 76. The report shows how much time was required to process individual loan applications. Other information such as the loan processor or underwriter may be included. Fields may be included to show other information, such as loan processors or underwriters associated with each loan application. The user may be provided with the ability to sort on various fields, for example, to sort on the duration field to determine whether short/long duration processing times are correlated with any particular loan processor or underwriter.

Figure 54:
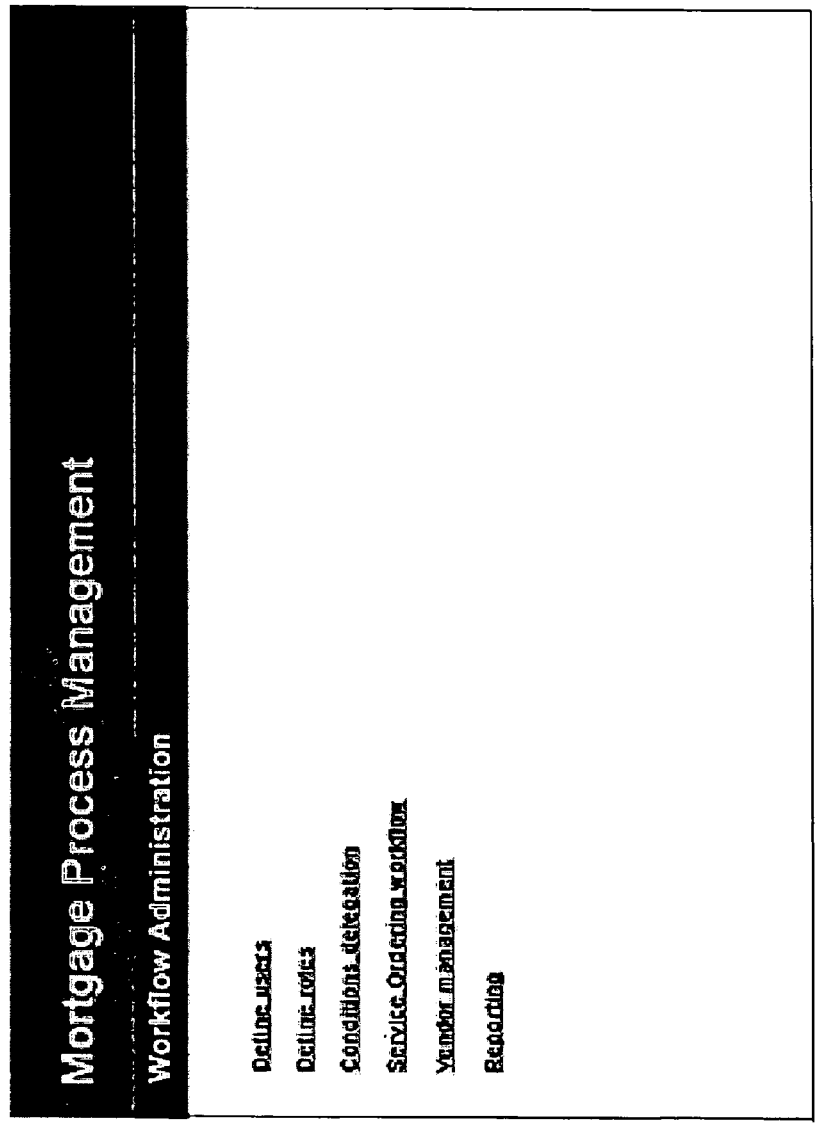

In FIG. 54, a display screen presented by administrative website 76 is shown. The display screen provides the user with links to configure various lender-configurable parameters, such as user definitions, role definitions, conditions delegation, service ordering workflow, vendor management. The display screen also provides the user with links to access various reporting tools.

4. Workflow Analysis Logic and Other Features

Figure 55:
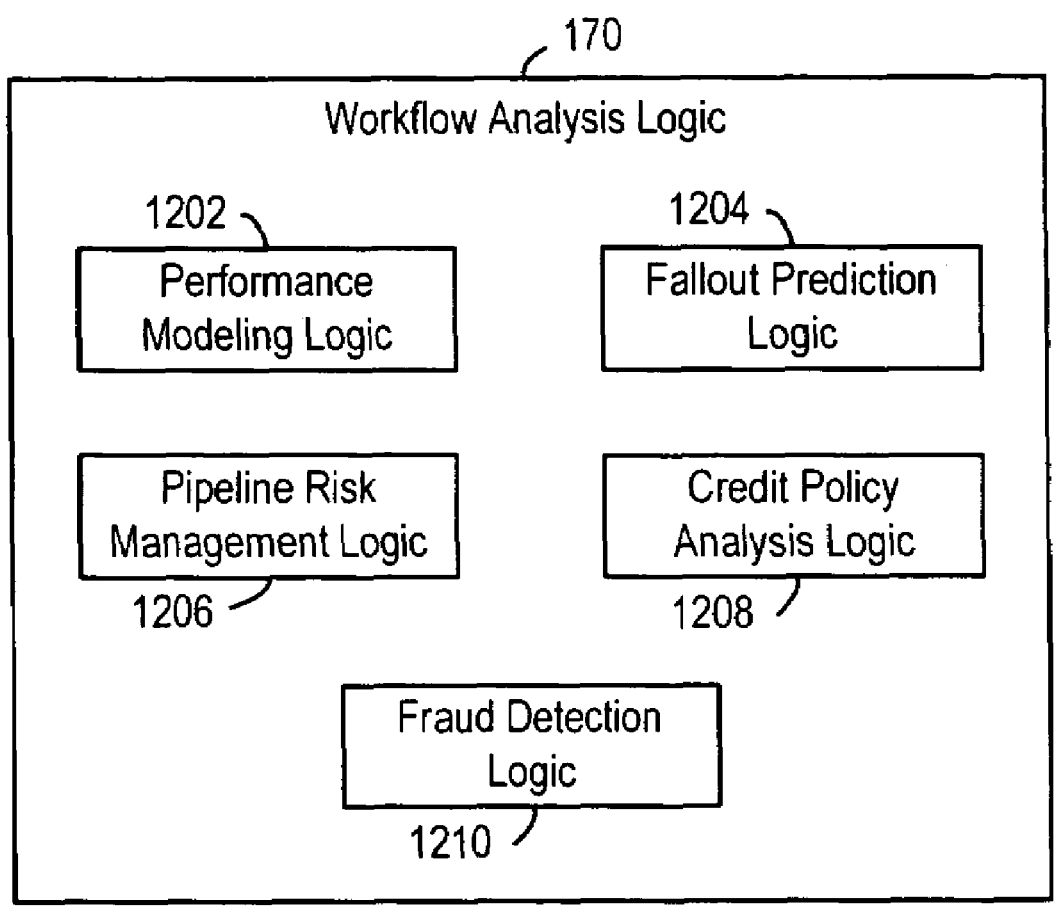
FIG. 55 is a block diagram showing workflow analysis logic of FIG. 2 in greater detail.
Figure 56:
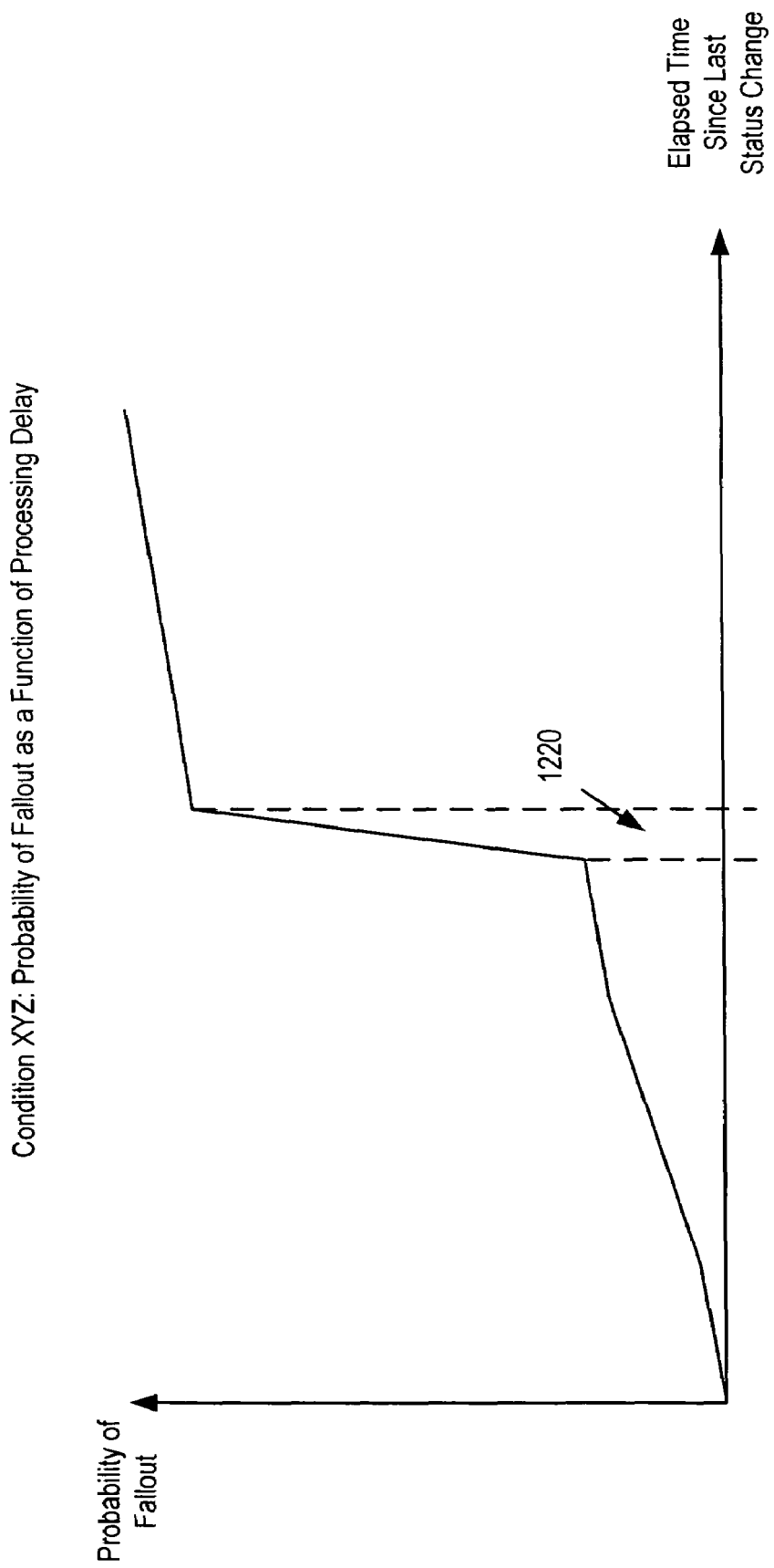
FIGS. 56-57 are reports which may be generated based on performance modeling performed by workflow analysis logic of FIG. 2.
Figure 57:
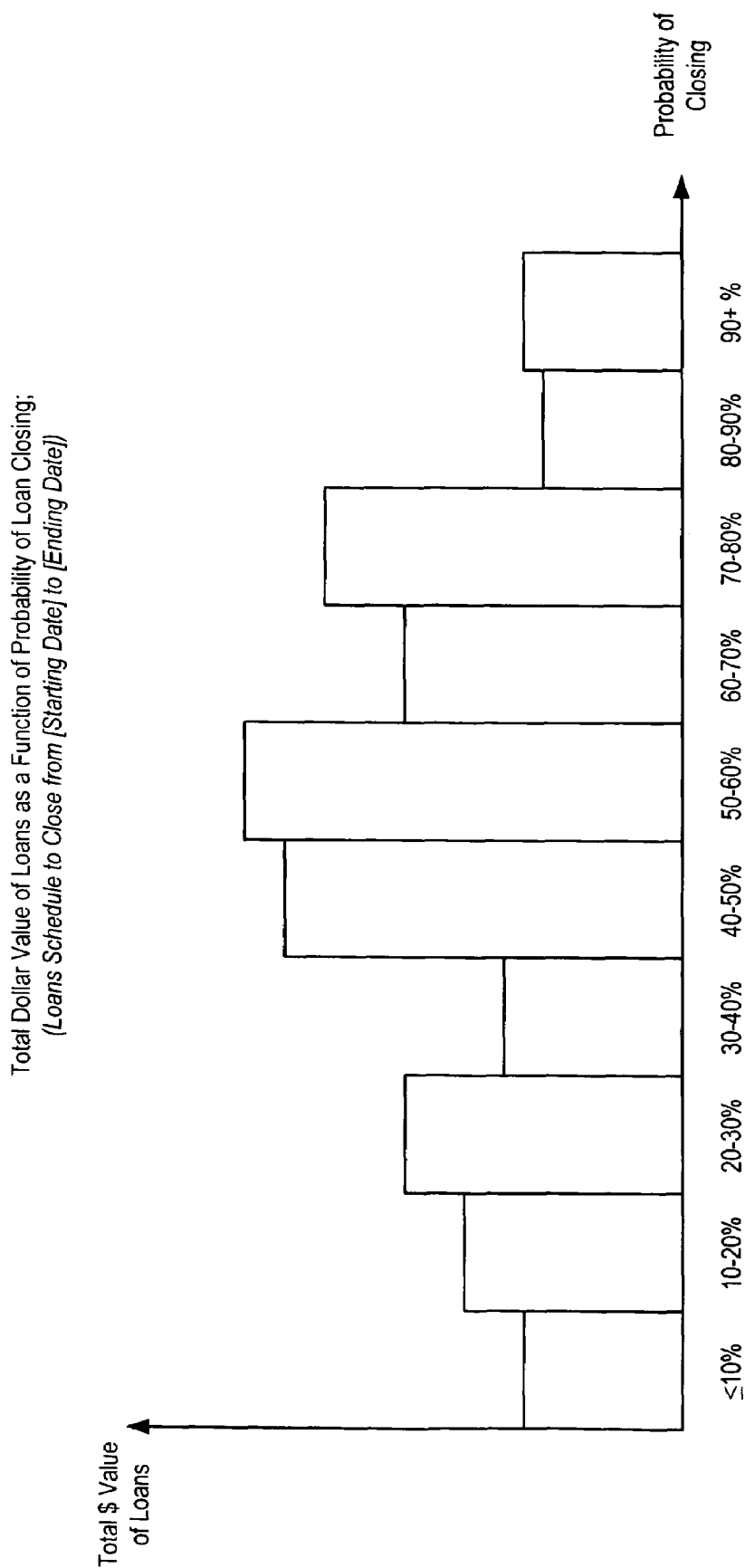

Referring now to FIGS. 55-57, workflow analysis logic 170 is described in greater detail. Workflow analysis logic 170 comprises performance modeling logic 1202, fallout detection logic 1204, pipeline risk management logic 1206, credit policy logic 1208, and fraud detection logic 1210.

System 10 is capable of aggregating data related to the mortgage origination process across a much broader range of activities than is possible by an individual user. Workflow analysis logic 170 may be used to analyze the data gathered by system 10 and provide lenders with additional insight about their loan pipeline. Because workflow analysis logic 170 looks at a much larger number of loans, it may be capable of recognizing patterns and likely outcomes that might not be recognized by an individual processor working on a smaller number of loans.

Performance modeling logic 1202 may be used to model the performance of loans, for example, to analyze loans that have fallen out of a loan pipeline to determine likely causes of fallout. To this end, performance modeling logic 1202 may store one or more mathematical models that are useable to model the performance of loan applications (and/or resultant loans) and thereby to predict the probability of an adverse event (e.g., fallout, delinquency, default, prepayment, and so on) of a loan application under consideration based on past performance of other loan applications that have been processed using system 10.

Performance modeling logic 1202 may utilize any of a wide variety of statistical models. Also, the explanatory variables for the selected statistical model may be any of a wide variety of loan processing metrics acquired by system 10 and other loan variables. Also, different numbers of variables may be used. Preferably, the model types, loan variable types, and number of loan variables are chosen so as to enhance the predictive value of the models.

For example, performance modeling logic 1202 may be based on a model that links the set of explanatory variables with the probability of an adverse event (e.g., fallout, delinquency, default, prepayment, etc.). For example, a logit model having the following form may be used:

$$P_n = \frac{e^{X_n \beta}}{1 + e^{X_n \beta}} \qquad \text{Eq. (1)}$$

where X represents the explanatory loan variables, β represents parameters or weighting coefficients of the model, the subscript n specifies a particular loan, and P is the probability of the adverse event for a particular loan n. X and β may be vectors. For example, if there are K loan variables (X) and N number of loans (that is, in the set of loans used as datapoints to construct the model), then there are K×N different values of X for the N loans:

| $X_{1,1}$ | ... | $X_{K,1}$ |
| ... | | ... |
| $X_{1,N}$ | ... | $X_{K,N}$ |

The K loan variables (X) associated with a particular loan n represent a vector of control variables $X_i$, of the form:
$X_{1,n} \ldots X_{K,n}$.

Similarly, β in Eq. (1) represents the model parameters or weighting factors $\beta_1$ through $\beta_K$ for all of the loan variables X, $X_1$ through $X_K$, in this example. Equation (1) may therefore be rewritten in longer form as follows:

$$P_n = \frac{e^{(X_{1,n}\beta_1 + X_{2,n}\beta_2 + \ldots + X_{K,n}\beta_K)}}{1 + e^{(X_{1,n}\beta_1 + X_{2,n}\beta_2 + \ldots + X_{K,n}\beta_K)}}. \qquad \text{Eq. (2)}$$

It will be appreciated that variable definitions and equations used herein are merely exemplary and other specifications may be used.

Numeric or categorical values for each explanatory variable X may be assigned and used in Eq. (1). For example, in the case of a model used to predict fallout, an explanatory variable may be document status at the time of fallout of a particular document requested from a borrower, and categorical values which may be assigned to this explanatory variable may include Not Requested, Requested, Received (and not yet reviewed), Accepted and Rejected (or whatever other status options are defined in system 10).

Statistical procedures may be used to determine the optimal values for the weighting coefficients β based on loan applications that have previously been processed using system 10. Different estimation techniques may be used to select the optimal weighting coefficients β, as known to those skilled in the art, depending on the regression model used, such as simple linear regression, multiple linear regressions, logistic regression, and so on. The type of regression technique chosen may depend on the type of model used, number/types of input variables to the model and/or the output variable that is desired to be produced. In the embodiment described herein, a logistic regression is used. Logistic regression is used to model the relationship between a categorical variable/discrete outcome (e.g., binary response variable) and one or more predictor variables, which may be either discrete or continuous.

The estimation algorithm may be performed using a loan data set for which the relevant performance history is available (that is, for which the actual outcome such as fallout, delinquency, default, prepayment, etc., is known, depending on what the model is used to predict). Coefficients β may be selected which minimize the generalized error (e.g., mean squared error) in the model in predicting the performance of the loans in the loan data set. Regression estimation techniques such as maximum likelihood may be used. Thus, an initial set of β coefficients may first be computed, and then additional sets of β coefficients may be iteratively computed until a set of β coefficients is arrived upon that is considered to be the most optimal set of β coefficients. This is readily available as a canned procedure in many statistical program languages and commercial software packages, such as PROC LOGISIC in SAS®. Once the β coefficients are selected, the probability of an adverse event in connection with a particular loan application may be calculated using Equation (2), above, and the relevant loan variables (X's) for that loan application.

Additionally, different sets of models may be used to predict the same event but based on different data sets. For example, the same model may be used, but the weighting coefficients may be different as a result of a different data set. That is, if it is desired to know the likelihood of fallout given that X days have passed since a particular document was requested from the borrower, the weighting coefficients may be estimated based on a loan data set consisting only of loans in which X days or more had passed. A series of such identical models with different weighting coefficients may then be constructed, for example, in one day increments. In alternative embodiments, timing information may be built into the model itself rather than being used as a selection criterion for data used to construct the model.

Fallout prediction logic 1204, pipeline risk management logic 1206, credit policy logic 1208, and fraud detection logic 1210 may each be used to generate messages (e.g., notifications, alerts) and reports based on the mathematical models stored in the performance modeling logic 1202. Using the above techniques, mathematical models may be developed to predict virtually any event that it is desired to predict (i.e., assuming the loan processing data and other loan application data collected by system 10 is useful for predicting such event). For example, performance modeling logic 1202 may use one or more such models to predict the likelihood of different types of events.

Fallout prediction logic 1204 may be used to provide alerts to the loan processor or other user that is particular loan application is in danger of falling out. As shown in FIG. 56, a report showing the probability of fallout as a function of processing delay may be generated for various conditions. In FIG. 56, after a time period 1220 in which the probability of fallout increases dramatically with further delay, it is seen that the loan is highly susceptible to fallout. This information may be used to provide alerts to loan processors. For example, in a list of active loans for a loan processor, an alert may be provided next to any loan for which the probability of fallout out exceeds a predetermined threshold. Upon drilling down on the loan, the loan processor may be provided with information as to the reason that the loan is in danger of falling out, such as the fact that there has been delay in processing a particular condition. The loan processor can then take action. Fallout prediction logic 1204 may cooperate with prioritization rules 148 to drive the prioritization of tasks to be performed by a loan processor as a function of the likelihood of fallout, as previously described.

Reports may be generated showing documents/conditions that, if not fulfilled, are highly correlated with fallout. Conditions that are correlated with a high probability of fallout may be identified and examined. Reports may be used to answer questions such as, "Did fallout occur because a particular document was requested, or is the customer just obtaining a loan from a different lender?" The document requirement may then be examined, and modifications may be made to either assist the borrower with providing the required document, or to remove the document as a requirement. Reports may be generated showing which conditions are most likely to cause fallout. Such reports may be useful in making generalizations such as, "If the loan application passes step 12, the risk of fallout drops by 80%. If it gets stuck at step 3 for more than 10 days, the risk of fallout increases by 75%." Feedback obtained from system 10 may be used to identify potential modifications that could be made to the loan origination process to help reduce fallout.

Also, when a loan application has fallen out of a lender's pipeline, fallout prediction logic 1204 may be used to try to retroactively to determine a likely cause of fallout based on the loan application data at the time of fallout, or based on known parameters which are highly correlated with fallout. In some cases, the cause of fallout may be a problem that may be easily remedied by offering the borrower a different mortgage with different repayment terms or different underwriting requirements. For lenders that serve underserved borrowers, for example, by providing the lender with an analysis of the loan application, including likely causes of fallout, the lender is given the opportunity to contact the borrower to try to close a different loan. An updated loan application may then be received in system 10 for the borrower and the new loan.

Fallout may include not only situations where no loan is made at all (relevant where the purpose of the fallout inquiry is to improve service to underserved borrowers, or to improve hedging strategies), but may also include situations where a borrower renegotiates key terms of the loan, such as discount points, interest rate, obtains a closing date extension, and so on (relevant primarily only where the purpose of the fallout inquiry is to improve hedging strategies). Fallout prediction logic 1204 may include different models with different explanatory variables and/or different weighting coefficients in order to take into account the different possible intended purposes of the fallout analysis. Factors affecting probability of fallout, particularly in the latter situation, may include rate lock types, type of product, purpose of loan (refinance vs. purchase), source of loan (retail vs. wholesale, geographic region, branch), lock period, processing status of loan, and arrangements such as re-locks, float downs and negotiations.

Pipeline risk management logic 1206 may be used to monitor the status of workflow conditions for a loan application for purposes of performing pipeline risk management and secondary market hedging functions. System 10 provides a real time indication of the status of loans in a loan pipeline. For example, when workflow deadlines for a particular loan application start passing without being met, the system may make an assumption that the loan is falling out of the loan pipeline. Accordingly, it is possible to identify or predict fallout earlier in the process, based on missed deadlines. This would result in a different hedging strategy than if the loan application had met the workflow conditions in a timely manner. Accordingly, information obtained from system 10 may be used to drive hedging strategies, such as the buying and selling of different financial instruments (e.g., options, futures, etc.) which implement those strategies.

Additionally, historical information may be analyzed to identify likely fallout points, as described above in connection with fallout analysis logic 1204. With this information, the progress of a loan application through the loan pipeline may be monitored to drive hedging strategies, including when the loan application progresses past the likely fallout points.

As yet another example, the probability of fallout may be tracked and updated for a particular loan application as a function of (1) the current location of the loan in the loan pipeline and (2) the historical performance of other similarly situated loans that have reached the same point in the same loan pipeline. This would allow statements of the following type to be made: "Given the following X workflow conditions for this loan application which have been satisfied, this loan currently has a Y % chance of closing based on the historical performance of similarly-situated loans in the past." This information may then be aggregated for all loans in a lenders pipeline, or for a subset of loans in the lender's pipeline (selected, for example, based on closing date). As shown in FIG. 57, the lender may generate reports which show the makeup of the lender's loan pipeline. FIG. 57 shows the total dollar of loans as a function of the probability of closing for loans closing during a predetermined time frame. A lender can use this information to make hedging decisions. A lender may execute buy/sell transactions to vary the mix of different types of financial instruments commonly used for hedging (e.g., options, futures, no hedging, and so on). The mix of financial instruments may be reconfigured to take into account the likelihood of closing as well as the time frame for closing. Also, pipeline risk management logic 1206 may be used to more accurately predict estimated closing dates. For example, a loan may be scheduled to close on a certain date, but it may be determined that the likelihood of the loan closing on that date is low because insufficient progress has been made in processing the loan application thus far (e.g., based on the status of various documents relative to the scheduled closing date). The probability of a given loan closing on a given date given the current status of various documents may be predicted based on prior closing performance of other loans. This information may then be aggregated for a group of loans and used in making hedging decisions. For example, given longer time horizons until closing, different financial instruments may be used for hedging.

Credit policy analysis logic 1208 may be used to generate reports based on performance modeling logic 1202 which are useful for making credit policy decisions. A model may be stored which is useable to predict the likelihood of an adverse event such as delinquency, default, or prepayment. For example, borrowers that respond quickly to document requests may be more in control of their own personal finances. Accordingly, faster response times may be correlated with lower probabilities of delinquency or default. This information may be used to drive risk management strategies in connection with loans held in portfolio and/or loans held in trust (e.g., in the case of securitized loans). This information may also be used to drive credit policy decisions in connection with the same borrower in future transactions (e.g., in the case of a refinancing).

Fraud detection logic 1210 may be used to generate reports and messaging concerning the probability of fraud in specific situations. Data underlying fraud detection models may be gathered based on prior instances in which fraud was detected. Based on this data, statistical analyses may be performed to identify correlation between certain types of loan processing events and fraud. For example, the fact that a borrower took a long time to submit a document, coupled with the fact that there were discrepancies between the information contained in the document and the loan application information as originally reported by the borrower, may be used to trigger a fraud alert.

The weighting coefficients may be automatically re-optimized in order to dynamically update the models. For example, the estimation algorithms for determining the weighting coefficients may be re-executed on a periodic basis (e.g., once per week, once per day, etc.) to determine new weighting coefficients based on the most recent loan performance data. The loan data set may include a rolling group of loans (e.g., loan going back a predetermined period of time, e.g., the previous month, the previous three months, the previous six months, etc.). This allows changes in market forces (e.g., changes in the economy) that affect the correlation between certain parameters and the likelihood of corresponding adverse events to be reflected in the models. Further, as described above, fallout prediction may be used to drive other aspects of processing, such as the priority which is assigned to certain tasks. Accordingly, revised models which reflect recent changes in market conditions may be used to adapt future loan processing activities to the new market conditions. For example, the sequencing of tasks may be varied based on market conditions so as to minimize the probability of fallout under the different market conditions.

Figure 58:
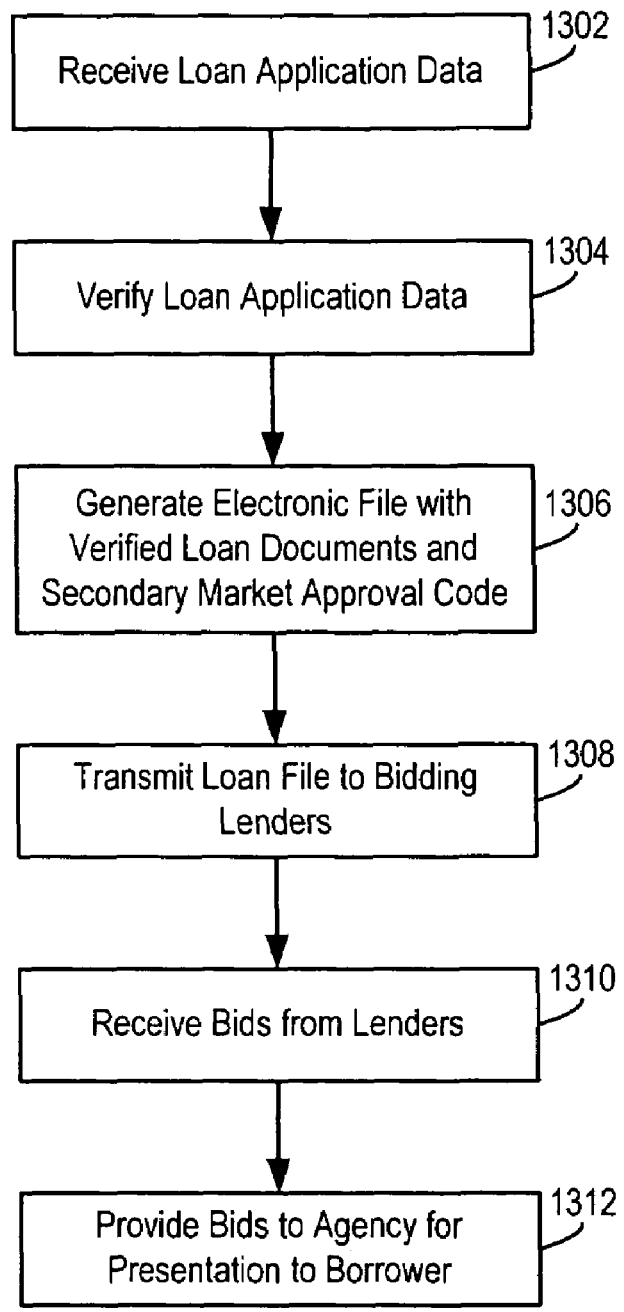
FIG. 58 is a flowchart showing operation of the system of FIGS. 1-2 in connection with improving the ability of underserved borrowers to obtain a mortgage loan.

In another exemplary embodiment, and referring now to FIG. 58, a third party intermediary may provide a document collection and/or review service for the borrower, and facilitates providing the borrower with a loan application with verified documentation that is pre-designated as suitable for sale in the secondary mortgage market. As will be seen, this arrangement may provide underserved borrowers with a loan application which is more marketable to lenders, and may result in an increase in their ability to obtain loans on favorable terms.

At step 1302, loan application data is received for the borrower's loan application. The loan application data may be provided by the borrower via a consumer interface as described in the above referenced '701 application. The borrower may submit the loan application for automated underwriting, receive a list of approved mortgage products, make a selection of one of the approved mortgage products, rate lock the selected mortgage product, and so on, as also described therein. The mortgage loan application may then be submitted by the borrower for processing by system 10.

At step 1304, the loan application data is verified. In one embodiment, step 1304 is implemented by providing the borrower with document checklists advising the borrower what documents are needed to complete the borrower's loan application. The borrower may also be provided with instructions for submitting the documents to data capture services logic 116. The borrower may also be provided with the ability to implement changes to status conditions, to extract data from documents (e.g., W-2's, paystubs, etc.), to enter the data in system 10, and to perform other functions described above as being performed by brokers and loan processors. When all of the loan application documents required by the underwriting conditions have been collected and entered into the system by the borrower, the borrower may notify the third party administrator. The third party administrator may then perform an independent review to ensure that the proper documents have been submitted and that the data has been properly verified.

In another embodiment, step 1304 is implemented by an entity that provides a trusted information repository 315 (see FIG. 8). For example, a trusted repository service arrangement may be established in which consumers agree to permit the service to sell the consumer's information to advertisers in exchange for a portion of the fee collected by the trusted repository service from such advertisers. In other words, the consumers agree to sell personal information to advertisers for a fee, with the trusted repository service acting as an intermediary in the transaction. The consumer may also give the trusted repository service rights (e.g., access codes/passwords) to access the consumer's information from other entities, such as from the consumer's employer, credit agencies, IRS databases, other government and financial databases, and so on. To the extent that any such database are not already available, information may be obtained via manual submission paperwork of the borrower to the trusted information repository to create such databases. The process of verifying the loan application data may then be reduced to comparing (for example, in system 10) the loan application data to the information stored in the trusted information repository 315.

In another embodiment, step 1304 may be implemented by accessing various database that store consumer financial information, e.g., using access codes provided by the consumer. That is, trusted databases may be implemented that store tax information, credit information, employment information, and so on, and that may be accessed by the consumer or by another party with the approval of the consumer. The process of verifying the loan application data may then be reduced to comparing (for example, in system 10) the loan application data to the information stored in the trusted database.

At step 1306, an electronic file is generated which includes verified loan documents and a secondary market approval code. The loan application and the complete documentation may be provided to the borrower in the form of a data file that can be authenticated (e.g., images of paper documents placed in an XML data wrapper). The data file may include an authentication code from a secondary mortgage market participant (e.g., the provider of automated underwriting engine 52) indicating that the loan, as represented in the data file, after being made by a lender, is suitable for sale to the secondary mortgage market participant in the secondary mortgage market.

At step 1308, the electronic file is transmitted to bidding lenders. The electronic file may be submitted by the borrower or automatically by system 10. Because a fully verified data file is submitted, there is no need for the lender to perform an independent review of the borrower's ability to obtain the loan. The loan application has already been pre-designated as suitable for sale in the secondary mortgage market.

At step 1310, bids are received from the lenders. Preferably, the bids comprise an "all-in" closing fee—a single bottom line number representing total closing costs for all additional services that need to be obtained in connection with the loan application (e.g., closing services, escrow fees, etc.).

At step 1312, the bids are provided to the agency for presentation to the borrower. At this point, the borrower may be provided with multiple bids from different lenders. The bids relate to a fully-verified loan application that has been pre-designated as suitable for sale in the secondary mortgage market. This arrangement may provide underserved borrowers with a loan application which is more marketable to lenders, and may result in an increase in their ability to obtain loans on favorable terms. The fact that the loan is pre-designated as suitable for sale in the secondary mortgage market enhances the marketability of the loan application, as there is less work to be done on the part of the lender and less uncertainty. This arrangement may also be used for other classes of borrowers.

In another exemplary embodiment, the borrower provides only deal-specific information such as the location of the property the consumer would like to purchase and the amount of the loan the consumer would like to borrower in order to purchase the property. Other non-deal specific information is accessed from the trusted information repository 315, or other suitable source, with little or no paperwork for the consumer to fill out except perhaps to sign (in paper form or electronically) the final loan documents. This avoids the borrower having to fill out a loan application and provide documents such as W-2's, tax information, and so on.

In another exemplary embodiment, task manager engine 108 is further configured to generate task lists useable in connection with servicing mortgage loans. Once a lender closes a loan and holds the loan in its portfolio, the lender may continue using system 10 in connection with ongoing servicing of the loan during the life of the loan. Workflows may be provided in connection with such operations as managing receipt of payments, triggering alerts based on late payments, distributing funds to multiple entities (e.g., MI providers, escrow services, investors), and so on.

In addition, system 10 may also be used by other entities, such as entities that only perform servicing. For example, once a loan is closed, a lender may sell servicing rights to such an entity, and the entity may use system 10 in connection with servicing the loan. In practice, transfer of servicing rights may be implemented by changing access rights from the old servicing entity to the new servicing entity to give the new servicing entity access to the servicing workflows for a particular loan or group of loans. All of the loan data and servicing workflows already reside in system 10. As a result, transaction costs may be reduced and servicing rights may be transferred more efficiently.

Also, data gathered servicing may provide a more complete view of the life cycle of the loan (from loan processing at origination, through monthly mortgage payments, through what happened during loss mitigation during default, as applicable). Accordingly, performance modeling logic 1202 may be provided with a broader range of data for a larger number of loans.

The systems and methods described herein may be used in combination with the systems and methods disclosed in U.S. patent application Ser. No. 10/733,701, entitled "System and Method for Facilitating Home Ownership," filed on Dec. 11, 2003 and U.S. patent application Ser. No. 10/736,484, entitled "Systems and Methods for Facilitating the Flow of Capital Through the Housing Finance Industry," filed on Dec. 15, 2003. In particular, the workflow engine, task manager engine, and other engines and systems described herein may be included among the additional engines 150 or additional engines 117 in the '701 application or '484 application, respectively. The workflow engine, task manager engine and other engines and systems described herein may be coupled to server 110 (in either the '701 application or the '484 application) and may be accessible to the user via user interfaces 120 or 115 and 3rd party services 160 or 119 in the '701 and '484 applications, respectively. Alternatively, the engines and systems described in the '701 and '484 applications may be included in processing system 24, with the user interface logic described therein being included with the user interface logic 40. It will be appreciated that features described in connection with like systems (e.g., underwriting engines, service ordering engines, user interfaces, and so on) may be combined in any such combined system. For example, features described in connection with underwriting engine 118 in the '484 application and/or in connection with underwriting engine 151 in the '701 application may be incorporated and used with underwriting engine 52 of the present application.

The present description is provided in the context of systems and methods for processing loans using a single lender or multiple lenders. In particular, systems and methods are described herein which may be used to manage various aspects of the process of applying for a loan, qualifying for a loan, and closing on a loan (e.g., managing the conditions that must be met during the process, managing the documents in the process, managing deadlines during the process, etc.). Although the present description refers primarily to mortgage loans, other types of loans (e.g., securitized loans such as auto loans, unsecuritized loans, etc.) may also be processed using the systems and methods disclosed herein. Accordingly, describing the disclosed subject matter in relation to a particular financial instrument (i.e., mortgage) is not meant to be limiting in any respect. Also, it should be understood that the present system may be configured to include any and/or all of the features and components described herein in any combination. Thus, the features and components may be combined in innumerable ways to provide innumerable embodiments—all of which are contemplated as being part of and included in this disclosure even though a particular combination may not be explicitly described.

As noted above, embodiments which are contemplated by the subject matter disclosed herein includes program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Various embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the subject matter described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions thereof might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer.

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosed subject matter. Likewise, software and web implementations of the present subject matter could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the subject matter has been presented for purposes of illustration and description. It is not intended to be exhaustive or to limit the subject matter to the precise form disclosed, and modifications and variations are possible in light of the above teachings or may be acquired from practice of the disclosed subject matter. The embodiments were chosen and described in order to explain general principles and the practical application to enable one skilled in the art to utilize the disclosed subject matter in various embodiments and with various modifications as are suited to the particular use contemplated. While numerous features and functions are described herein, it will be appreciated that many of these features may be implemented in a standalone configuration without other ones of the features described herein, and that the teachings herein may be used in implementing a system with additional, different, and/or fewer features and functions.

What is claimed is:

1. A computer-implemented mortgage loan application data processing system comprising:
   a machine; and
   a memory having machine-executable instructions stored therein, the machine executing the instructions, the machine and instructions in combination implementing user interface logic, the user interface logic being accessible by a borrower, the user interface logic being configured to receive mortgage loan application data for a mortgage loan application from the borrower;
   a casefile data service configured to create a casefile identification number associated with the mortgage loan application and store the mortgage loan application data in a database, the casefile identification number usable to retrieve the mortgage loan application data from the database; and
   a workflow engine, the workflow engine having stored a list representing tasks that need to be performed in connection with a mortgage loan application for a mortgage loan for the borrower, the tasks including tasks for fulfillment of underwriting conditions generated by an automated underwriting engine, the workflow engine being configured to cooperate with the user interface logic to prompt the borrower to perform the tasks represented in the list including the tasks for the fulfillment of the underwriting conditions;
   wherein the system is configured to provide the borrower with a fully-verified approval for the mortgage loan application, the fully-verified approval indicating that the mortgage loan application data received from the borrower has already been verified as accurate using information from trusted sources, and the fully-verified approval being provided in a form that allows the mortgage loan application to be provided to different lenders with the different lenders being able to authenticate the fully-verified approval status of the mortgage loan application;
   wherein the fully-verified approval pre-designates the mortgage loan application as being in immediate condition to be used to originate a mortgage loan that has been predetermined by a secondary mortgage market participant to be salable to the secondary mortgage market participant with no further documentation being required in order to fulfill the underwriting conditions, and wherein the automated underwriting engine that generates the underwriting conditions is provided by the secondary mortgage market participant; and
   wherein the fully-verified approval comprises an authentication code provided to the borrower, the authentication code indicating the fully-verified approval status of the mortgage loan application and being useable by the different lenders to authenticate the fully-verified approval status of the mortgage loan application.

2. A system as defined in claim 1, wherein the information from the trusted sources is received by way of a trusted information repository, the trusted information repository storing financial information for the borrower, including information from an employer of the borrower, information from credit agencies, and tax information for the borrower.

3. A system as defined in claim 1, wherein the user interface logic is accessible to the borrower by way of the Internet.

4. A system as defined in claim 1, wherein the system is configured to generate a data file that comprises the mortgage loan application and the authentication code.

5. A system as defined in claim 4, wherein the data file further comprises documents required to fulfill the underwriting conditions, and wherein the information from the trusted sources is embodied in the documents.

6. A system as defined in claim 5, wherein the user interface logic is configured to transmit the data file to a plurality of lenders.

7. A system as defined in claim 6, wherein the user interface logic is configured to receive bids responsive to the data file from the plurality of lenders.

8. A system as defined in 7,
   wherein the system is associated with a third party intermediary, the third party intermediary being different than the plurality of lenders from which the bids are received and being different than the secondary mortgage market participant associated with the automated underwriting engine.

9. A system as defined in claim 1, wherein the user interface logic is configured to provide the borrower with screen displays comprising document checklists advising the borrower what documents are needed to complete the loan application.

10. A system as defined in claim 9, wherein the user interface logic is configured to provide the borrower with tools accessible by the borrower to upload documents required pursuant to the underwriting findings and to transcribe data from the documents into alphanumeric format.

11. A system as defined in claim 1, wherein the automated underwriting engine is customizable by the different lenders to include lender-specific underwriting rules for underwriting mortgage loan applications.

12. A computer-implemented mortgage loan data processing system, comprising:
    a machine; and
    a memory having machine-executable instructions stored therein, the machine executing the instructions, the machine and instructions in combination implementing
       a workflow engine having stored therein a list representing tasks that need to be performed in connection with a mortgage loan application for a mortgage loan for a borrower, the tasks including tasks for fulfillment of underwriting conditions generated by an automated underwriting engine;
       a service ordering engine configured to order services from service providers in connection with the mortgage loan application;
       borrower user interface logic configured to provide a borrower user interface accessible to the borrower by way of the Internet, the borrower user interface being configured to receive the mortgage loan application data from the borrower and to provide the borrower with access to the workflow engine, the borrower user interface being configured to provide one or more display screens configured to
          provide the borrower with information concerning the underwriting conditions,
          prompt the borrower to perform the tasks for the fulfillment of the underwriting conditions generated by the automated underwriting engine,
          provide the borrower with tools to upload documents required to fulfill the underwriting conditions, and provide the borrower with tools to access the service ordering engine to order the services from the service providers; and a casefile data service configured to create a casefile identification number associated with the mortgage loan application and store the mortgage loan application data in a database, the casefile identification number usable to retrieve the mortgage loan application data from the database;

wherein the system is configured to provide the borrower with a full-documentation approval for the mortgage loan application, the full-documentation approval indicating that the mortgage loan application is fully-verified and that no further documentation is required to fulfill underwriting conditions, the full-documentation approval being provided in a form that allows the mortgage loan application to be provided to different lenders with the different lenders being able to authenticate the full-documentation approval status of the mortgage loan application;

wherein the full-documentation approval pre-designates the mortgage loan application as being in immediate condition to be used to originate a mortgage loan that has been predetermined by a secondary mortgage market participant to be salable to the secondary mortgage market participant, wherein the automated underwriting engine that generates the underwriting conditions is provided by the secondary mortgage market participant; and wherein the full-documentation approval comprises an authentication code provided to the borrower, the authentication code indicating the full-documentation approval status of the mortgage loan application and being useable by the different lenders to authenticate the full-documentation approval status of the mortgage loan application.

13. A system as defined in claim 12, wherein the information is income verification information, and wherein the documents are income verification documents.

14. A system as defined in claim 12, wherein the borrower user interface is configured to provide the borrower with document checklists advising the borrower what documents are needed to complete the loan application.

15. A system as defined in claim 12, wherein the automated underwriting engine is customizable by the different lenders to include lender-specific underwriting rules for underwriting mortgage loan applications.

16. A computer-implemented mortgage loan application data processing method comprising:

providing a borrower access to user interface logic, the user interface logic being configured to collect mortgage loan application data from the borrower for a mortgage loan application, the user interface logic being implemented by a machine having a processor and machine-executable instructions executed by the processor;

generating a casefile identification number associated with the mortgage loan application;

storing the casefile identification number in a computer-implemented database;

processing the mortgage loan application for the borrower using a workflow engine, the mortgage loan application being processed in accordance with user inputs received from the borrower via the user interface logic, the workflow engine including a memory having stored therein a list representing tasks that need to be performed in connection with the mortgage loan application, the tasks including tasks for fulfillment of the underwriting conditions, the workflow engine being implemented by the machine having the processor and machine-executable instructions executed by the processor; and providing the borrower with a fully-verified approval for the mortgage loan application, the fully-verified approval indicating that the mortgage loan application data received from the borrower has already been verified as accurate using information from trusted sources, the fully-verified approval being provided in a form that allows the borrower to provide the mortgage loan application to different lenders with the different lenders being able to authenticate the fully-verified approval status of the mortgage loan application;

wherein the fully-verified approval pre-designates the mortgage loan application as being in immediate condition to be used to originate a mortgage loan that has been predetermined by a secondary mortgage market participant to be salable to the secondary mortgage market participant with no further documentation being required in order to fulfill the underwriting conditions, and wherein the automated underwriting engine that generates the underwriting conditions is provided by the secondary mortgage market participant; and wherein the fully-verified approval comprises an authentication code provided to the borrower, the authentication code indicating the fully-verified approval status of the mortgage loan application and being useable by the different lenders to authenticate the fully-verified approval status of the mortgage loan application.

17. A method as defined in claim 16, further comprising providing the borrower with document checklists advising the borrower what documents are needed to complete the loan application.

18. A method as defined in claim 17, further comprising providing the borrower with instructions for submitting the documents in the document checklists.

19. A method as defined in claim 16, further comprising generating a data file comprising the mortgage loan application and the authentication code indicating the fully-verified approval status of the mortgage loan application, transmitting the data file to a plurality of different mortgage lenders, and receiving bids from the plurality of different mortgage lenders for the mortgage loan application responsive to the data file.

20. A method as defined in claim 19, wherein the bids are all-in bids reflecting total closing costs for the mortgage loan application.

21. A computer-implemented mortgage loan application data processing system comprising:

a machine; and a memory having machine-executable instructions stored therein, the machine executing the instructions, the machine and instructions in combination implementing (A) user interface logic, the user interface logic being accessible by a borrower by way of the Internet, the user interface logic being configured to receive mortgage loan application data for a mortgage loan application from a borrower; and (B) a workflow engine, the workflow engine having stored a list representing tasks that need to be performed in connection with a mortgage loan application for a mortgage loan for a borrower, the tasks including tasks for fulfillment of underwriting conditions generated by an automated underwriting engine associated with a secondary mortgage market participant, the workflow engine being configured to cooperate with the user interface logic to prompt the borrower to perform the tasks represented in the list including the tasks for the fulfillment of the underwriting conditions;

(C) a service ordering engine, the service ordering engine being coupled to a plurality of service providers by way of way of a network, the service ordering engine being configured to order services from the service providers in connection with the mortgage loan application by way of the Internet; and (D) a casefile data service configured to create a casefile identification number associated with the mortgage loan application and store the mortgage loan application data in a database, the casefile identification number usable to retrieve the mortgage loan application data from the database;

wherein the user interface logic is configured to (i) provide the borrower with screen displays comprising document checklists advising the borrower what the documents are required to complete the loan application pursuant to the underwriting findings, (ii) provide the borrower with tools accessible by the borrower to upload the documents required to complete the application, and (iii) provide the borrower with access to the service ordering engine to order the services from the service providers in connection with the mortgage loan application;

wherein the system is configured to provide the borrower with a fully-verified approval for the mortgage loan application, the fully-verified approval indicating (i) that the mortgage loan application data received from the borrower has already been verified as accurate using information from trusted sources, the trusted sources comprising the documents provided by the borrower, and (ii) that no further verification documentation is required in order to fulfill the underwriting conditions, the fully-verified approval pre-designating the mortgage loan application as being in immediate condition to be used to originate a mortgage loan that has been predetermined to be salable to the secondary mortgage market participant with no further documentation being required in order to fulfill the underwriting conditions;

wherein the system is configured to generate a data file that comprises the mortgage loan application, the documents required to fulfill the underwriting conditions, and an authentication code, the authentication code indicating the fully verified approval status of the mortgage loan application and being useable by a plurality of different lenders to authenticate the fully-verified approval status of the mortgage loan application;

wherein the information comprises income verification information for the borrower and the documents are income verification documents.

22. A computer-implemented data processing system for managing processing of mortgage loan applications, comprising:

a machine; and a memory having machine-executable instructions stored therein, the machine executing the instructions, the machine and instructions in combination implementing (A) an underwriting engine, the underwriting engine being configured to receive mortgage loan application data pertaining to a mortgage loan application for a mortgage loan for a borrower, the underwriting engine being configured to generate underwriting findings including underwriting conditions for the mortgage loan application;

(B) task manager logic, the task manager logic being configured to receive the underwriting findings from the automated underwriting engine, the task manager logic comprising rules logic including (1) underwriting rules, the underwriting rules being useable to process the underwriting findings to generate a list representing tasks that need to be performed in connection with the mortgage loan application, and (2) lender rules, the lender rules comprising lender-specific rules for processing the underwriting findings to configure which tasks are represented in the list in accordance with lender preferences;

(C) a workflow engine, the workflow engine being configured to receive the list from the task manager logic, the workflow engine being configured to prompt the borrower user to perform the tasks represented in the list and to track completion of the tasks represented in the list;

(D) a service ordering engine, the service ordering engine being connected to a plurality of different service providers by way of the Internet, the service providers being entities that perform services in connection with mortgage loan applications, the service ordering engine being configured to order services from the service providers in connection with the mortgage loan application;

(E) data capture services logic, the data capture services logic comprising logic for capturing data associated with documents received in connection with the mortgage loan application, the documents being received responsive to the tasks, the data capture services logic being configured to associate documents received from the service providers with the mortgage loan application;

(F) integration logic, the integration logic being configured to receive additional tasks from other sources such that the additional tasks may be integrated with the list generated based on the underwriting findings;

(G) user interface logic, the user interface logic including web-to-workflow engine middle tier logic, the middle tier logic being configured to provide a borrower user interface accessible to the borrower by way of the Internet, the borrower user interface being configured to cooperate with the workflow engine to prompt the borrower to perform the tasks represented in the list, the borrower user interface comprising screen displays which prompt the borrower to perform the tasks represented in the list, the screen displays prompting the borrower to perform the tasks by displaying the tasks and displaying status information for the tasks, the borrower user interface being accessible to the borrower to permit the borrower to perform the tasks represented in the list, and the borrower user interface being configured to access the service ordering engine to order a service in connection with the mortgage loan application; and (H) a casefile data service configured to create a casefile identification number associated with the mortgage loan application and store the mortgage loan application data in a database, the casefile identification number usable to retrieve the mortgage loan application data from the database;

wherein the system is configured to provide the borrower with a full-documentation approval for the mortgage loan application, the full-documentation approval indicating that no further documentation is required to fulfill the underwriting conditions, the full-documentation approval being provided in a form that allows the mortgage loan application to be provided to different lenders with the different lenders being able to authenticate the full-documentation approval status of the mortgage loan application;

wherein the full-documentation approval indicates that the mortgage loan application data received from the borrower has been verified as accurate using information from trusted sources, the trusted sources including documents provided by the borrower, the full documentation including an authentication code indicating the full-documentation approval status of the mortgage loan application and being useable by the different lenders to authenticate the fully-verified approval status of the mortgage loan application;

wherein the information includes income verification information and the documents include income verification documents.

\* \* \* \* \*